(12) United States Patent
Fuglsang et al.

(10) Patent No.: US 9,033,659 B2
(45) Date of Patent: May 19, 2015

(54) METHOD OF MANUFACTURING A WIND TURBINE BLADE HAVING PREDESIGNED SEGMENT

(75) Inventors: Peter Fuglsang, Vejle (DK); Stefano Bove, Lunderskov (DK); Lars Fuglsang, Odense (DK)

(73) Assignee: LM Glasfiber A/S, Kolding (DK)

( * ) Notice: Subject to any disclaimer, the term of this patent is extended or adjusted under 35 U.S.C. 154(b) by 665 days.

(21) Appl. No.: 13/320,932

(22) PCT Filed: May 18, 2010

(86) PCT No.: PCT/EP2010/056808
§ 371 (c)(1),
(2), (4) Date: Nov. 17, 2011

(87) PCT Pub. No.: WO2010/133587
PCT Pub. Date: Nov. 25, 2010

(65) Prior Publication Data
US 2012/0063913 A1 Mar. 15, 2012

(30) Foreign Application Priority Data
May 18, 2009 (EP) .................................... 09160496

(51) Int. Cl.
*F03D 1/02* (2006.01)
*F03D 1/06* (2006.01)

(52) U.S. Cl.
CPC ............ *F03D 1/0641* (2013.01); *F03D 1/0675* (2013.01); *F05B 2240/301* (2013.01); *F05B 2240/32* (2013.01); *Y02E 10/721* (2013.01)

(58) Field of Classification Search
USPC .............. 416/223 R, 228, 243, 132 R, 132 B, 416/146 R, 226, 62, 1; 415/4.1, 4.3, 4.5, 1
See application file for complete search history.

(56) References Cited

U.S. PATENT DOCUMENTS

| 5,088,665 | A | | 2/1992 | Vijgen et al. | |
|---|---|---|---|---|---|
| 5,328,329 | A | * | 7/1994 | Monroe | ........................... 416/62 |
| 2003/0099546 | A1 | * | 5/2003 | Stiesdal et al. | ................ 416/228 |

(Continued)

FOREIGN PATENT DOCUMENTS

| DE | 199 64 114 A1 | 7/2001 |
|---|---|---|
| DE | 10 2006 017 897 A1 | 10/2007 |
| EP | 0 100 131 A1 | 2/1984 |
| EP | 1 944 505 A1 | 7/2008 |

(Continued)

*Primary Examiner* — Edward Look
*Assistant Examiner* — Aaron R Eastman
(74) *Attorney, Agent, or Firm* — Nath, Goldberg & Meyer; Jerald L. Meyer; Sanjana Mangalagiri

(57) ABSTRACT

A blade for a rotor of a wind turbine is manufactured with a root region with a substantially circular or elliptical profile closest to the hub, an airfoil region with a lift generating profile furthest away from the hub and a transition region having a profile gradually changing the root region to the airfoil region. A first blade design is used for the first base part on a first longitudinal section of an airfoil region of a second blade, so that an induction factor of the first base part on the second blade deviates from a target induction factor. The first longitudinal section of the second blade is provided with flow altering devices so as to adjust the aerodynamic properties of the first longitudinal segment to substantially meet the target induction factor at the design point on the second blade.

11 Claims, 32 Drawing Sheets

(56) References Cited

U.S. PATENT DOCUMENTS

Figure 1:
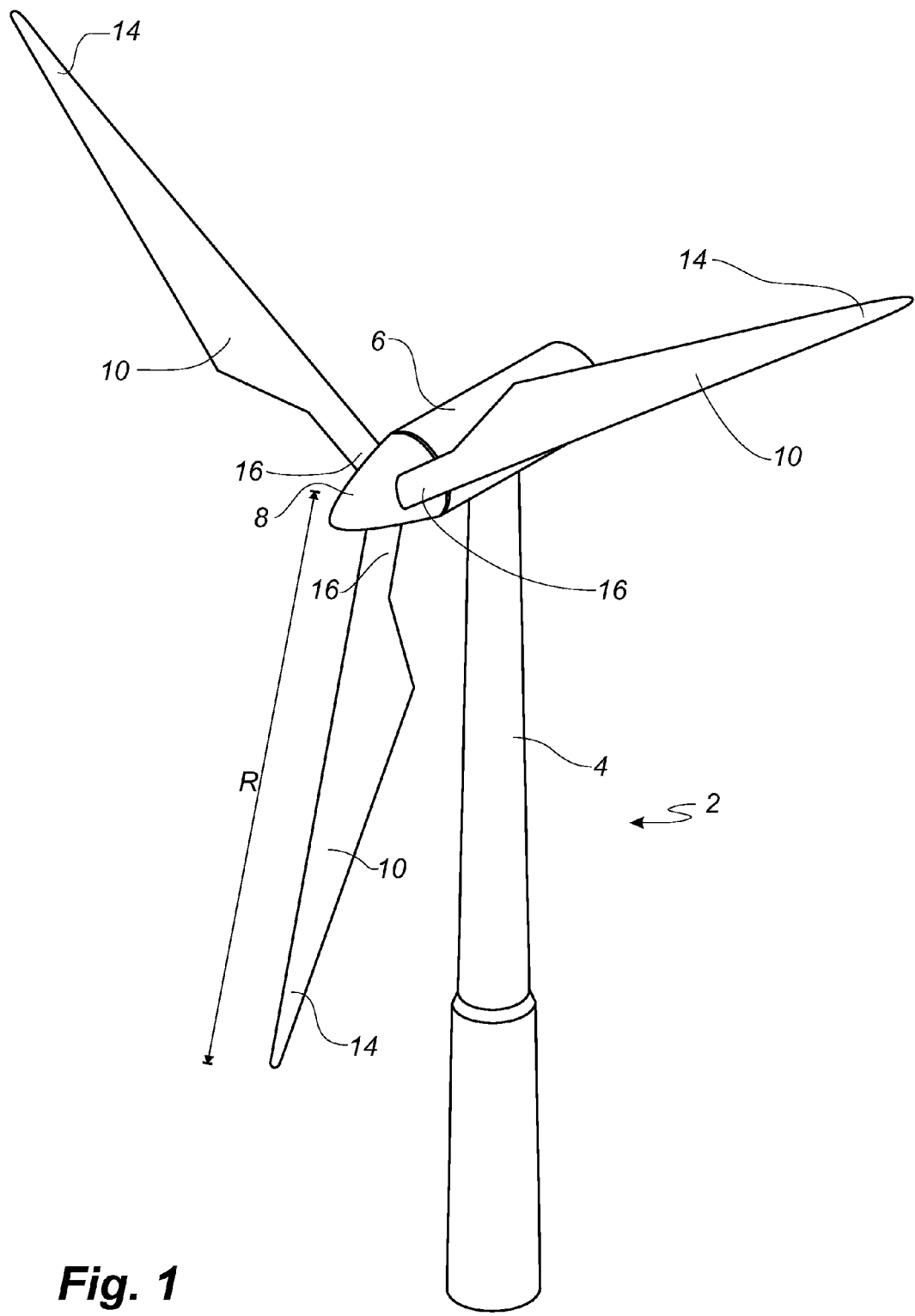

| | | | |
|---|---|---|---|
| 2007/0065290 A1* | 3/2007 | Herr | 416/223 R |
| 2007/0105431 A1 | 5/2007 | Cairo | |
| 2007/0140858 A1* | 6/2007 | Bakhuis et al. | 416/223 R |
| 2007/0253824 A1* | 11/2007 | Eyb | 416/223 R |
| 2009/0016891 A1* | 1/2009 | Parsania et al. | 416/223 R |
| 2009/0068018 A1* | 3/2009 | Corten | 416/223 R |
| 2009/0311106 A1* | 12/2009 | Rohden | 416/241 A |
| 2010/0008787 A1* | 1/2010 | Godsk | 416/223 R |

FOREIGN PATENT DOCUMENTS

| | | |
|---|---|---|
| EP | 2 031 242 A1 | 3/2009 |
| WO | 01/14740 A1 | 3/2001 |
| WO | 02/08600 A1 | 1/2002 |
| WO | 03/029644 A1 | 4/2003 |
| WO | 03/098034 A1 | 11/2003 |
| WO | 2007/140771 A1 | 12/2007 |

* cited by examiner

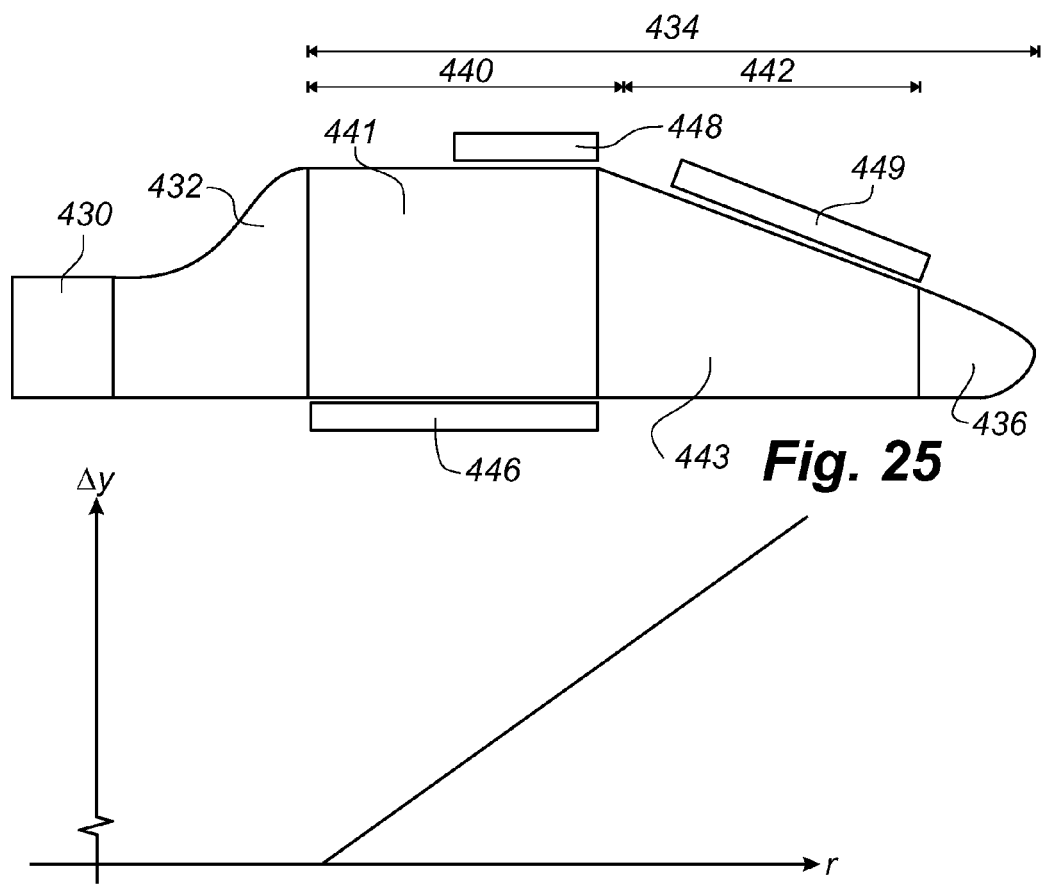
Fig. 25
Fig. 26
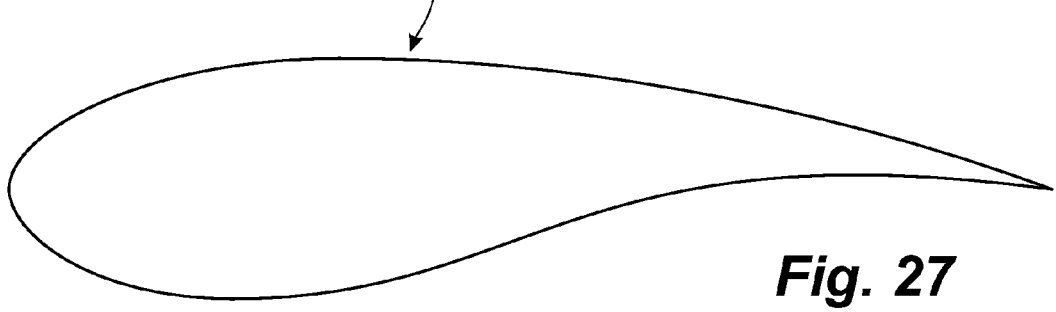
Fig. 27
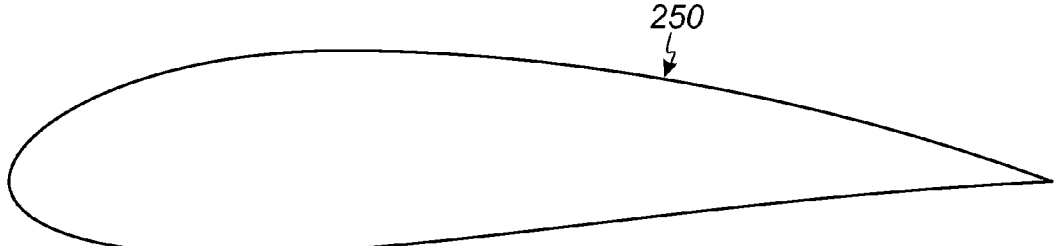
Fig. 28

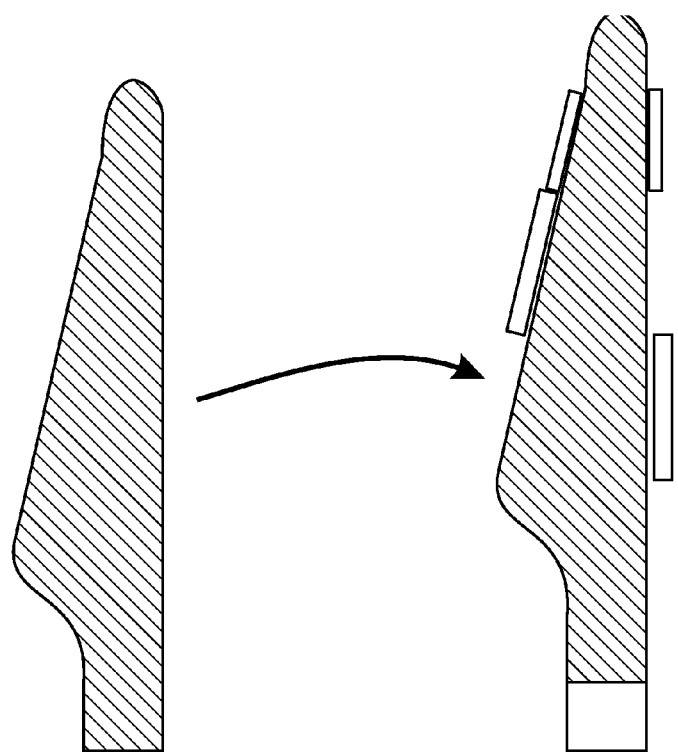
Fig. 35
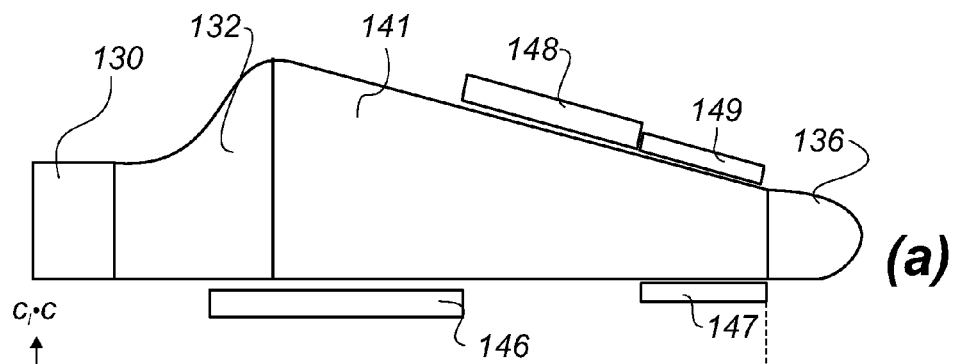
Fig. 36
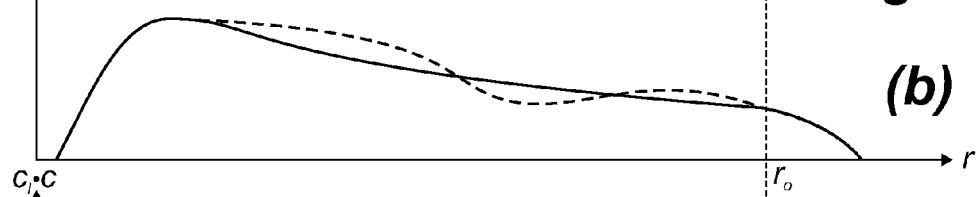
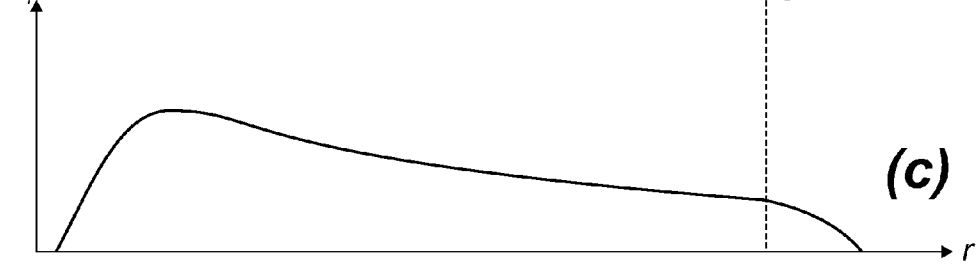

METHOD OF MANUFACTURING A WIND TURBINE BLADE HAVING PREDESIGNED SEGMENT

This is a National Phase Application filed under 35 U.S.C. 371 as a national stage of PCT/EP2010/056808, filed May 18, 2010, and claiming the benefit from European Application No. 09160496.7, filed May 18, 2009, the content of which is hereby incorporated by reference in its entirety.

The present invention relates to a method of manufacturing a wind turbine blade by using the design of a longitudinal segment of a first wind turbine blade for the design of a second wind turbine blade, wherein the first wind turbine blade and the second wind turbine blade each comprise a longitudinally extending base part having: a profiled contour comprising a pressure side and a suction side as well as a leading edge and a trailing edge with a chord extending between the leading edge and the trailing edge, the profiled contour generating a lift when being impacted by an incident airflow, the profiled contour in the radial direction being divided into a root region with a substantially circular or elliptical profile closest to the hub, an airfoil region with a lift generating profile furthest away from the hub, and preferably a transition region between the root region and the airfoil region, the transition region having a profile gradually changing in the radial direction from the circular or elliptical profile of the root region to the lift generating profile of the airfoil region. The invention further relates to a group of wind turbine blades comprising at least a first wind turbine blade and a second wind turbine blade as well as a group of wind turbines comprising such groups of blades.

Traditionally, modern wind turbine blades are designed by initially designing the outer shape and the aerodynamic performance of the blade itself in order to obtain the target loading and target axial induction for each radial section of the airfoil section of the blade. First afterwards, it is determined how to manufacture the blade in accordance with the aerodynamic design specification for the blade. The aerodynamic shapes of such blades are typically complex with segments having double curvatured contours and several different airfoil shapes along the radial extent of the wind turbine blade. Accordingly, the manufacturing process of the blades as well as manufacturing mould parts for the manufacturing process become quite complex. Overall, the time for initial start-up for developing the design of a new blade type to the product launch of the new blade type is long, and the overall production and development costs are high. This process is more thoroughly described in section 1 of the later description.

WO 01/14740 discloses ways of modifying wind turbine blade profiles in order to prevent stall problems.

EP 2 031 242 discloses a blade element for mounting on a wind turbine blade in order to change the profile from an airfoil shape with a pointed trailing edge to an airfoil profile with a truncated trailing edge.

DE 199 64 114 A1 discloses an airfoil profile, which is fitted with a divergent trailing edge in form of Gurney flap, which creates a periodic flow disturbance.

WO 02/08600 discloses a wind turbine blade provided with a rib as well as vortex generators on the connection part or root part of the blade.

U.S. Pat. No. 5,088,665 discloses a wind turbine blade provided with a serrated trailing edge panel.

WO 2007/140771 discloses a wind turbine blade provided with turbulence generating strips in order to prevent stall and reduce noise emissions.

EP 1 944 505 discloses a wind turbine blade provided with vortex generators in airfoil portions having a relative thickness of 30%-80%.

DE 10 2006 017 897 discloses a wind turbine blade provided with a spoiler device in the root region and transition region of the blade.

WO 03/029644 discloses a method of designing a turbine blade for a under water flow turbine by use of e.g. axial induction factor as a design parameter. The blade profiles are not provided with flow guiding devices.

WO 03/098034 discloses a wind turbine provided with a hub extender. The blade profiles are not provided with flow guiding devices.

US 2007/140858 discloses a modularly constructed blade including bond sections which are disposed away from the leading edge and trailing edge of the assembled blade. The blade profiles are not provided with flow guiding devices.

US 2007/105431 discloses a modularly constructed blade including a plurality of stacked modular segments, where the segments are clamped together using cables. The blade profiles are not provided with flow guiding devices.

EP 0 100 131 discloses a method of manufacturing wind turbine blades using pultrusion or extrusion. The blade profiles are not provided with flow guiding devices.

It is an objective of the invention to obtain a new method of manufacturing a wind turbine blade, which overcomes or ameliorates at least one of the disadvantages of the prior art or which provides a useful alternative.

According to a first object of the invention this is obtained by the afore-mentioned method comprising the steps of: a) taking a first blade design of a first base part of a first longitudinal section of the airfoil region of a first blade, b) using the first blade design for the first base part on a first longitudinal section of the airfoil region of a second blade, so that an induction factor of the first base part on the second blade without flow altering devices at a rotor design point deviates from a target induction factor, and c) providing the first longitudinal section of the second blade with first flow altering devices so as to adjust the aerodynamic properties of the first longitudinal segment to substantially meet the target induction factor at the design point on the second blade, wherein the first longitudinal segment extends along at least 20% of a longitudinal extent of the airfoil region of the second blade.

By using a first base part with inherent non-ideal aerodynamic characteristics, which subsequently are compensated for by use of flow altering devices, it becomes possible to achieve a much more simple base part profile. Furthermore, the method makes it possible to achieve a modular blade design, in which the same base part can be used for several different blade types and blade lengths without impairing the aerodynamic properties of the airfoil section comprising said base part. Thus, it is possible to reuse the base part of an existing blade further outboard on a larger/longer blade, or alternatively reuse the base part of an existing blade further inboard on a smaller/shorter blade. All in all, it is possible to make a blade design in such a way that the blade design of the airfoil region is put together from pre-designed sections and that blades of different lengths can be composed partly from sections already existing from previous blades.

Further, a blade segment with for instance an inherent non-optimum twist or a non-optimum chordal length distribution has a number of advantages with respect to manufacturing of the base part, since the shape of the base part can be kept much simpler than the shapes of conventional, modern wind turbine blades with a length of more than 40 meters. For instance double curvatured blade profiles may be avoided. This also makes the production of mould parts for manufacture of the blades simpler. All in all, the time for initial start-up for developing the design of a new blade type to the product launch of the new blade type may be lowered significantly, and the overall production costs may also be lowered.

However, putting such a constraint on the design parameters of the blade segment means that the blade segment deviates from the optimum design with respect to aerodynamics, in which the twist and chord length has a non-linear dependency on the radial position of the blade section. Thus, such a blade segment will inherently be non-ideal with respect to aerodynamics and in particular in relation to the axial induction factor. This deviation is compensated for by using flow altering devices in order to adjust the design lift and inflow properties to the appropriate near-optimum axial induction as a function of the blade radius. However, the target axial induction factor may deviate from the aerodynamic optimum axial induction of ⅓ due to structure and loading considerations.

The adjustment of the loading to another blade radius implies the need for use of flow altering devices. Thus, the flow guiding devices are used to adjust the blade to the rotor design point so that it has a near-optimum inflow condition and lift coefficient.

All in all, it is seen that the inventive concept behind the idea is a departure from the traditional process of designing modern wind turbine blades, where the outer shape and the aerodynamic performance of the blade is designed initially, and first afterwards it is determined how to plan the manufacturing of the blades in accordance with the design specification. The invention provides a new design process, in which the production is optimised in relation to effective methods of manufacturing a base part of a wind turbine blade, and where the base part of the blade is retrofitted with flow guiding devices in order to obtain the proper aerodynamic specifications. Thus, the base part of the blade may deviate substantially from the optimum aerodynamic design.

The target axial induction may be seen as an average over the entire longitudinal extent of the first longitudinal segment, or it may be seen as an individual target for a plurality of smaller radial segments within the first longitudinal segment. Yet again, it may be seen as an individual target for each cross-section of the first longitudinal segment of the blade.

Preferably, the first longitudinal segment also extends along at least 20% of the longitudinal extent of the airfoil region of the first blade.

Thus, the blade comprises at least one longitudinal segment extending along a substantial part of the airfoil region of the blade. According to a first embodiment, the airfoil region includes a blade tip region of the blade. According to a second embodiment, the blade further comprises a blade tip region abutting the airfoil region. Thus, the blade tip region may be seen as either part of the airfoil region or as a separate part. Typically, the tip region covers the outer 5-10% of the longitudinal extent of the airfoil region.

For wind turbines and wind turbine blades, the pressure side of the blade is also defined and known as the windward side or the upwind side, whereas the suction side is also defined and known as the leeward side or the downwind side.

The rotor design point is defined as the point, where a power coefficient of the wind turbine blade is maximum for a design wind speed and a design rotor speed. Thus, each section of the blade has a local design tip speed ratio defined as the design rotor speed multiplied by the local blade section radius divided by the design wind speed. Thus, it is seen that the design point is the point where a wind turbine using such wind turbine blades has its maximum efficiency at the wind speed for which the wind turbine is designed. At the design point, the local blade section has a local chord, twist and airfoil shape, which at the local inflow results in a design lift coefficient. All parameters should be chosen or adjusted with the flow altering devices in order to obtain the target axial induction factor, which governs the power being produced by this blade section. The rotor design point is further explained in section 1.3.

According to an advantageous embodiment, the first longitudinal segment of the first blade is located in a first radial distance from a root end of the first blade, and wherein the first longitudinal segment of the second blade is located in a second radial distance from a root end of the second blade, and wherein the first radial distance is different from the second radial distance. Thus, it is clear that the aerodynamic properties cannot be identical for the first longitudinal segment of the two blades without the use of flow altering devices, since the twist and chord length of the different radial positions are changed.

According to another advantageous embodiment, the first base part is optimised for operation at the first radial distance. That is, the first base part is optimised for the first blade, meaning that the first base part in itself can achieve the target axial induction of the first blade at the rotor design point.

According to yet another advantageous embodiment, the first base part has a profile shape which is substantially a hybrid between a first profile shape for obtaining a target induction at a first radial distance at the rotor design point and a second profile shape for obtaining a target induction at a second radial distance at the rotor design point. In this case, both the first blade and the second blade have to be retrofitted with flow altering devices according to step c) in order to obtain optimum aerodynamic performance at the rotor design point.

The first base part may have a profile shape for example being substantially an average between the first profile shape and the second profile shape. Thus, the first base part has a design profile, which is approximately an average between an optimum design for the first blade and an optimum design for the second blade.

According to an advantageous embodiment, steps a) and b) are carried out by connecting a hub extender to the first blade. Thus, the entire first blade is reused for the second blade by connecting an extra root section to the blade, thereby making the rotor diameter of a wind turbine using the blade larger.

According to a second aspect, the invention provides a group of wind turbine blades comprising at least a first wind turbine blade and a second wind turbine blade, wherein the first wind turbine blade and the second wind turbine blade each comprise a longitudinally extending base part having: a profiled contour comprising a pressure side and a suction side as well as a leading edge and a trailing edge with a chord extending between the leading edge and the trailing edge, the profiled contour generating a lift when being impacted by an incident airflow, the profiled contour in the radial direction being divided into a root region with a substantially circular or elliptical profile closest to the hub, an airfoil region with a lift generating profile furthest away from the hub, and preferably a transition region between the root region and the airfoil region, the transition region having a profile gradually changing in the radial direction from the circular or elliptical profile of the root region to the lift generating profile of the airfoil region. According to the invention, the first wind turbine blade and the second wind turbine blade comprise a first longitudinal segment having a substantial identical first base part, wherein the first longitudinal segment extends along at least 20% of a longitudinal extent of the airfoil region of the second wind turbine blade, and wherein an induction factor of the first base part of the second blade without flow altering devices at a rotor design point deviates from a target axial induction factor, and wherein the first longitudinal segment of the second blade is provided with a number of first flow altering devices arranged so as to adjust the aerodynamic properties of the first longitudinal segment to substantially meet the target axial induction factor at the rotor design point.

According to an advantageous embodiment the second wind turbine blade comprises the base part of the first wind turbine blade and is further provided with a hub extender.

According to an advantageous embodiment, the first base part has an axial induction factor, which without flow altering devices deviates at least 5% from a target axial induction factor at a design point, and the first longitudinal segment is provided with a number of first flow altering devices arranged so as to adjust the aerodynamic properties of the first longitudinal segment to substantially meet the target axial induction factor at the design point.

According to an advantageous embodiment, the first base part has an inherent non-ideal twist and/or chordal length, and wherein the cross-sectional profile is adapted to compensate for the non-ideal twist and/or chordal length by shifting the axial induction towards the target axial induction. This type of blade is particularly applicable for designing wind turbine blades having a base part with a simplified chordal distribution and/or twist. According to an advantageous embodiment, the first base part has an inherent non-ideal twist and/or chordal length, and wherein the cross-sectional profile is adapted to compensate for the non-ideal twist and/or chordal length by shifting an axial induction towards a target axial induction. However, putting such a constraint on the design parameters of the blade segment means that the blade segment deviates from the optimum design with respect to aerodynamics. Thus, such a blade segment will inherently be non-ideal with respect to aerodynamics and in particular in relation to an optimum lift coefficient for the segment. This deviation is compensated for by using flow altering devices in order to adjust the design lift to the appropriate near-optimum axial induction as a function of the blade radius. The adjustment of the loading to another blade radius implies the need for use of flow altering devices.

According to another advantageous embodiment, the axial induction factor of the first longitudinal segment with flow altering devices deviates no more than 2% from the target axial induction factor at the design point. Advantageously, the deviation is no more than 1% from the target axial induction factor at the design point.

According to yet another advantageous embodiment, the induction factor of the first base part without flow altering means deviates from the target axial induction factor along substantially the entire longitudinal extent of the first longitudinal segment.

According to one embodiment, the target axial induction factor is substantially equal to the aerodynamic optimum target axial induction factor. Thereby, it is possible to substantially maximise the energy extracted from the wind and thus maximise the power production of a wind turbine utilising such blades.

However, the target axial induction factor may lie in the interval between 0.25 and 0.4, or between 0.28 and 0.38, or between 0.3 and 0.33. Thus, it is seen that the target axial induction factor—due to structural and operational consideration—may deviate from the theoretical optimum of ⅓.

According to another embodiment, the induction factor of the first base part without flow altering devices at the design point deviates at least 10%, or 20% or 30% from the target axial induction factor. In other words, the axial induction factor is shifted on average more than 10% by applying the flow altering devices to the first longitudinal segment of the blade.

According to yet another embodiment, the first base part without flow altering devices at the design point further deviates from a target loading, and wherein the first flow altering devices are further arranged so as to adjust the aerodynamic properties of the first longitudinal segment to substantially meet the target loading at the design point. The target loading is in this regard considered to be the resultant air force or more accurately the resultant normal force to the rotor plane influencing the particular blade section. The target loading may be seen as an average over the entire longitudinal extent of the first longitudinal segment, or it may be seen as an individual target for a plurality of smaller radial segments within the first longitudinal segment. Yet again, it may be seen as an individual target for each cross-section of the first longitudinal segment of the blade.

The loading of the first base part may without flow altering devices at the design point deviate at least 5%, or 10%, or 20% or 30% from the target loading. In other words, the loading of the first longitudinal segment is shifted on average over the entire longitudinal extent by at least 5% or 10% by applying the flow altering devices to the first longitudinal segment of the blade.

Advantageously, the loading of the first longitudinal segment with flow altering devices deviates no more than 2% from the target loading at the design point. Advantageously, the deviation is no more than 1% from the target loading at the design point.

According to an advantageous embodiment, the first base part has an inherent non-ideal twist, such as no twist, or a reduced twist compared to a target blade twist. Such a base part is further simplified compared to conventional blade shapes.

According to another advantageous embodiment, the first longitudinal segment in the radial direction is divided into: a plurality of radial sections, each radial section having an individual average operating angle of attack for the design point and having a sectional airfoil shape, which without the first flow altering devices has a sectional optimum angle of attack, wherein the first flow altering devices are adapted to shift the optimum angle of attack of the sectional airfoil shape towards the average operating angle of attack for the radial section.

According to yet another advantageous embodiment, the first base part has a twist, which is non-ideal along substantially the entire longitudinal extent of the first longitudinal segment. Accordingly, the inherent twist differs from the ideal twist along substantially the entire longitudinal extent of the segment, but the inherent twist may at various radial positions be identical to the optimum twist. Thus, graphs representing the ideal twist and the inherent twist may at certain point cross each other.

The invention is particularly suited for optimising the performance of blades having substantially no twist, i.e. blades which have not inherently been designed to compensate for the local inflow velocity due to the local varying velocity of the blade. Accordingly, the flow altering devices can be utilised to vary the shift angle in the longitudinal direction of the blade, so that the shift angle corresponds to a virtual twist of the blade in order to compensate for the local inflow velocity due to the local varying velocity of the blade. However, the invention can also be utilised with other types of blades and particularly on blades having a reduced overall twist angle compared to the optimum. Therefore, the blade according to one embodiment of the invention has an airfoil region with a twist of less than 8 degrees. In other words, the orientation of the chord plane changes less than 8 degrees in the radial direction of the blade. However, the blade may still be prebent and/or tapered in the radial direction of the blade. According to an alternative embodiment the twist is less than 5 degrees, or 3 degrees, or even less than 2 degrees. Thereby, it is possible to provide a wind turbine blade with a much less complex profile than a conventional wind turbine blade, which typically has an airfoil section with a maximum twist between 10 and 12 degrees, sometimes even 15 degrees, and providing the blade with flow altering devices in order to compensate for the "missing" twist or providing the "remaining" twist.

However, according to a particularly advantageous embodiment, the airfoil region of the blade is substantially straight. In other words, the orientation of the chord plane is substantially the same in the entire radial direction of the blade. Accordingly, each radial section can be provided with flow altering devices in order to optimise the lift of the substantially straight blade. This provides a large number of possibilities for the design of blades, since the blades can be designed without twist and still be optimised for the local radial velocity of the blade during normal use, i.e. at the design point. This means that the blade can be manufactured from individual sectional blade parts, e.g. as individual blade parts, which are mutually connected afterwards, or by use of sectional mould parts as for instance shown in DE 198 33 869. Alternatively, a given blade can be fitted with a hub extender without changing the direction of the chord for a given radial position of the blade. This also makes it possible to design the blade without an ideal double curvatured pressure side, i.e. without the need of having both a convex and a concave surface profile on the pressure side of the blade. In this situation, the flow altering devices may be utilised to compensate for a non-ideal profile. Thus, the mould assemblies can be manufactured with a much simpler shape. Also, such a blade may make it possible to manufacture the blade via simpler fabrication methods, such as extrusion or the like.

The first derivative of the twist is reduced with increasing distance from the hub. Therefore, the twist of the outer part of the blade, i.e. near the tip, is smaller than the twist of the inner part of the blade. Consequently, not all blades need to be provided with flow altering devices near the tip end. However, preferably at least the inner 40%, 50%, 60%, 70%, or 75% of the airfoil area is provided with radial blade section having flow altering devices. The inflow in the tip region may be compensated for by altering the blade pitch angle and/or the rotational speed of the rotor.

According to a particularly advantageous embodiment, the first base part has a substantially constant twist, e.g. substantially no twist, meaning that the chord of the first base part is substantially arranged in the same direction. Thus, the first base part may be substantially straight.

According to another advantageous embodiment, the first base part has a twist being linearly dependent on a radial position. That is, the twist angle or the chord angle varies linearly in the spanwise or longitudinal direction of the first longitudinal segment. Such a blade segment may be fitted to follow the ideal twist as closely as possible, but has a number of advantages with respect to obtaining a feasible modular design, where the first base part is reused on another blade type or where it is "connected" to a second base part of a second longitudinal segment and having another dependency on the radial position, optionally via an intermediate, transitional blade segment. In other words, such a blade segment has a number of advantages with respect to obtaining a modular design of the blade.

According to a first embodiment, the first base part has an inherent twist angle so that the first base part without flow altering devices at the rotor design point has an inflow angle, which is lower than the optimum inflow angle along the entire longitudinal extent of the first longitudinal segment. In this situation, a single type of flow altering devices may be sufficient to accommodate for the non-ideal aerodynamic structure of the first base part.

According to a second embodiment, the first longitudinal segment has an inherent twist angle so that the first base part without flow altering devices at the rotor design point comprises a first segment, in which the inflow angle is lower than the optimum inflow angle, and a second segment, in which the inflow angle is higher than the optimum inflow angle. In this situation, it may be necessary to employ different types of flow altering devices in order to accommodate for the non-ideal aerodynamic structure of the first base part. Such a blade may occur, if the inherent twist of the first base part is linearly dependent on the radial distance from the hub and where the inherent twist "crosses" the ideal twist, which has a non-linear dependency on the radial position. Since the ideal twist has an inverse proportional dependency on the radial distance from the hub, a blade having a first base part with an inherent linear twist dependency may comprise—seen from the hub towards the blade tip—a first segment having an inherent twist being lower than the ideal twist, a juxtaposed second segment having an inherent twist being higher than the ideal twist, and a juxtaposed third segment having an inherent twist being lower than the ideal twist.

Advantageously, the root mean square difference over the longitudinal extent of the first longitudinal section between the average inflow angle and the optimum inflow of attack at the design point is more than 1 degree, or more than 2 degrees, or more than 2.5 degrees for the first longitudinal segment without flow altering devices. Thus, the root mean square difference is calculated as an absolute spatial deviation in the longitudinal direction of the blade. This deviation is further observed over a given time interval, e.g. one full cycle for a wind turbine rotor. Advantageously, the root mean square difference over the longitudinal extent of the first longitudinal section between the average inflow angle and the optimum inflow angle at the design point is less than 1 degree, or less than 0.5 degrees for the first longitudinal segment with the flow altering means.

According to an advantageous embodiment, the first base part has an inner dimension that varies linearly in the radial direction of the blade in such a way that an induction factor of the first base part without flow altering devices at a rotor design point deviates from a target induction factor. Such a base part simplifies the design even further compared to the design of conventional blade designs.

In the following a number of advantageous embodiments having linearly varying inner dimensions are described and which are simplified compared to conventional, modern wind turbine blades.

According to a first advantageous embodiment, the length of the chord of the first base part varies linearly in the radial direction of the blade.

According to another advantageous embodiment, the first base part has a thickness, which varies linearly in the radial direction of the blade. The thickness of the blade is in this regard defined as being the maximum thickness of the blade, i.e. for each cross-sectional profile being the maximum distance between the suction side and the pressure side of the blade (in a direction perpendicular to the cross-section airfoil chord).

According to yet another advantageous embodiment, the first base part has a constant relative thickness. That is, the ratio between the thickness and the chord is constant along the entire longitudinal extent of the first longitudinally extending section of the blade. In principle the relative profile may be varying in the longitudinal direction of the blade; however, according to an advantageous embodiment the first base part comprises a constant relative profile.

In one embodiment, the first base part comprises a constant relative profile along the entire extent of the first longitudinally extending section. That is, every cross-section of the first base part has the same relative airfoil profile or overall shape.

In another embodiment, the first base part has a constant chord length. This means that the chord length is constant along the entire extent of the first longitudinally extending section, or in other words that the leading edge and trailing edge of the first base part are parallel. Such a constraint entails a significant deviation from a target axial induction factor at the design point, but may significantly simplify the production of the blade as well as the design and fabrication of moulds for manufacturing the blade.

In yet another embodiment, the first base part has a constant thickness.

In a particular advantageous embodiment, the first base part comprises a plurality of longitudinal segment, each having a separate linearly varying dependency in the radial direction of the blade. Thus, it is for instance possible to design a blade, which has a piece-wise linearly varying chord length. Each longitudinal segment should extend along at least 20% of the longitudinal length of the airfoil region.

According to an advantageous embodiment, the first base part is provided with a linear pre-bend. Thereby, the angular orientation of the base part in relation to the pitch axis may be linearly dependent on the local blade radius. Alternatively, the transverse deviation from the pitch axis may be linearly dependent on the local blade radius. Thereby, it is possible to fit the pre-bend of individual blade segments in order to obtain a pre-bent blade.

According to another advantageous embodiment, the first base part is pre-bent, and the airfoil region comprises longitudinal segments comprising base parts with no pre-bending. Thus, the pre-bend may be located in one or two segments of the blade only, for instance the outboard part of the airfoil region and/or in the root region.

According to an advantageous embodiment, the first base part is a pultruded or extruded profile. Such base parts are feasible to manufacture due to the linearly varying inner dimensions and simplify the manufacturing process significantly.

According to an advantageous embodiment, the first base part has a cross-sectional profile, which when being impacted by an incident airflow at an angle of attack of 0 degrees has a lift coefficient, which is 0 or less. A positive lift is defined as a lift coefficient having a lift component directed from the pressure side (or upwind/windward side) towards the suction side (or downwind/leeward side) of the blade. A negative lift is defined as a lift coefficient having a lift component directed from the suction side (or downwind/leeward side) towards the pressure side (or upwind/windward side) of the blade.

Thus, the base part has a cross-sectional profile having an aerodynamic relationship between the lift coefficient and the angle attack, which when being plotted in a coordinate system with the lift coefficient as a function of the angle of attack crosses the origin of the coordinate system or crosses the lift coefficient axis at a negative value. In other words, the lift coefficient changes sign at a positive angle of attack or at an angle of zero degrees, i.e. at a non-negative angle of attack.

Such a base part will in itself have inherent non-optimum aerodynamic properties for a conventional wind turbine blade having a profile, which is twisted in the radial direction of the blade. However, the use of profile with such properties makes it possible to simplify other properties of the blade, such as the twist or the chordal shape of the blade. For example, it is made possible to provide a longitudinal segment having no or a linear twist and/or having a linearly varying chord length in the radial direction of the blade. However, putting such constraints on the design of the base part of the blade will inherently entail that the segment deviates substantially from the near-optimum target axial induction of that segment. In order to compensate for such deviations, it is necessary to change the overall inflow properties and the lift coefficient of the segment. However, since the novel profile has a relationship between lift coefficient and angle of attack, which differs significantly from conventional blade profiles, this may be sufficient to even out the deviations or at least change the axial induction towards the target axial induction so that the flow altering devices only have to change the axial induction slightly.

Thus, the blade comprises at least one longitudinal segment extending along a substantial part of the airfoil region of the blade. According to a first embodiment, the airfoil region includes a blade tip region of the blade. According to a second embodiment, the blade further comprises a blade tip region abutting the airfoil region. Thus, the blade tip region may be seen as either part of the airfoil region or as a separate part. Typically, the tip region covers the outer 5-10% of the longitudinal extent of the airfoil region.

In an example, where the first longitudinal segment has a zero twist or a twist being lower than the near-optimum twist, the novel profile (with the above-mentioned relationship between lift coefficient and angle of attack) compensates for the "lack" of twist, since the angle of attack has to be higher than a conventional profile in order to obtain the right target characteristics, e.g. with respect to the necessary lift coefficient in order to obtain the correct axial induction.

The use of the novel profile makes it feasible to achieve a modular blade design, in which the base part can be used for several different blade types and blade lengths. Thus, it is possible to reuse the base part of an existing blade further outboard on a larger/longer blade, or alternatively reuse the base part of an existing blade further inboard on a smaller/shorter blade. All in all, it is possible to make a blade design in such a way that the blade design of the airfoil region is put together from pre-designed sections and that blades of different lengths can be composed partly from sections already existing from previous blades.

Overall, the shape of the base part can be kept much simpler than the shape of conventional, modern wind turbine blades with a length of more than 40 meters. For instance double curvatured blade profiles may be avoided. This also makes the production of mould parts for manufacture of the blades simpler. All in all, the time for initial start-up for developing the design of a new blade type to the product launch of the new blade type may be lowered significantly, and the overall production costs may also be lowered.

Thus, according to an advantageous embodiment, the first base part has an inherent non-ideal twist and/or chordal length, and wherein the cross-sectional profile is adapted to compensate for the non-ideal twist and/or chordal length by shifting an axial induction towards a target axial induction. However, putting such a constraint on the design parameters of the blade segment means that the blade segment deviates from the optimum design with respect to aerodynamics. Thus, such a blade segment will inherently be non-ideal with respect to aerodynamics and in particular in relation to an optimum lift coefficient for the segment. This deviation is compensated for by using flow altering devices in order to adjust the design lift to the appropriate near-optimum axial induction as a function of the blade radius. The adjustment of the loading to another blade radius implies the need for use of flow altering devices.

Thus, according to another advantageous embodiment, the first longitudinal segment is provided with a number of first flow altering devices arranged so as to adjust the aerodynamic properties of the first longitudinal segment to substantially meet a target axial induction factor at a rotor design point.

In the following, a number of advantageous embodiments are described, all of which provide the desired relationship between lift coefficient and angle of attack.

According to an advantageous embodiment, the first base part has a cross-sectional profile having a camber line and a chord line with a chord length, and wherein the average difference between the chord line and a camber line of the cross-sectional profile is negative over the entire chord length. That is, the camber is on average, when seen over the entire length of the chord, closer to the pressure side of the blade than to the suction side of the blade.

According to another embodiment, the camber line is closer to the pressure side than the suction side over the entire length of the chord. The camber and the chord are of course coinciding at the leading edge and at the trailing edge.

According to an alternative embodiment, the first base part has a cross-sectional profile having a camber line and a chord line with a chord length, wherein the camber line and the chord line are coinciding over the entire length of the chord. That is, the cross-sectional profile is symmetric about the chord. Such a profile is highly advantageous from a manufacturing point of view.

All in all, a first base part comprising: a linear chord, a linear thickness, and a twist, which varies linearly or is constant in the radial direction of the blade, has a number of advantages when designing a modular assembled blade and in respect to manufacturing such blades.

According to a third aspect, the invention provides a group of wind turbines comprising at least a first wind turbine and a second wind turbine, wherein the first wind turbine comprises a rotor with a number, preferably two or three, of first wind turbine blades according to the second aspect of the invention, and the second wind turbine comprises a rotor with a number, preferably two or three, of first wind turbine blades according to the second aspect of the invention.

Preferably, the length of the wind turbine blade is at least 40 meters, or at least 50 meters, or at least 60 meters. The blades may even be at least 70 meters, or at least 80 meters. Blades having a length of at least 90 meters or at least 100 meters are also possible.

According to an advantageous embodiment, the blade and in particular the first base part comprise a shell structure made of a composite material. The composite material may be a resin matrix reinforced with fibres. In most cases the polymer applied is thermosetting resin, such as polyester, vinylester or epoxy. The resin may also be a thermoplastic, such as nylon, PVC, ABS, polypropylene or polyethylene. Yet again the resin may be another thermosetting thermoplastic, such as cyclic PBT or PET. The fibre reinforcement is most often based on glass fibres or carbon fibres, but may also be plastic fibres, plant fibres or metal fibres. The composite material often comprises a sandwich structure including a core material, such as foamed polymer or balsawood.

According to another advantageous embodiment, the blade comprises a longitudinal extending reinforcement section comprising a plurality of fibre layers. The reinforcement section, also called a main laminate, will typically extend through the first base part of the first longitudinal segment.

According to an advantageous embodiment, the first longitudinal segment extends along at least 25%, or 30%, or 40%, or 50%, of the airfoil region. The first longitudinal segment may even extend along at least 60%, 70% or 75% of the airfoil region. The extent of the first longitudinal segment may even be up to 100%, when the tip region is considered not being part of the airfoil region. However, the first longitudinal segment may as such be restricted to being part of the airfoil region, in which a near-optimum theoretical aerodynamic performance at the design point may be achieved. This excludes the tip part, the root section, and the transitional section, which due to load and structural considerations always will differ significantly from the near-optimum theoretical aerodynamic performance.

Advantageously, the airfoil region may further comprise a longitudinally extending transitional segment. The transitional segment—not to be confused with the transition region of the blade—may extend radially along 5-10% of the airfoil region, and is utilised in the airfoil region to obtain a gradual transition between two longitudinally extending segments according to the invention. Thus, it is recognised that the blade may comprise a number of longitudinally extending sections extending along a substantial part of the blade and a number of transitional segments. As an example, the outer part of the blade may comprise a first longitudinally extending blade segment extending along approximately 40% of the airfoil region, a transitional segment extending along approximately 10% of the airfoil region, a second longitudinally extending blade segment extending along approximately 40% of the airfoil region, and finally a blade tip section extending along approximately 10% of the airfoil region.

According to an advantageous embodiment, the first longitudinal segment is provided at an inboard position of the airfoil region, i.e. in a part nearest the transition region or root region, preferably within two meters of the transition region of the root region, and more preferably adjoining the optional transition region or the root region. The blade may be provided with additional longitudinal segments juxtaposed to the first longitudinal segment. All of these should extend along at least 25% of the longitudinal extent of the airfoil region.

Advantageously, the flow guiding means comprises a multi element section, such as a slat, or a flap, i.e. the flow guiding means preferably comprises multi-element parts for changing the profile characteristics of different blade segments. The multi element section is adapted to alter the inflow properties and the loading of the first longitudinal segment of the blade. Preferably, the multi element section alters at least a substantial part of the first longitudinal segment, e.g. along at least 50% of the first longitudinal segment. Thereby, it is possible to change a number of design parameters, such as the design lift, the camber and the angle of attack for the segment, from a base design (of the first base part), which has an inherently non-optimum design from an aerodynamic point of view with respect to such parameters, but which is optimised from a manufacturing point of view. Thus, it is possible to retrofit the multi-element parts to the first base part in order to optimise the aerodynamics. Accordingly, one or more of the number of first flow altering devices may be arranged in the proximity of and/or along the leading edge of the first base part. Further, one or more of the number of flow altering devices may be arranged in the proximity of and/or along the trailing edge of the first base part. Thus, the overall profile may become a multi-element profile having at least two separate elements. Accordingly, the first base part may be constructed as a load carrying part of the blade, whereas the flow guiding means are used to optimise the aerodynamics with respect to matching the local section aerodynamic characteristics to the rotor design point.

The multi element section may be arranged in a fixed position in relation to the first base part. Thereby, the blade has permanently or semi-permanently been adjusted in order to compensate for the non-ideal profile of the first base part. Alternatively, the multi element section may be actively adjusted in relation to the first base part. Thus, the design parameters may be adjusted actively, e.g. according to the operational conditions for the wind turbine. The first flow guiding means or the multi element section may be translational and/or rotational operational or adjustable in relation to the first base part.

According to one advantageous embodiment, the number of first flow altering devices comprises a multi element section having an airfoil profile with a chord extending between a leading edge and a trailing edge. This multi element section may be formed as an airfoil having a chord length in the interval of 5% to 30% of a local chord length of the first base part. Alternatively, the afore-mentioned profile element has a maximum inner cross-sectional dimension, which corresponds to 5% to 30% of the chord length of the first base part.

According to a first embodiment, the number of first flow guiding means or the structural profile element is arranged with a distance to the first base part. Alternatively, the structural profile element may be connected to the surface of the first base part, thus as such altering the surface envelope of the base part itself.

According to yet another embodiment, the first base part has a surface area that is at least 5, or 7 times greater than the total surface of the number of flow altering devices.

Yet again, the flow guiding device may be adjustable in order to passively eliminate variations from inflow variations.

The flow altering devices may also comprise a surface mounted element, which alters an overall envelope of the first longitudinal segment of the blade. Advantageously, the surface mounted element is arranged in proximity of the leading edge and/or the trailing edge of the first base part.

The flow altering devices may also comprise boundary layer control means, such as holes or a slot for ventilation, vortex generators and a Gurney flap. Preferably, the boundary layer control means are used in combination with the multi element sections or the surface mounted elements. Multi element sections or surface mounted elements are typically necessary for achieving the large shift in the axial induction factor, i.e. for rough adjustment to the target. However, the boundary layer control means may be utilised in order to fine adjust the axial induction factor to the target.

Advantageously, the blade comprises a number of modular blade sections. The first longitudinal segment may for instance be such a blade section. The blade may also be a dividable or split blade, in which case the blade may be divided at one end of the first longitudinal segment. According to a first advantageous embodiment, the modular blade sections comprise a root section, the first longitudinal segment and a tip section. According to a second advantageous embodiment, the root section comprises the root region and the transition region. According to a third advantageous embodiment, the blade further comprises an extender section for extending the length of the blade, preferably added to the root section of the blade, such as a hub extender.

According to a further aspect, the invention provides a system comprising a group of root sections, optionally a group of extender sections, a group of airfoil sections including the first base part, and a group of tip sections. According to an advantageous embodiment, one modular blade section from the group of root sections, optionally at least one modular blade section from the group of extender sections, at least one modular blade section from the group of airfoil sections and one modular blade section from the group of tip sections can be combined and assembled, so as to form blades with different lengths.

According to yet another aspect, the invention provides a wind turbine comprising a rotor including a number of blades, preferably two or three, according to any of the afore-mentioned embodiments.

Advantageously, the wind turbine comprises a substantially horizontal axis rotor shaft. Preferably, the wind turbine is operated in an upwind configuration, e.g. according to the "Danish concept".

Figure 2:
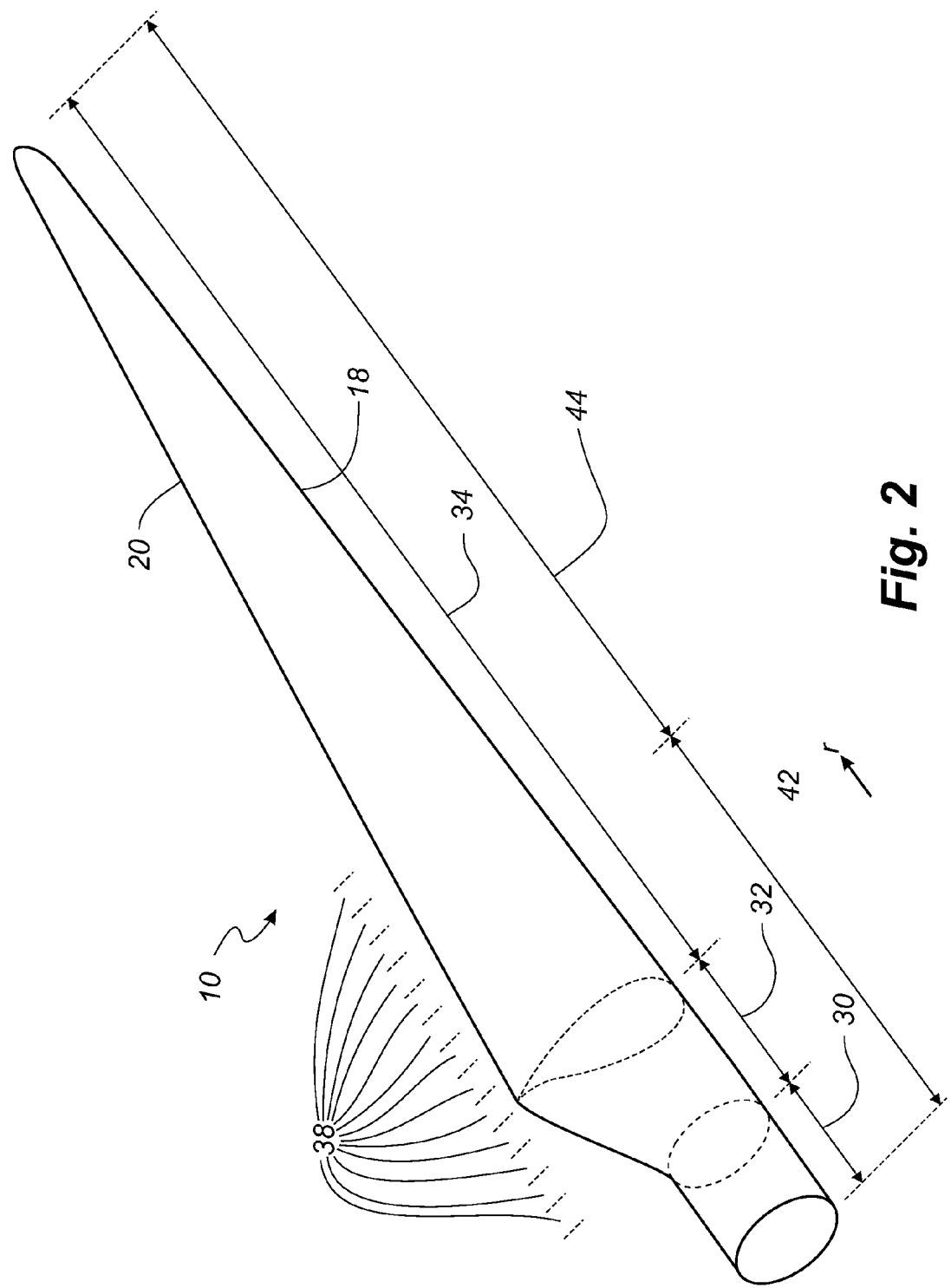
Figure 3:
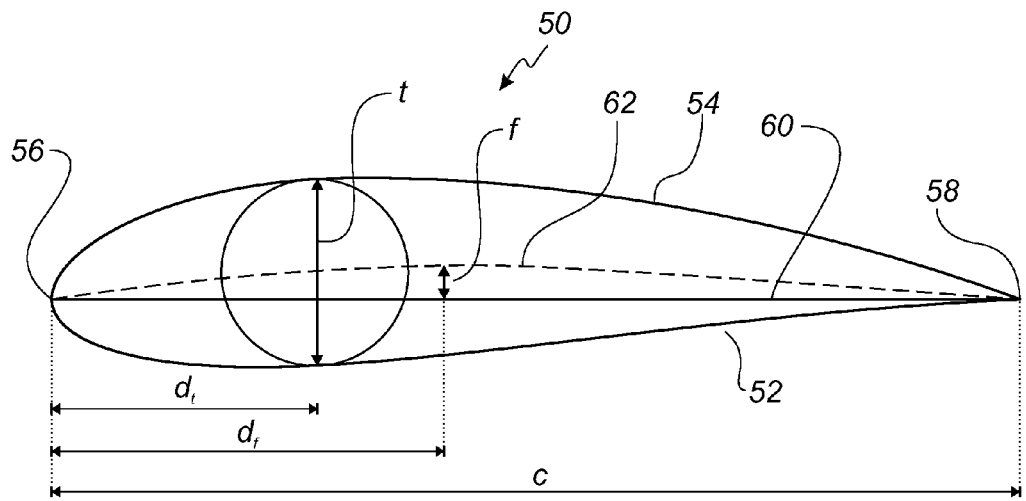
Figure 4:
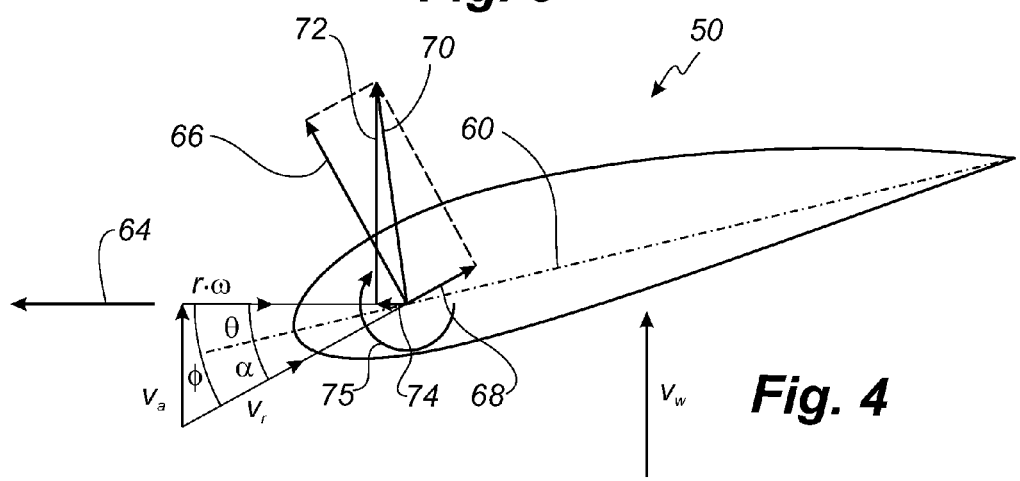
Figure 5:
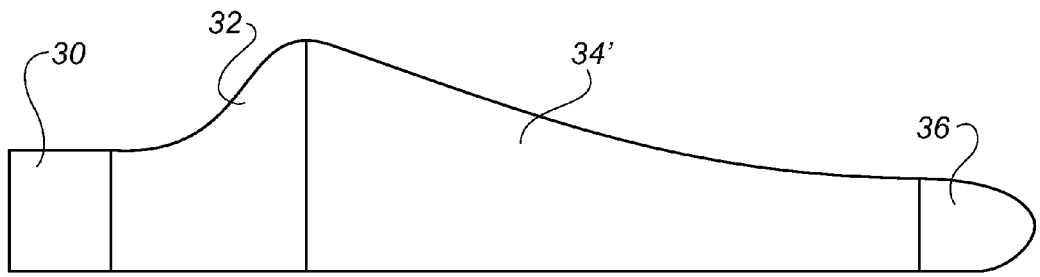
Figure 6A:
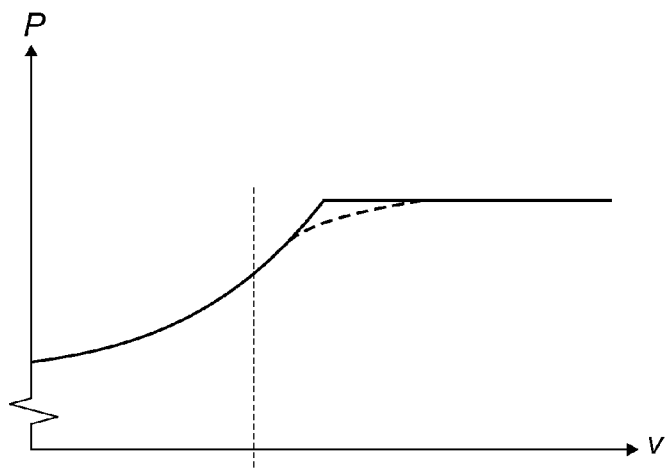
Figure 6B:
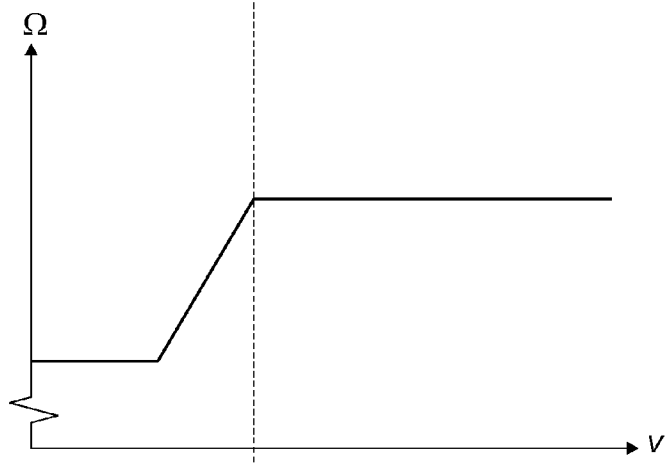
Figure 6C:
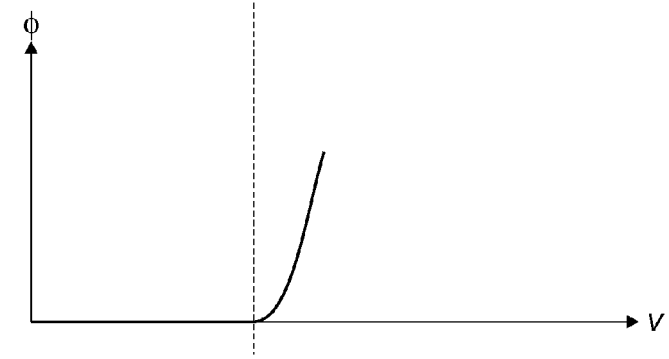
Figure 7:
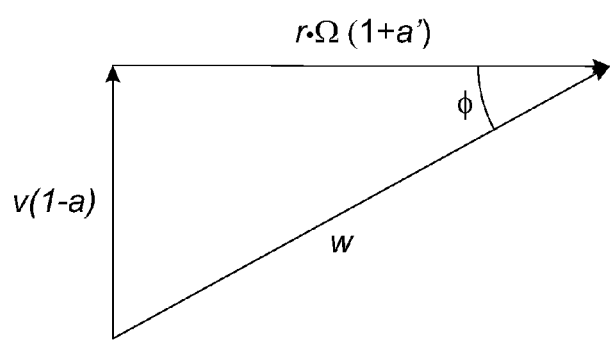
Figure 8A:
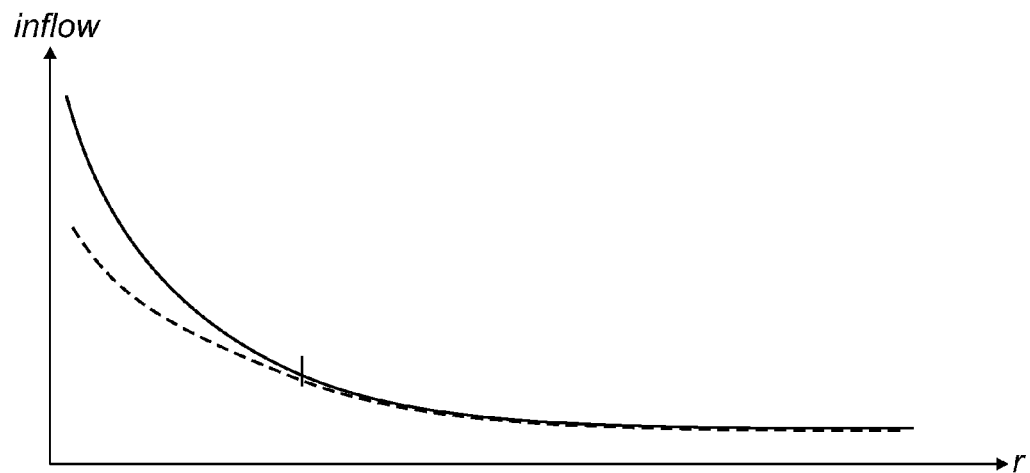
Figure 8B:
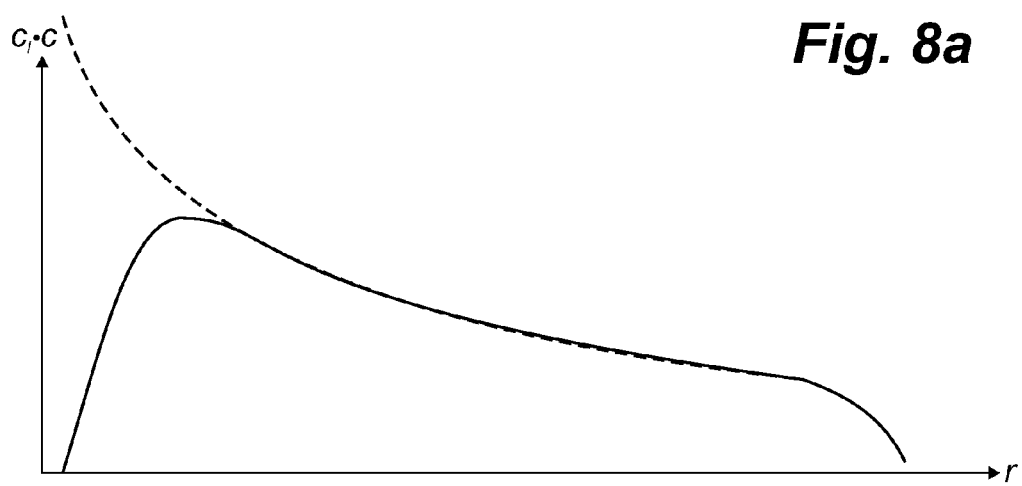
Figure 9:
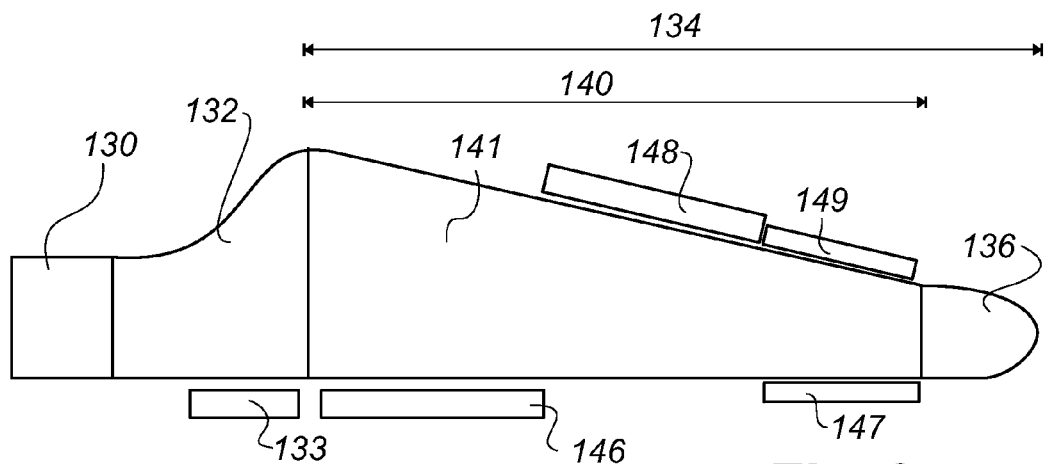
Figure 10:
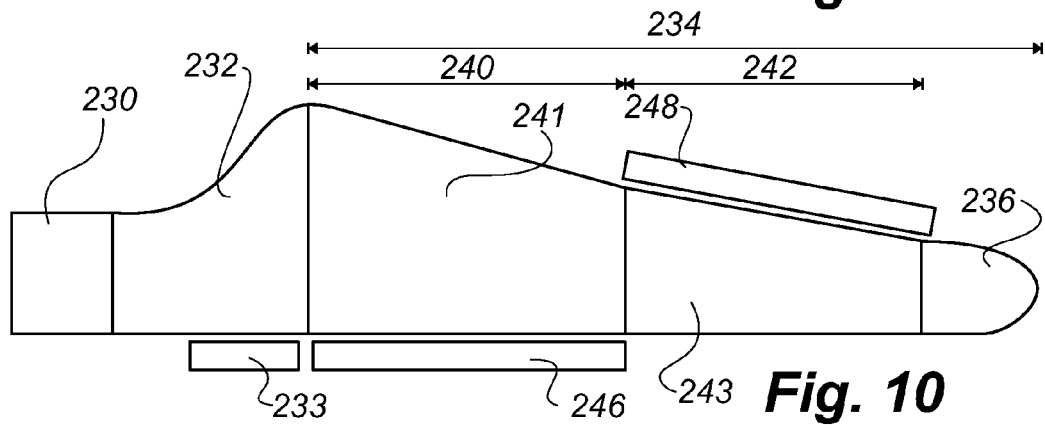
Figure 11:
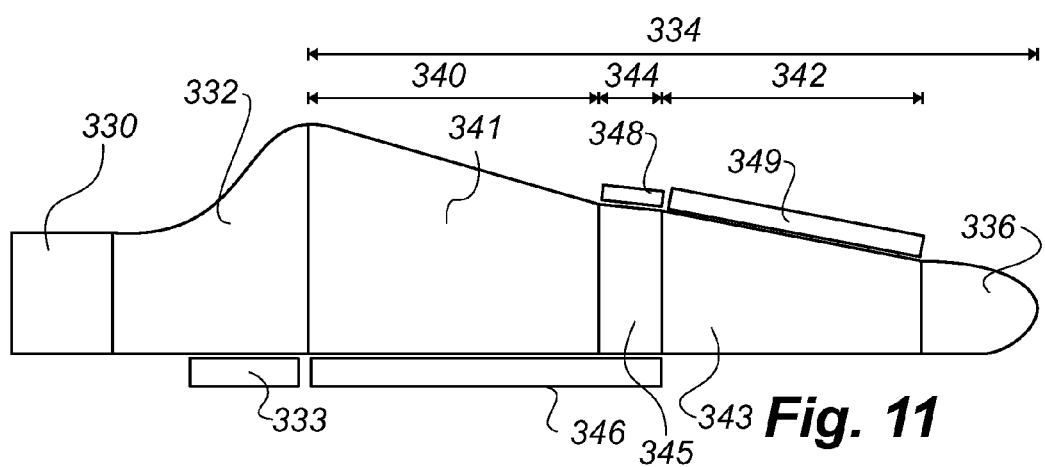
Figure 14A:
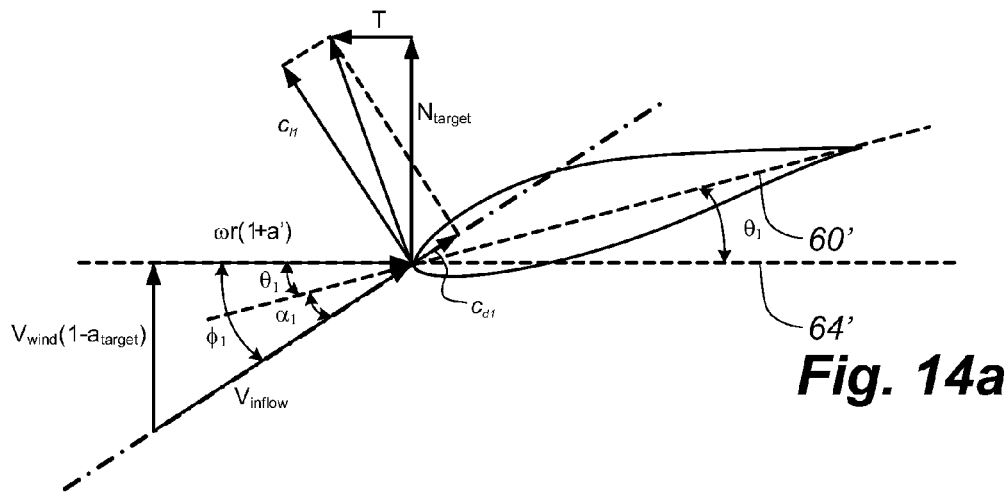
Figure 14B:
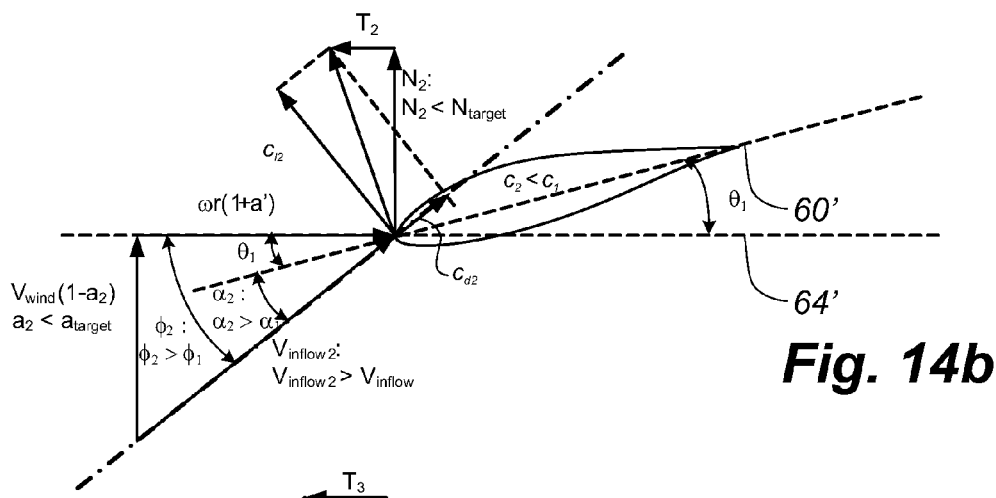
Figure 14C:
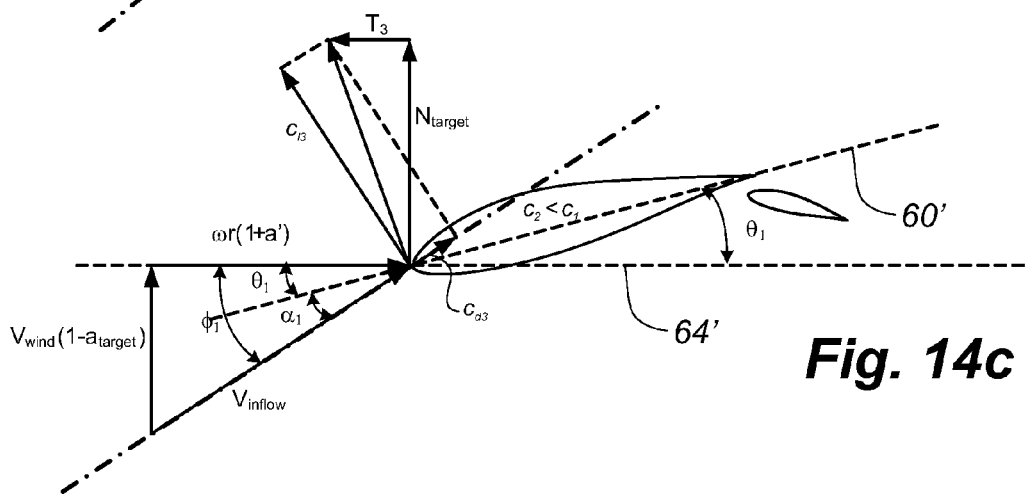
Figure 15A:
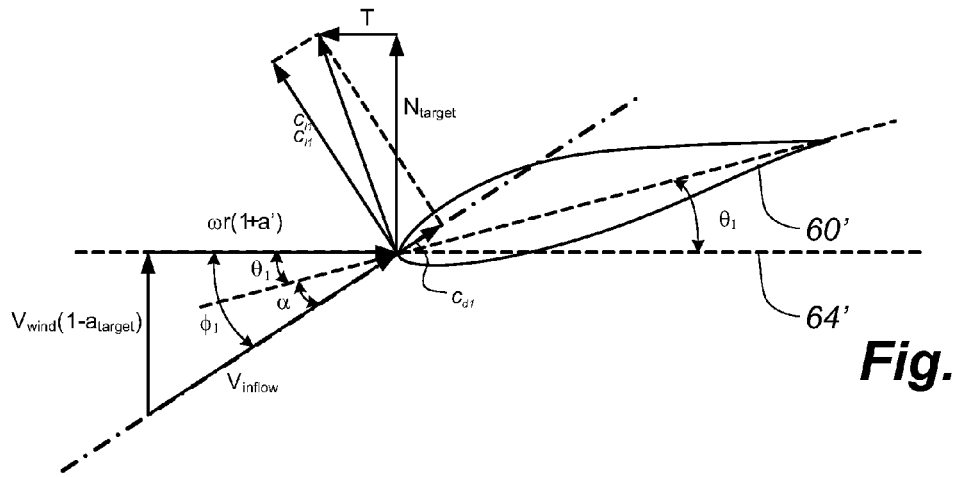
Figure 15B:
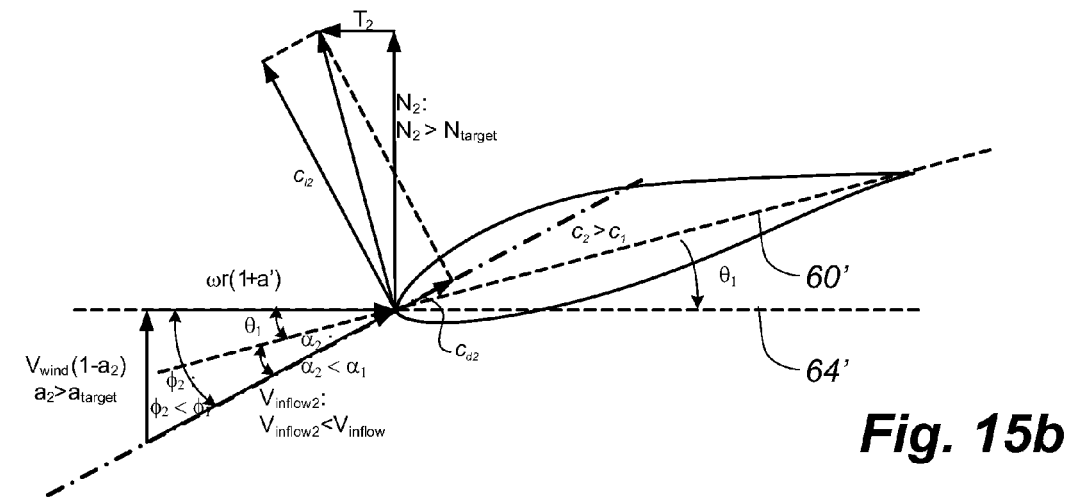
Figure 15C:
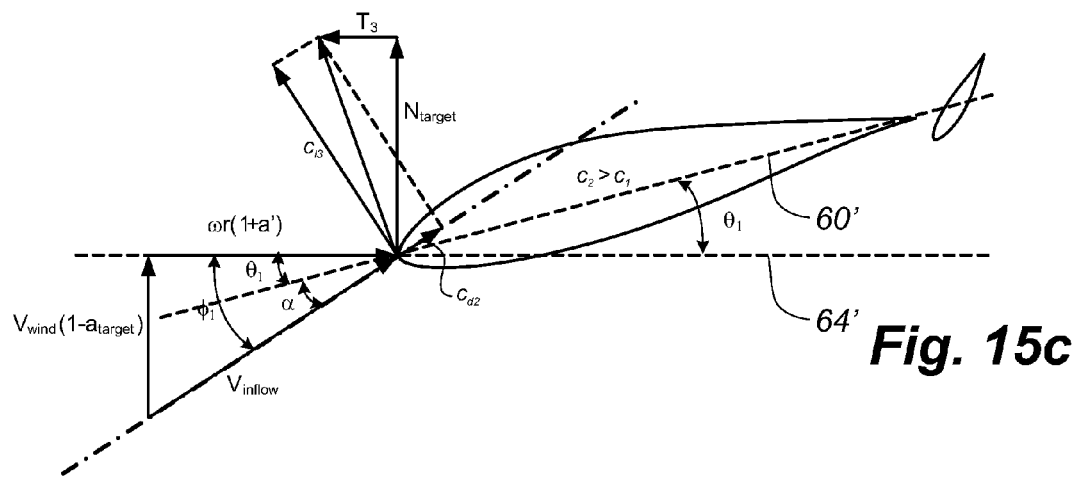
Figure 16:
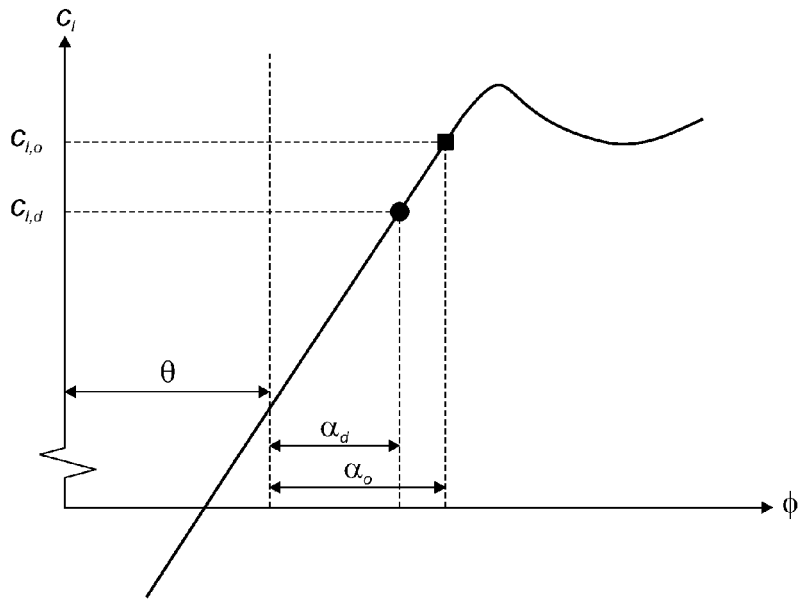

The invention is explained in detail below with reference to an embodiment shown in the drawings, in which FIG. 1 shows a wind turbine, FIG. 2 shows a schematic view of a wind turbine blade according to the invention, FIG. 3 shows a schematic view of an airfoil profile, FIG. 4 shows a schematic view of flow velocities and aerodynamic forces at an airfoil profile, FIG. 5 shows a schematic view of a blade consisting of different blade sections, FIG. 6a shows a power curve versus wind speed for a wind turbine FIG. 6b shows a rotor speed curve versus wind speed for a wind turbine FIG. 6c shows a blade tip pitch curve versus wind speed for a wind turbine FIG. 7 shows a velocity vector triangle for a section on a wind turbine blade, FIGS. 8a and 8b show graphs of inflow and blade loading, respectively, as a function of a local blade radius, FIG. 9 shows a first embodiment of a blade according to the invention, FIG. 10 shows a second embodiment of a blade according to the invention, FIG. 11 shows a third embodiment of a blade according to the invention, FIGS. 12a-c and FIGS. 13a-c illustrate compensatory measures for correcting non-optimum twist, FIGS. 14a-c and FIGS. 15a-c illustrate compensatory measures for correcting non-optimum chordal length, FIG. 16 shows the operating point for an actual blade section of a wind turbine blade compared with the airfoil section design point.

Figure 17A:
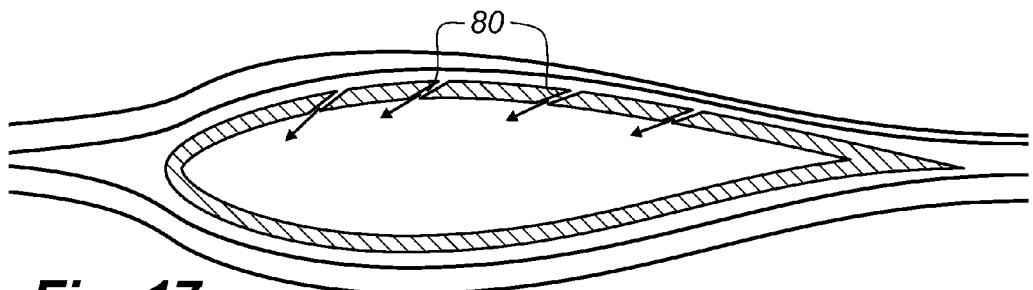
Figure 17B:
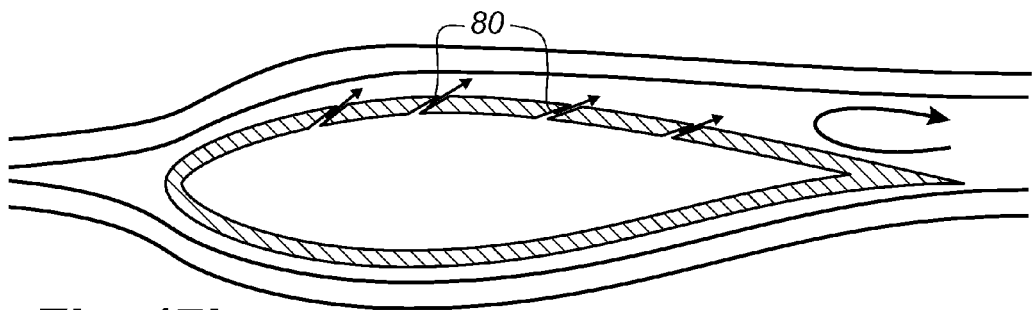
Figure 17C:
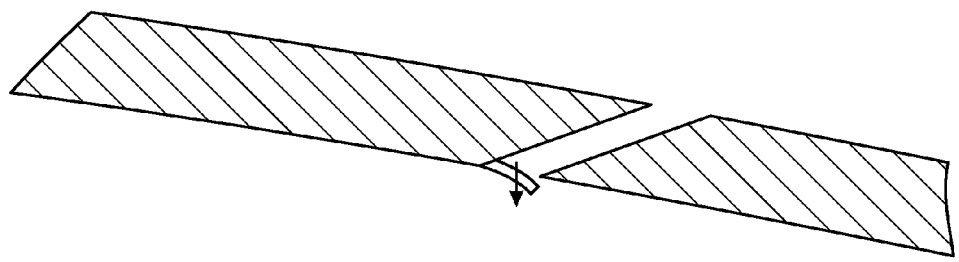
Figure 17D:
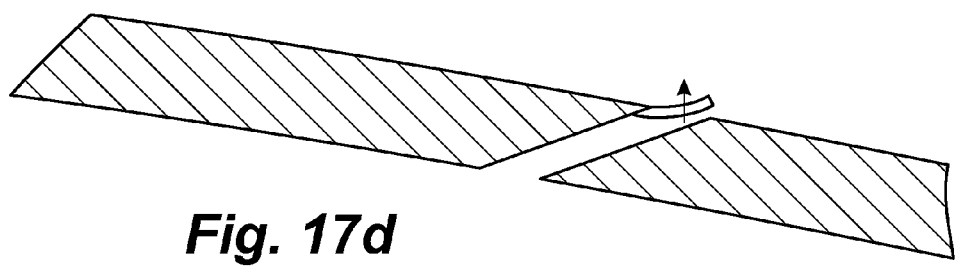
Figure 17E:
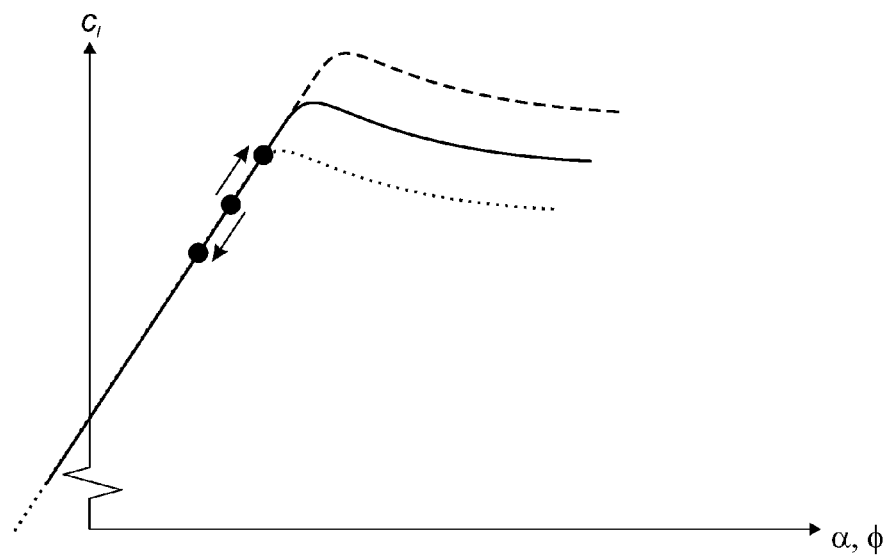
Figure 18A:
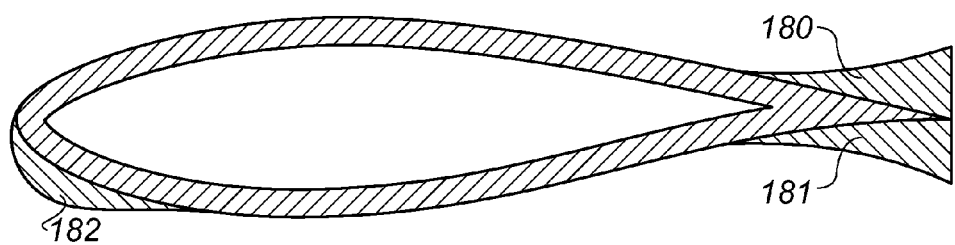
Figure 18B:
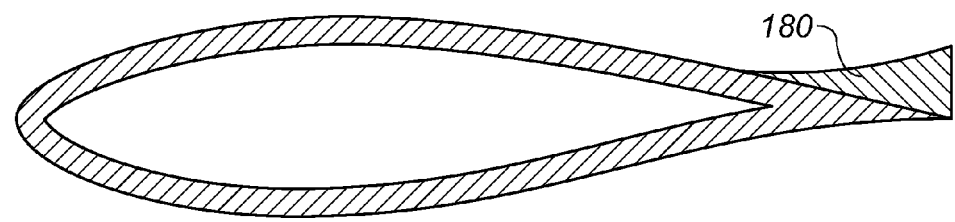
Figure 18C:
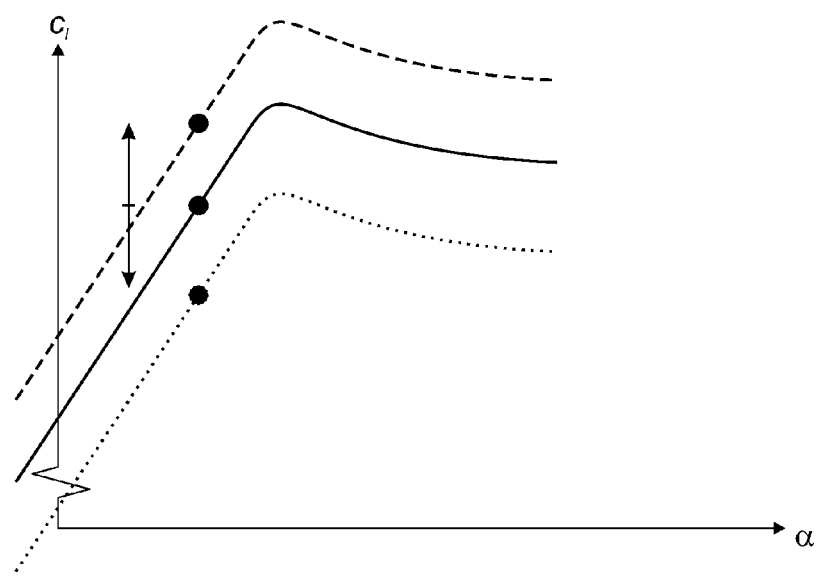
Figure 19A:
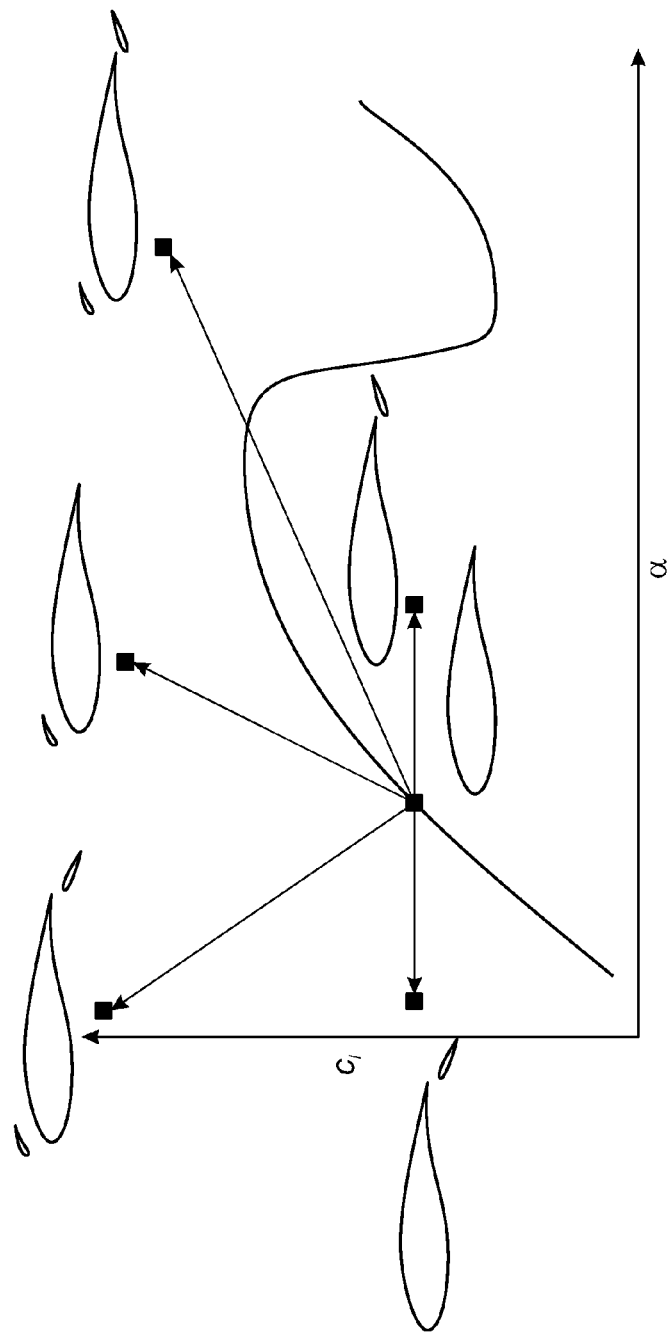
Figure 19B:
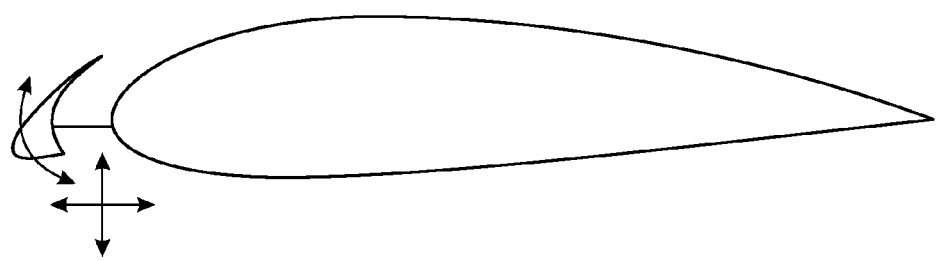
Figure 19C:
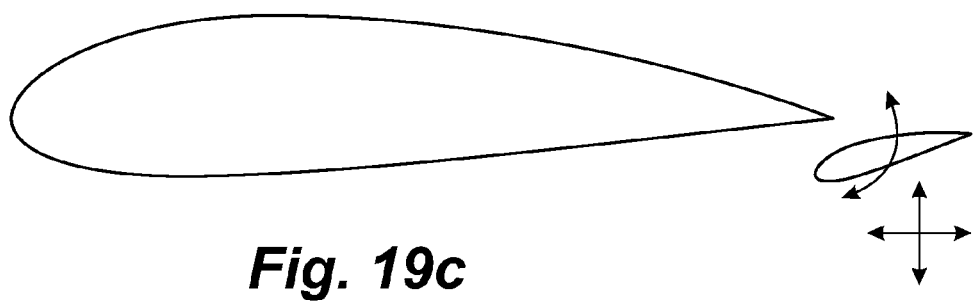
Figure 19D:
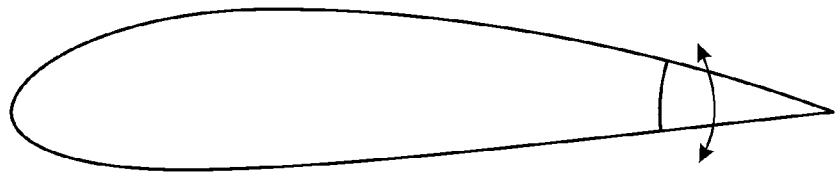
Figure 20A:
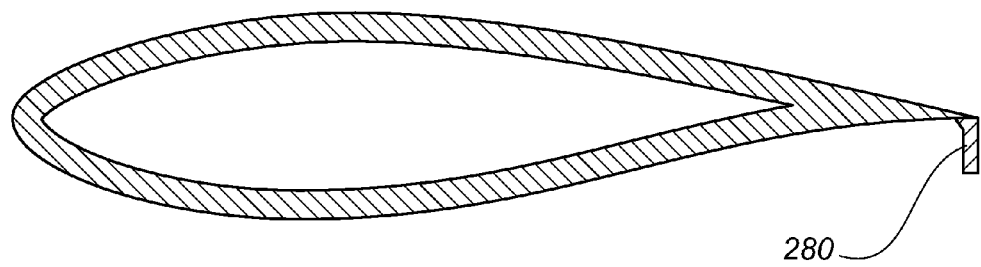
Figure 20B:
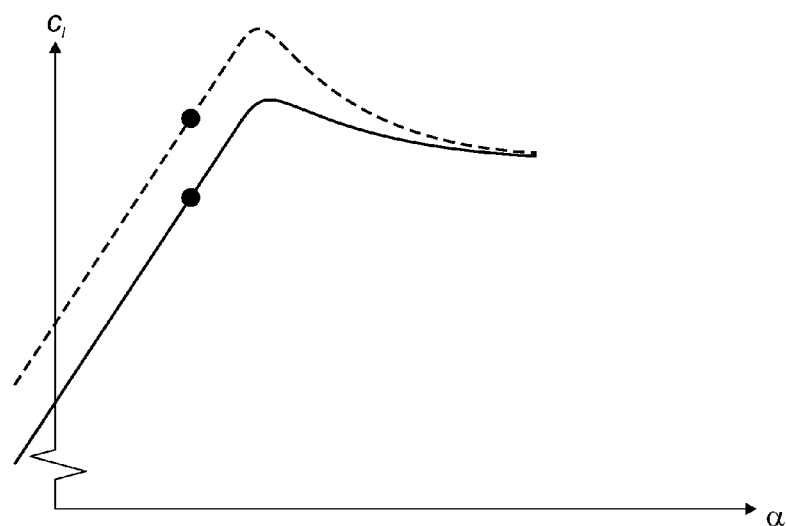
Figure 21A:
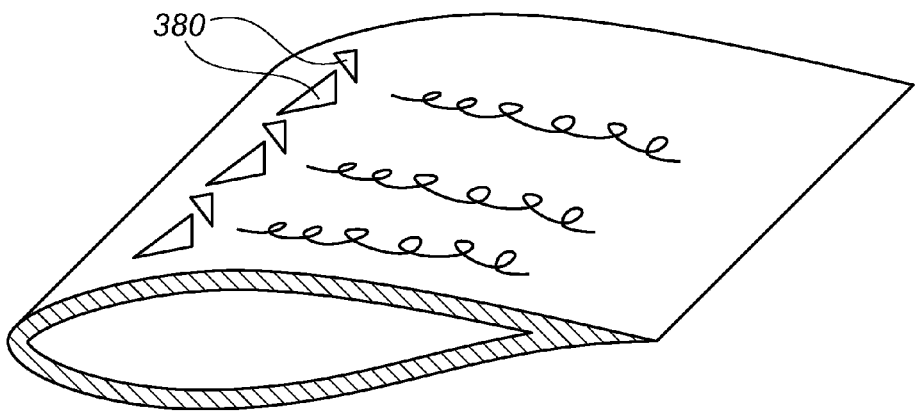
Figure 21B:
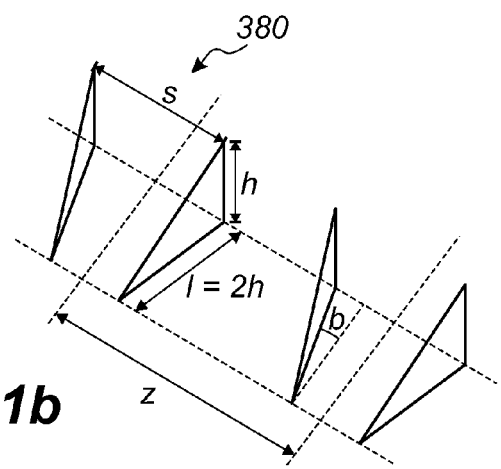
Figure 21C:
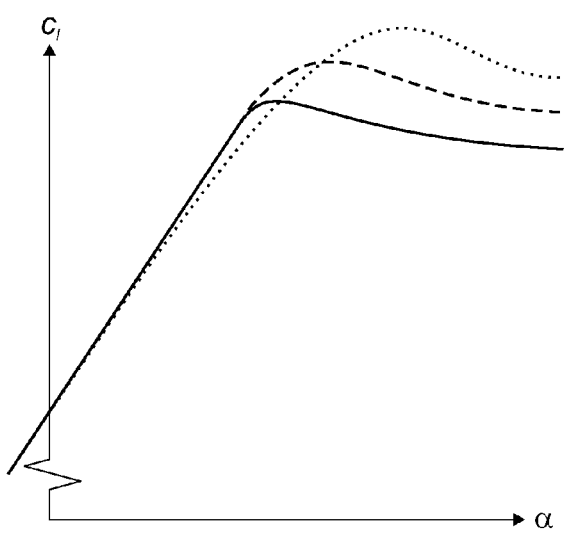
Figure 22A:
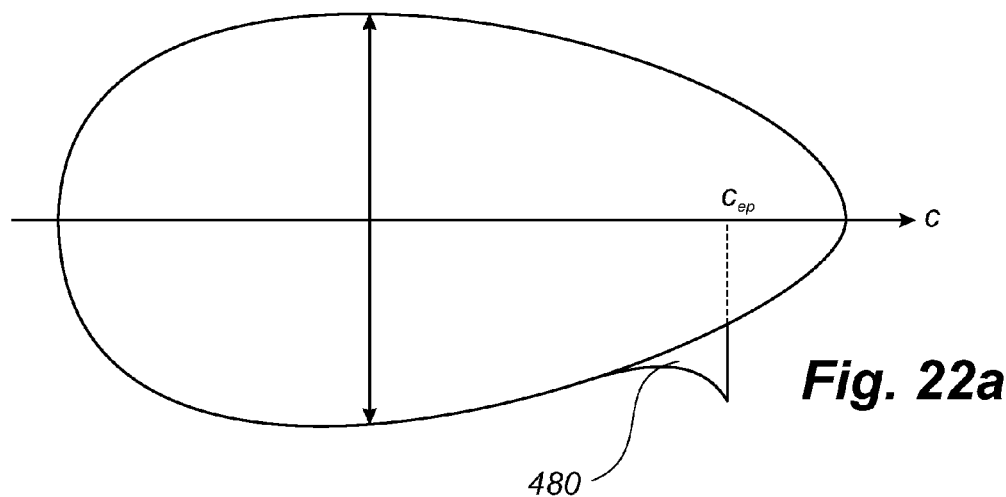
Figure 22B:
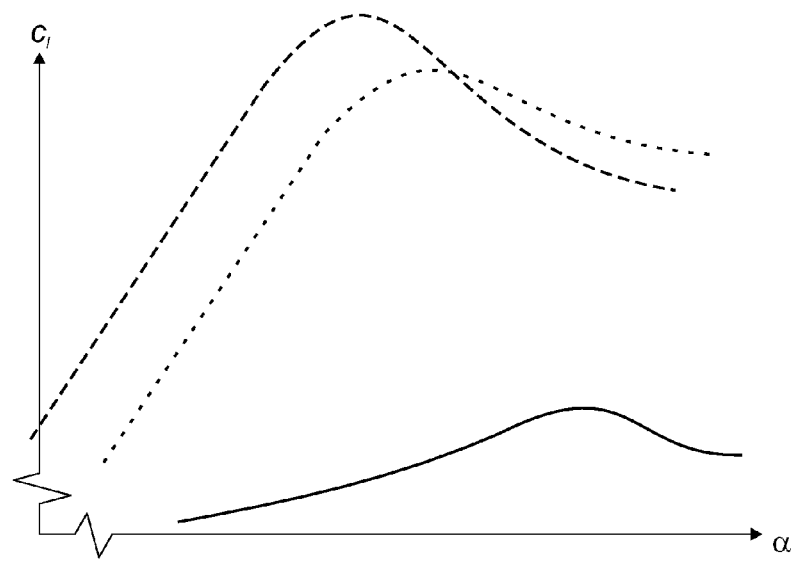
Figure 23A:
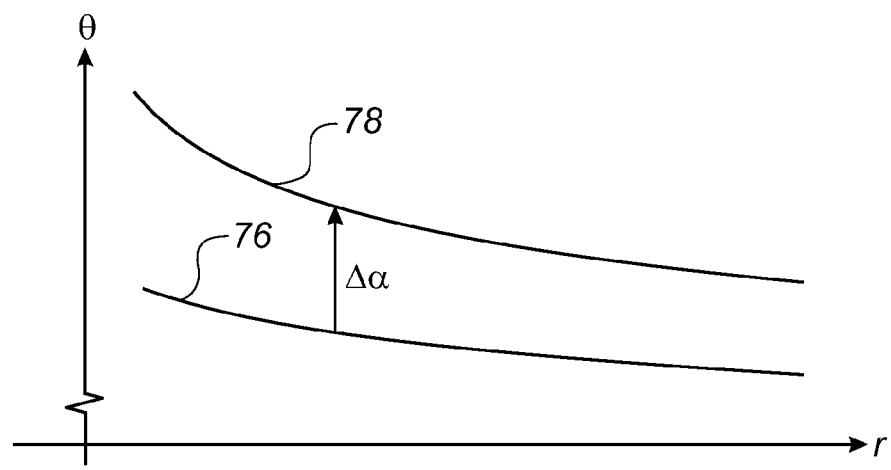
Figure 23B:
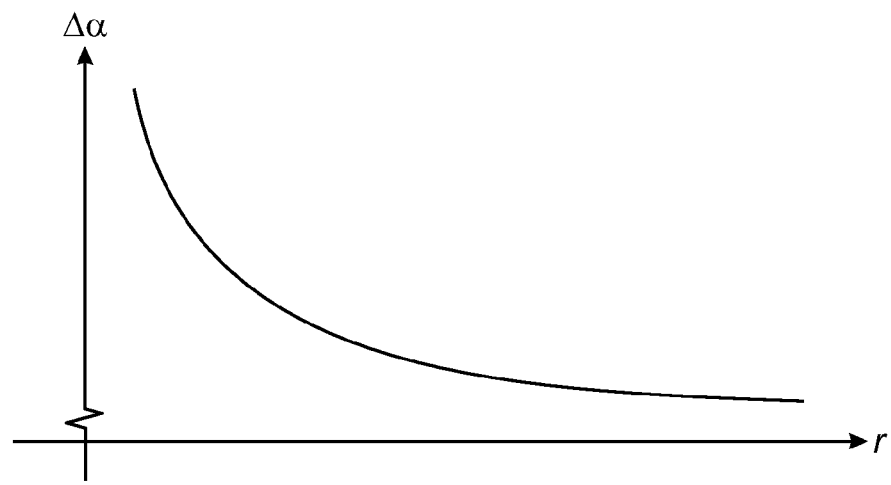
Figure 23C:
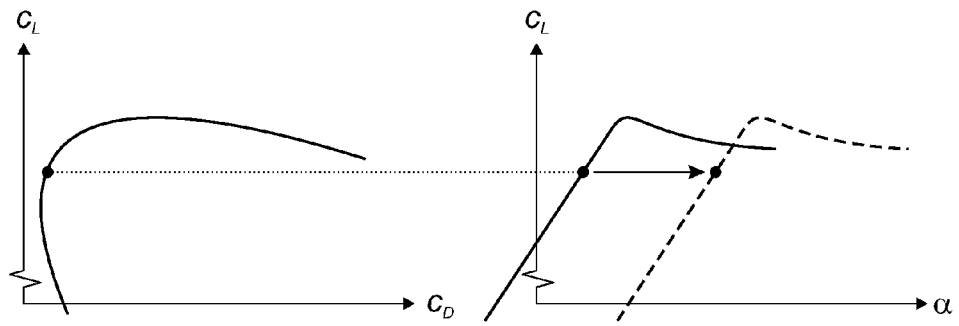
Figure 23D:
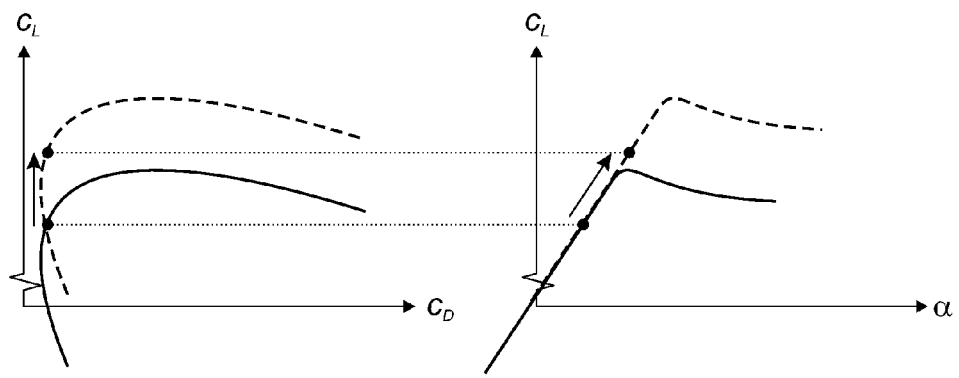

FIGS. 17a-17e show the cross-section of a blade provided with ventilation holes and the effect of using ventilation, FIGS. 18a-18c show the cross-section of a blade provided with surface mounted elements and the effect of using surface mounted elements, FIG. 19a shows the cross-sections of blades provided with multi element profiles and the effect of using such profiles, FIGS. 19b-d show different means of locating multi element profiles in relation to a blade cross section, FIGS. 20a and 20b show the cross-sections of a blade provided with a Gurney flap and the effect of using a Gurney flap, FIGS. 21a-21c show the cross-section of a blade provided with vortex generators and the effect of using vortex generators, FIGS. 22a and 22b show the cross-sections of a blade provided with a spoiler element and the effect of using a spoiler element, FIG. 23a shows graphs of the average and optimum angle of attack as a function of the radial distance from a hub, FIG. 23b shows a graph of the shift angle as a function of the radial distance from a hub, FIG. 23c shows graphs of the relationship between the drag coefficient and the lift coefficient and the relationship between the angle of attack and the lift coefficient for an outer part of a blade according to the invention, and FIG. 23d shows graphs of the relationship between the drag coefficient and the lift coefficient and the relationship between the angle of attack and the lift coefficient for an inner part of a blade according to the invention.

Figure 29:
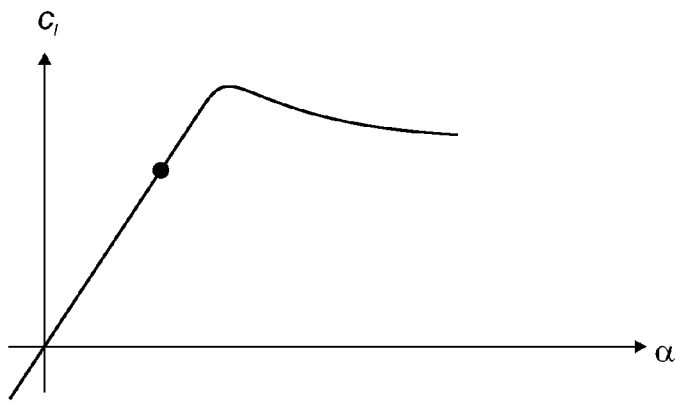
Figure 30:
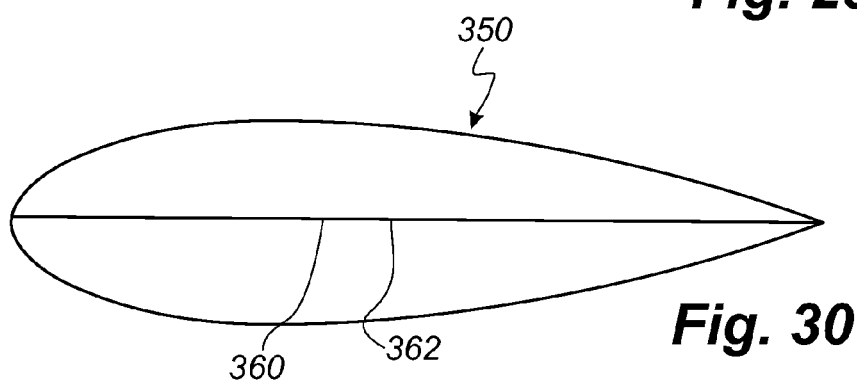
Figure 31:
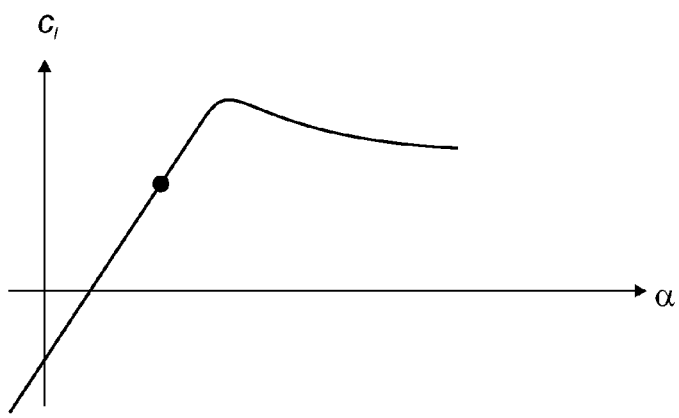
Figure 32:
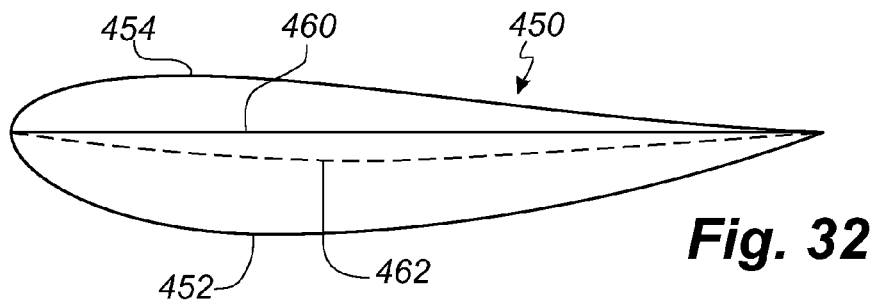
Figure 33:
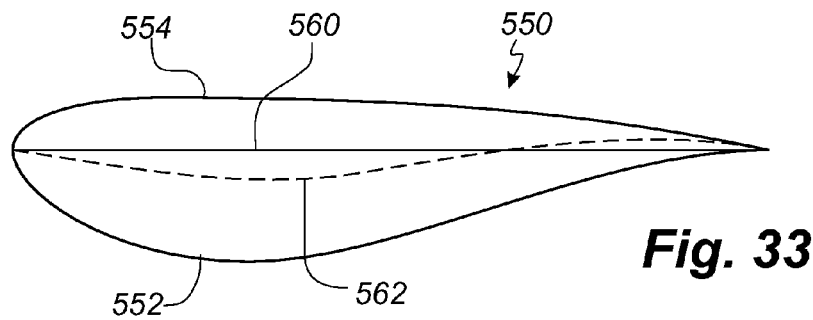
Figure 34:
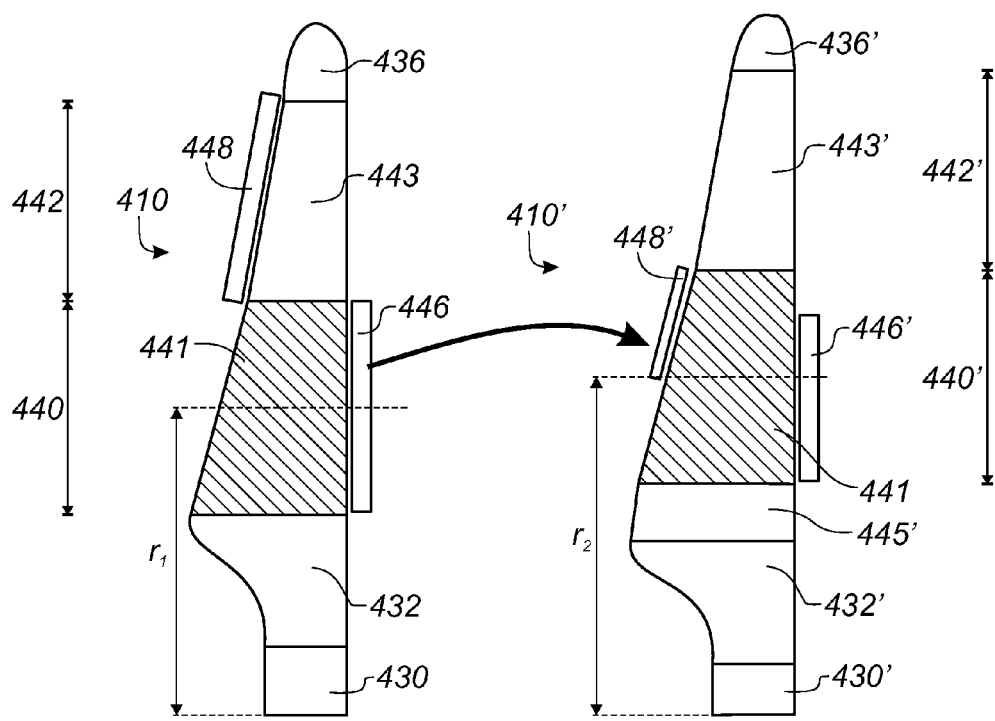
Figure 37:
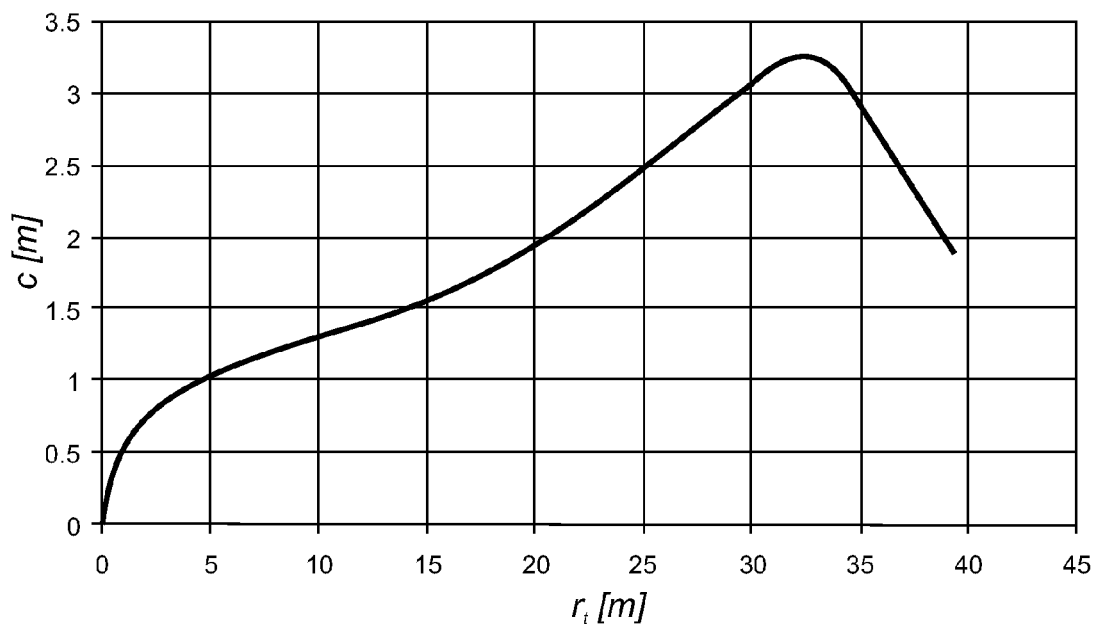
Figure 38:
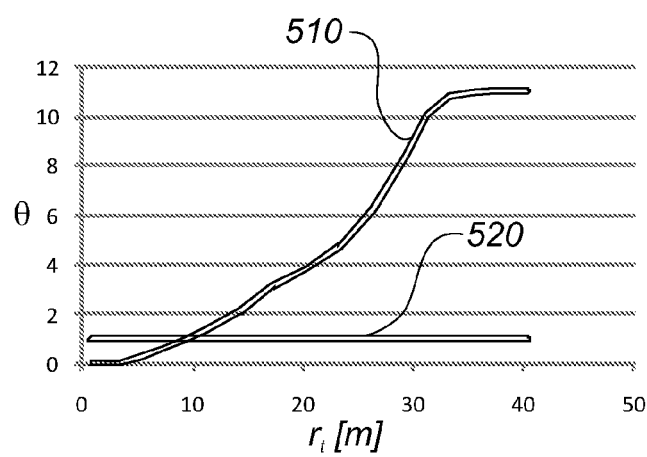
Figure 39:
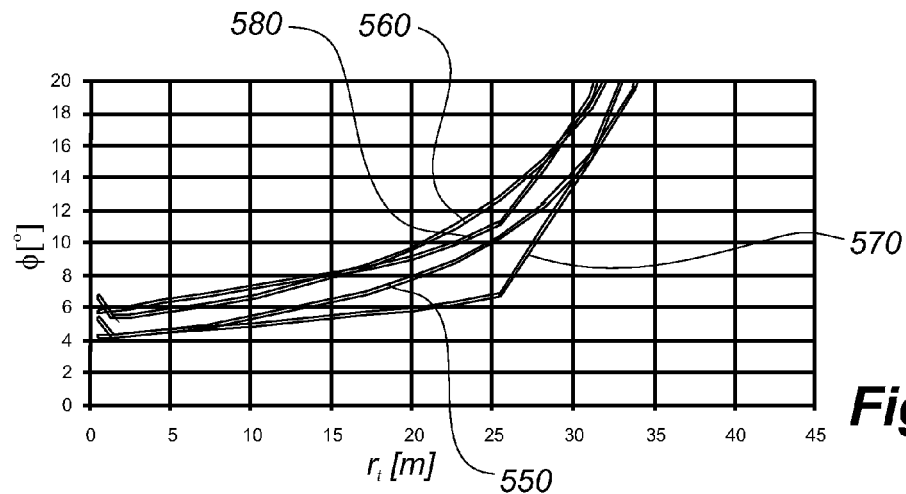
Figure 40:
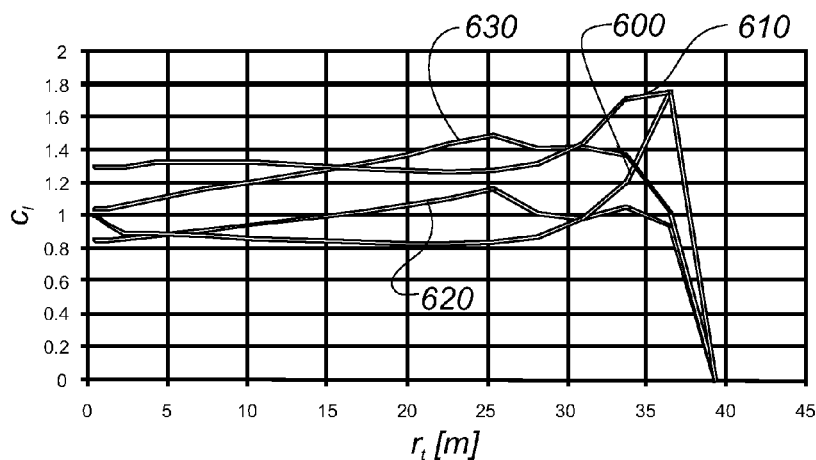
Figure 41:
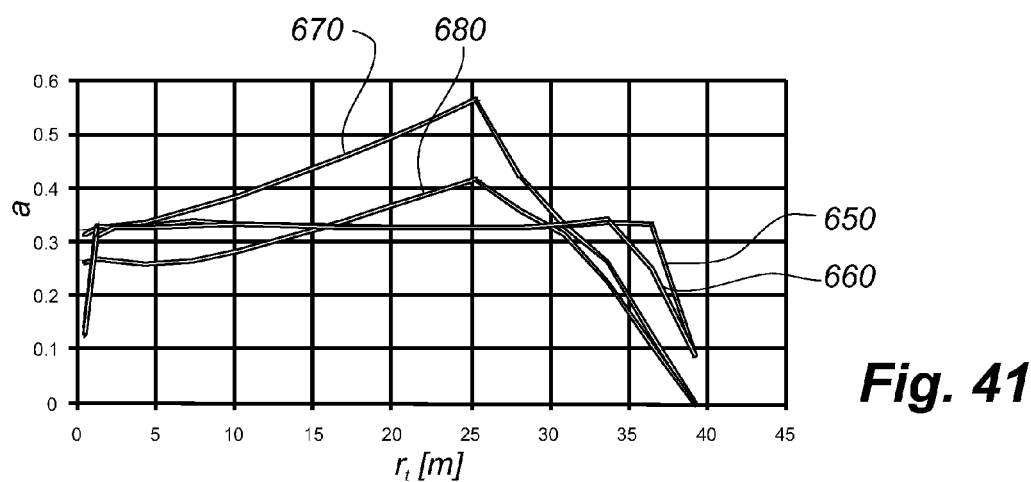
Figure 42:
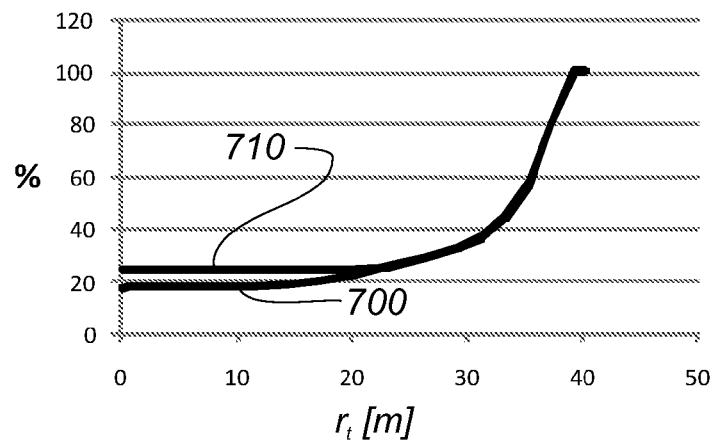
Figure 43:
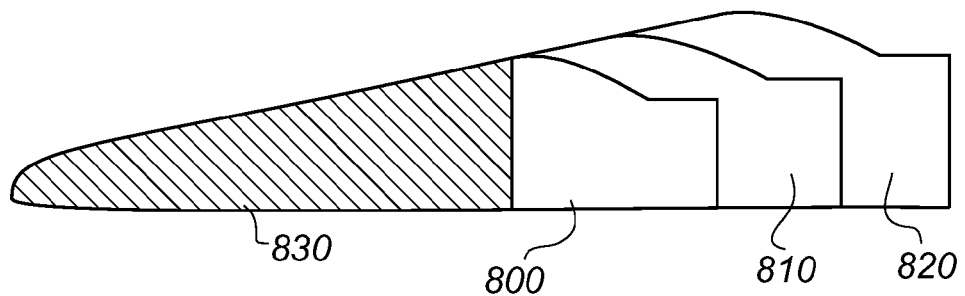
Figure 44:
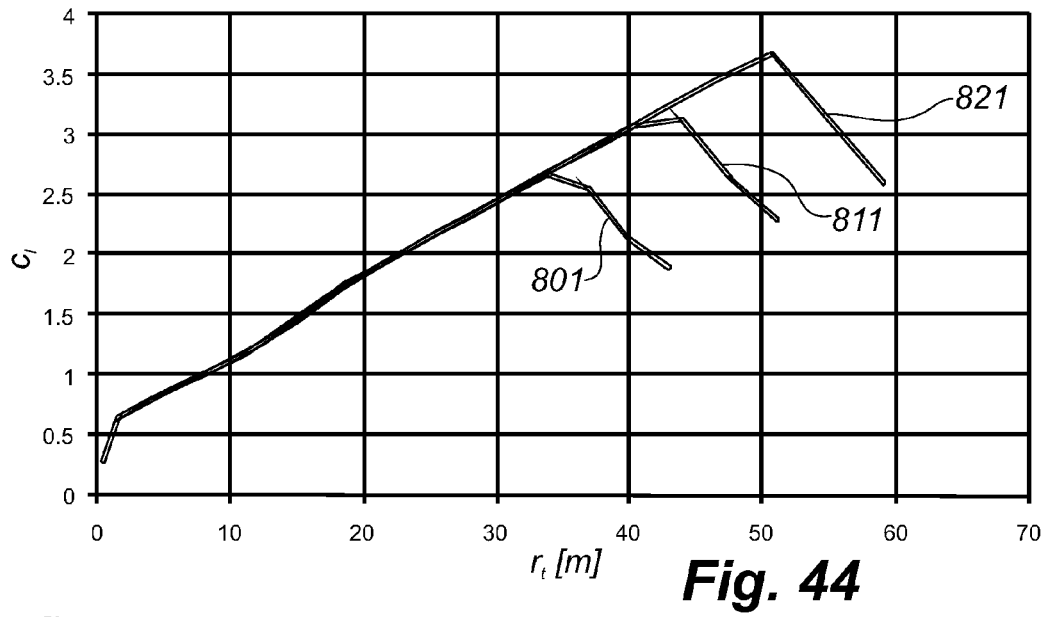
Figure 45:
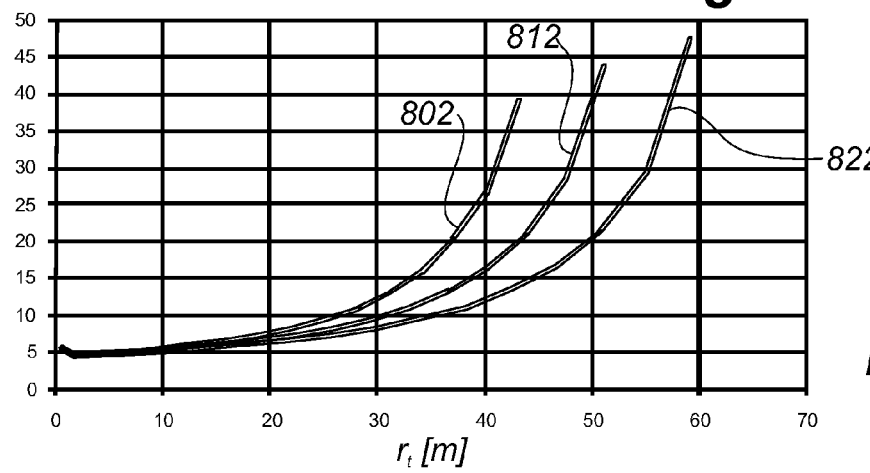
Figure 46:
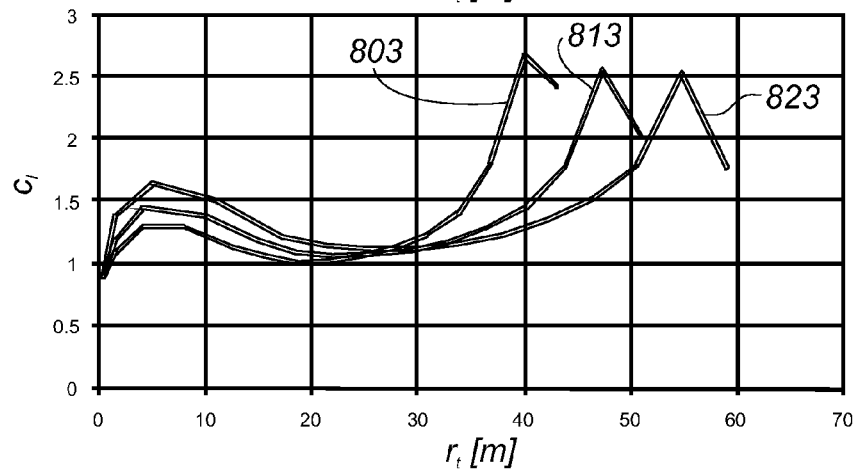
Figure 47:
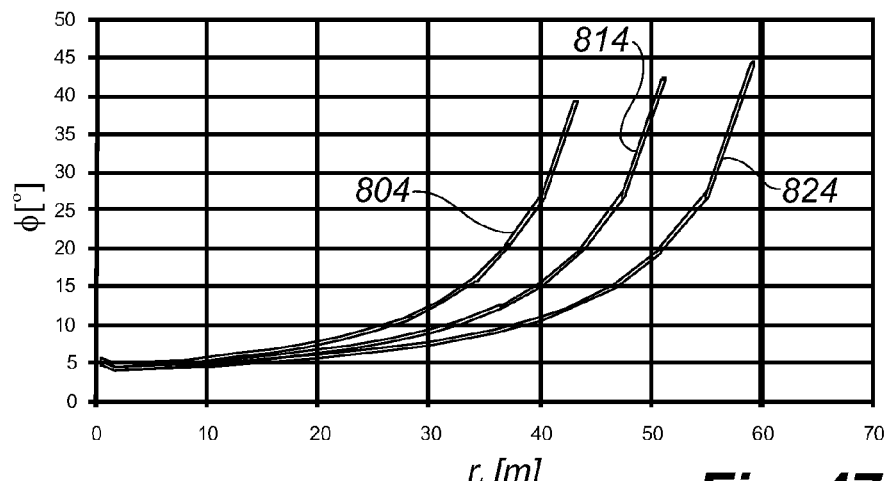
Figure 48:
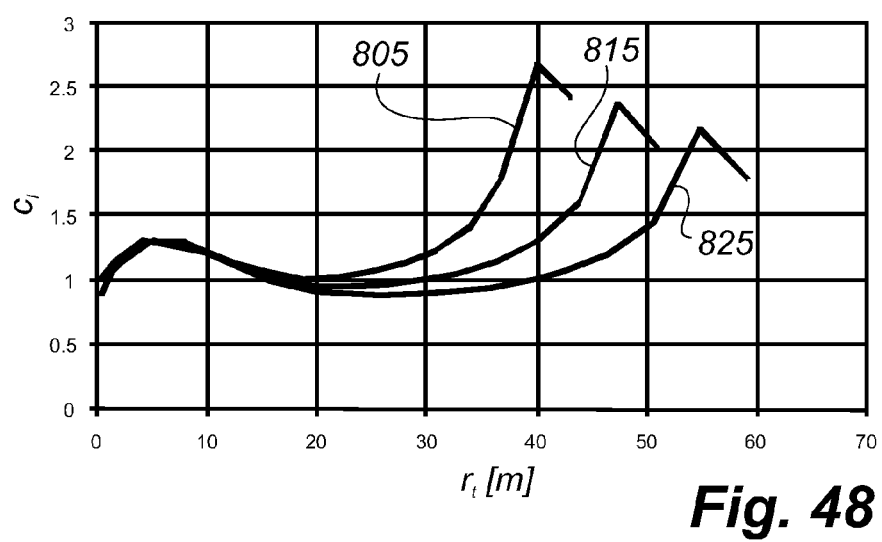
Figure 49:
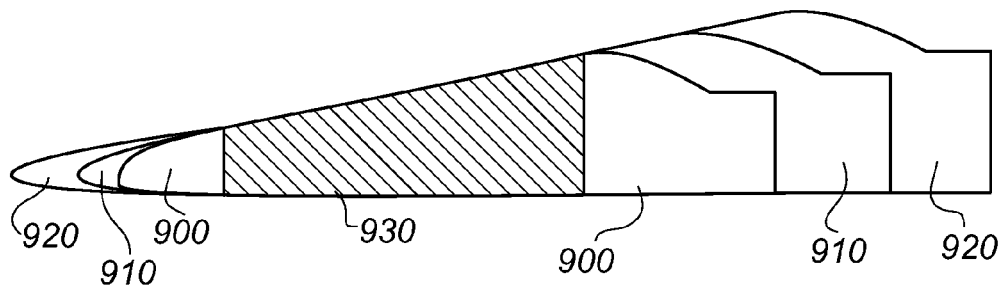
Figure 50:
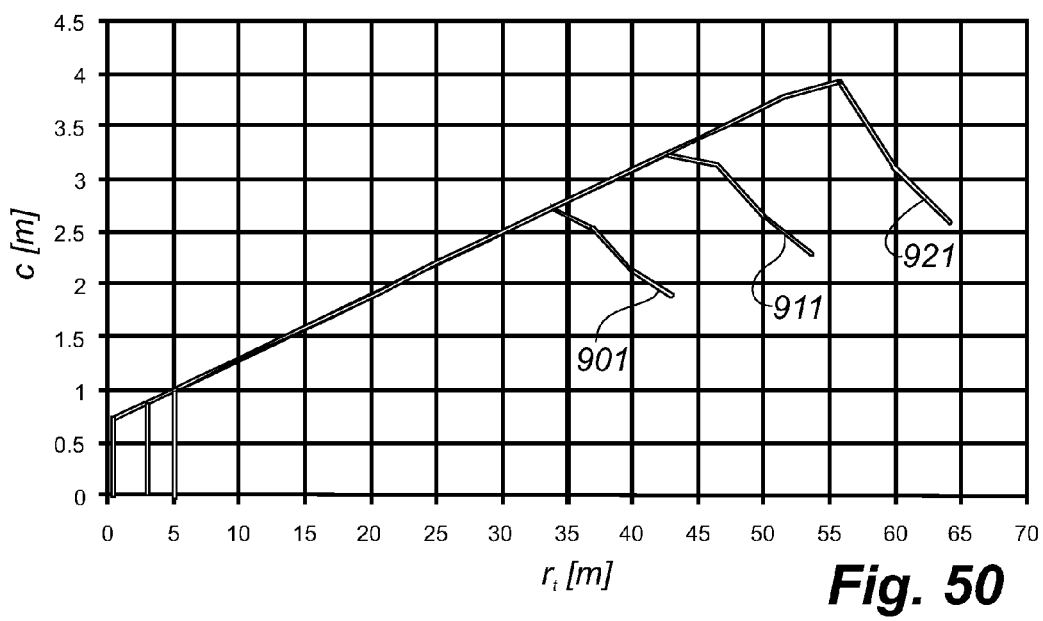
Figure 51:
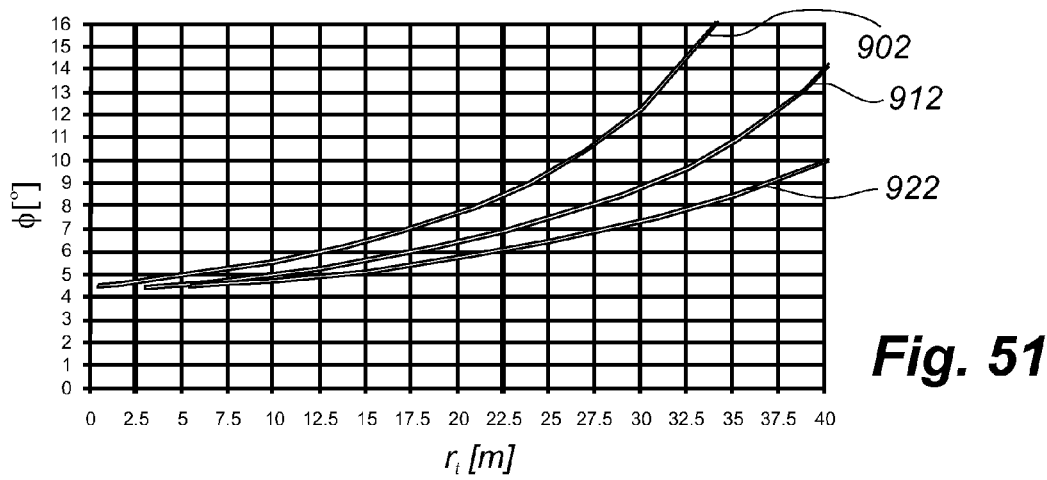
Figure 52:
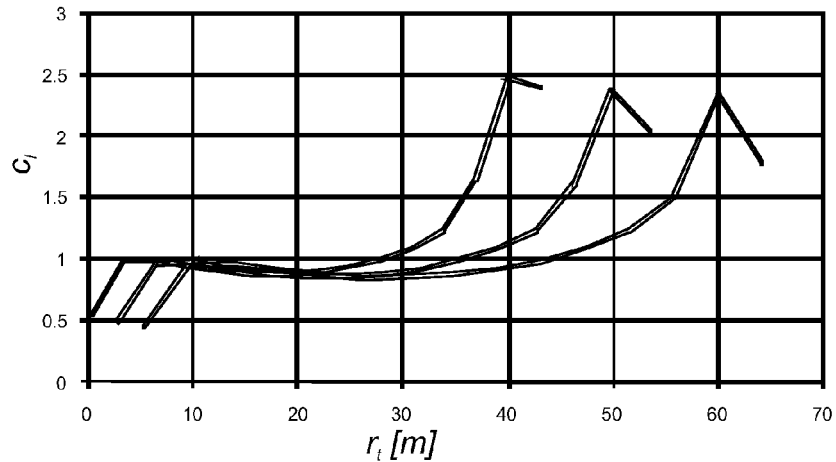

FIGS. 24a-g show graphs illustrating different embodiments of blades having linearly dependent twist and/or chord, FIG. 25 shows a fourth embodiment of a blade according to the invention, FIG. 26 shows a graph of an embodiment of a blade having a linear prebend, FIG. 27 shows a blade profile having a double curvatured pressure side, FIG. 28 shows a blade profile without a double curvature, FIG. 29 shows a graph of an embodiment of a blade having zero camber, FIG. 30 shows a symmetric blade profile, FIG. 31 shows a graph of an embodiment of a blade having a negative camber, FIG. 32 shows a first blade profile with a negative camber, FIG. 33 shows a second blade profile with a negative camber, FIG. 34 illustrates the principle of using a common blade section for two different types of wind turbine blades, FIG. 35 shows the principle of using a hub extender, FIG. 36 illustrates the principle of adjusting blade characteristics to a target value, FIG. 37 shows an example of a chord length distribution, FIG. 38 shows a comparison between the twist of a transformable blade and that of an existing blade, FIG. 39 shows graphs of the inflow angle for different blades and wind speeds, FIG. 40 shows graphs of the lift coefficient for different blades and wind speeds, FIG. 41 shows graphs of the axial induction factor for different blades and wind speeds, FIG. 42 shows graphs of the relative thickness distribution for different blades, FIG. 43 shows transformable blades having a shared outboard base part, FIG. 44 shows an example of chord length distributions for transformable blades, FIG. 45 shows graphs of the inflow angle for transformable blades, FIG. 46 shows graphs of the lift coefficient for transformable blades, FIG. 47 shows graphs of the inflow angle for other transformable blades, FIG. 48 shows graphs of the lift coefficient for other transformable blades, FIG. 49 shows an example of staggered transformable blades, FIG. 50 shows another example of chord length distributions for transformable blades, FIG. 51 shows graphs of the inflow angle for transformable blades, and FIG. 52 shows graphs of the lift coefficient for transformable blades, FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8. The rotor has a radius denoted R.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The chord length of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

It should be noted that the chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

FIG. 3 shows a schematic view of an airfoil profile 50 of a typical blade of a wind turbine depicted with the various parameters, which are typically used to define the geometrical shape of an airfoil. The airfoil profile 50 has a pressure side 52 and a suction side 54, which during use—i.e. during rotation of the rotor—normally face towards the windward (or upwind) side and the leeward (or downwind) side, respectively. The airfoil 50 has a chord 60 with a chord length c extending between a leading edge 56 and a trailing edge 58 of the blade. The airfoil 50 has a thickness t, which is defined as the distance between the pressure side 52 and the suction side 54. The thickness t of the airfoil varies along the chord 60. The deviation from a symmetrical profile is given by a camber line 62, which is a median line through the airfoil profile 50. The median line can be found by drawing inscribed circles from the leading edge 56 to the trailing edge 58. The median line follows the centres of these inscribed circles and the deviation or distance from the chord 60 is called the camber f. The asymmetry can also be defined by use of parameters called the upper camber and lower camber, which are defined as the distances from the chord 60 and the suction side 54 and pressure side 52, respectively.

Airfoil profiles are often characterised by the following parameters: the chord length c, the maximum camber f, the position $d_f$ of the maximum camber f, the maximum airfoil thickness t, which is the largest diameter of the inscribed circles along the median camber line 62, the position $d_t$ of the maximum thickness t, and a nose radius (not shown). These parameters are typically defined as ratios to the chord length c.

FIG. 4 shows a schematic view of flow velocities and aerodynamic forces at the airfoil profile 50. The airfoil profile is located at the radial position or radius r of the rotor of which the blade is part, and the profile is set to a given twist or pitch angle θ. An axial free stream velocity $v_a$, which according to theory optimally is given as ⅔ of the wind velocity $v_w$, and a tangential velocity r·ω, which is oriented in a direction of rotation 64 for the rotor, combined form a resultant velocity $v_r$. Together with the chord line 60, the resultant velocity $v_r$ defines an inflow angle, φ, from which an angle of attack α can be deducted.

When the airfoil profile 50 is impacted by an incident airflow, a lift 66 is generated perpendicular to the resultant velocity $v_r$. At the same time, the airfoil is affected by a drag 68 oriented in the direction of the resultant velocity $v_r$. Knowing the lift and drag for each radial position makes it possible to calculate the distribution of resultant aerodynamic forces 70 along the entire length of the blade. These aerodynamic forces 70 are typically divided into two components, viz. a tangential force 74 distribution (in the rotational plane of the rotor) and a thrust 72 oriented in a right angle to the tangential force 74. Further, the airfoil is affected by a moment coefficient 75.

The driving torque of the rotor can be calculated by integrating the tangential force 74 over the entire radial length of the blade. The driving torque together with the rotational velocity of the rotor provides the overall rotor power for the wind turbine. Integrating the local thrust 72 over the entire length of the blade yields the total rotor thrust, e.g. in relation to the tower.

In the following (section 1), blade design according to conventional design methods is described.

1 STATE OF THE ART BLADE DESIGN FOR WIND TURBINES

The rotor design for wind turbines of today is a compromise between aerodynamic performance and overall wind turbine design loads. Most often, the blade is designed for minimum cost of energy (COE) finding the optimum trade-off between energy yield and turbine loads. This means that the aerodynamic design cannot be looked at as an isolated problem, because it does not make sense to look isolated at maximum energy yield in the event that this may lead to excessive loading. Therefore, classical analytical or semi-analytical methods for designing the blade do not sufficiently apply.

1.1 Blade Design Parameters

The aerodynamic design of new blade for a rotor directly involves the following overall rotor radius, R, and the number of blades, B.

The overall blade planform, which is described via the following parameters in FIG. 3 and FIG. 4: the chord length, c, twist, Θ and thickness t relative to chord c. These should all be determined as a function of the local blade radius r.

The location of the pitch axis versus blade radius may be defined as x/c(r) and y/c(r), i.e. back-sweep and pre-bending. When the blade is mounted on the rotor, the pre-bending is a pre-deflection of the blade in the direction perpendicular to the rotor plane. The purpose of pre-bending is to prevent the blade from hitting the tower when the blade is deflected during operation. The prescribed back-sweep allows the placement of the airfoil sections along the length axis of the blade, which influences the section loads throughout the blade.

One important key element in state of the art aerodynamic rotor design methods is the use of pre-designed airfoils. Airfoils are selected for blade stations along the blade radius. The parameters describing each airfoil section are shown in FIG. 4: The lift coefficient 66, $c_l$, the drag coefficient 68, $c_d$, the moment coefficient 75, $c_m$. For individual blade stations, these airfoil characteristics are all described versus the angle of attack, α, which is then determined by the overall blade inflow angle for every section.

The large operational range for wind turbine rotors and the need for robust and reliable aerodynamic characteristics in all terrain conditions make wind turbine airfoils differ from traditional aviation and glider airfoils.

1.2 Control Strategy

As the receptor of the power and most of the loading, the blades on the wind turbine rotor are very important components in the wind turbine system design. Wind turbine blades are therefore designed with close knowledge of the wind turbine control strategy. The control strategy defines how the rotor power is optimized and controlled for different wind speeds.

Three fundamentally different control schemes exist:
1. Variable rotor speed where the design target point of the rotor may be obtained for the wind speeds where the rotor speed is variable. Usually blade pitch is kept constant.
2. Constant rotor speed with variable blade pitch. Here the design target point of the rotor is approached as much as possible by adjusting the blade pitch.
3. Constant rotor speed and constant blade pitch. Here the design target point of the rotor can only be met at a single wind speed.

FIGS. 6a-6c show the power characteristics for a typical variable speed and pitch controlled (PRVS) wind turbine:

FIG. 6a shows a typical power curve versus wind speed. At low wind speeds, the power increases with the wind speed until the rated power is reached. There are two important wind speed regions, viz. a power optimisation region and a power control region. Power is optimized in the region, where the wind velocity is lower than a threshold value illustrated by the dashed line in FIG. 6, whereas the power control region is found in the region, where the power is constant at higher wind velocities. During the power optimisation region, the rotor design target point is tracked by varying either blade tip pitch or rotor speed. This is done to maximize power and thereby energy yield.

FIGS. 6b and 6c show the control parameters that govern the wind turbine blade design: FIG. 6b shows the rotor speed, Ω, versus wind speed and FIG. 6c shows the blade tip pitch angle, Θ. The rotor speed has a minimum value at low wind speeds and when optimum power is tracked until rated power this corresponds to a linear increase in rotor speed with wind speed. When reaching a given maximum value for the rotor speed, this is then kept constant during power control. The blade pitch is typically kept constant during power optimization and is then increasing with wind speed during power control to prevent the power from exceeding the rated value.

During the power control region, for most turbines the power is kept close to the drive train rated power by adjusting the blade pitch angle either so that the blade goes into stall or oppositely towards less loading. Some turbines have stall control, where blade pitch is kept constant. Here the rated power value is obtained by letting parts of the blade go into stall passively by design.

1.3 Rotor Design Target Point

Independently on the type of power optimisation, a wind turbine blade is designed for operation at one design target point. For variable rotor speed and/or variable blade pitch, operation at the design target point may be obtained within a wind speed range, whereas for a stall controlled rotor, operation at the design target point appears only at a single wind speed.

The rotor design target point is characterised by the corresponding design tip speed ratio, defined as the ratio between the tip speed and the wind speed, $X=r\cdot\Omega/V$, where $\Omega$ is the rotational speed of the rotor. At the design target point, the rotor power coefficient is maximum compared to operating points away from the design target point.

The rotor design point may be seen as an average over the entire longitudinal extent of the first longitudinal segment, or it may be seen as an individual target for a plurality of smaller radial segments within the first longitudinal segment. Yet again, it may be seen as an individual target for each cross-section of the first longitudinal segment of the blade.

When the rotor design target point is determined and the turbine control strategy is settled, airfoils are selected and the rotor radius and number of blades are decided upon. The parameters that are left are then the local chord, twist and thickness versus blade radius plus the local section design target point. These are then found by optimizing the rotor design target point performance taking into account loads and cost of energy. The rotor power coefficient at the design target point is therefore not necessarily the optimum achievable value, but for a given rotor there will always exist one design target point.

1.4 Local Section Design Target Point

The local section design target point is defined from the velocity triangle for the given section as shown in FIG. 7. Here, the resulting velocity, W, is composed by the axial flow speed, $V(1-a)$, and the tangential flow speed, $r\cdot\Omega(1+a')$. The tangent to the overall flow angle, $\phi$, is equal to the ratio between the axial component and the tangential component. The axial induction factor, a, expresses the percentage reduction of the free flow speed at the rotor plane. The tangential induction factor expresses the percentage rotation of the rotor wake in the rotor plane caused by the rotor. The overall flow angle, $\phi$, is again composed by the local twist angle, $\Theta$, and the local angle of attack, $\alpha$, as shown in FIG. 4.

When knowing the local chord c, and local twist $\Theta$ as well as the airfoil section force coefficients versus the local angle of attack $\alpha$, it is possible to use the so called blade element momentum method (BEM) to solve for the equilibrium between the overall gross flow through the rotor annulus covered by the blade section and the local forces on each of the blades. The resulting normal force perpendicular to the rotor plane and the tangential force parallel to the rotor plane may be calculated. Through this calculation procedure, the induction factors are determined and when operating at the rotor design target point, the induction factor is then denoted as the target induction factor.

Vice versa, if deciding on the target induction factor it is possible to derive the local chord and twist when knowing the airfoil section. In the event of designing the local section for optimum aerodynamic performance, it can be shown that the optimum axial induction factor approaches ⅓ for high values of the tip speed ratio, whereas the tangential induction factor approaches zero.

A simple method exists for determining the exact optimum induction and thereafter local chord and twist for optimum aerodynamic performance. An example of such a method is the method by Glauert published with the BEM method (Glauert, H. Airplane propellers in Aerodynamic Theory ed. Durand, W. F. Dower Publications, Inc. New York).

1.5 Classical Aerodynamic Blade Design

The classical blade element momentum (BEM) theory by Glauert allows solving the rotor flow by simple means by establishing the equilibrium between the overall flow through the rotor disc and the local flow around the airfoils on the blades by dividing the rotor disk into annular stream tubes. If drag is neglected a simple expression can then be found for the optimum rotor:

$$\frac{B}{R}X(cC_l) = 8\pi x \frac{a}{1-a}\frac{\sin^2\Phi}{\cos\Phi},$$

where as previously mentioned, $x=\Omega\cdot r/V$ is the tip speed ratio, V is the design point wind speed, X is the tip speed based on R and $\Phi$ is the local inflow angle, and a is the axial induction.

When defining an aerodynamic blade shape the first step is to choose the number of blades and the design tip speed ratio. The ideal rotor loading defined as the chord length multiplied by the lift coefficient ($c\cdot c_l$) and the inflow angle, $\Phi$, can then be found versus radius. On basis of the ideal rotor loading, the target loading may be decided on taking into account loads and practical limitations.

Next, selecting the airfoils for the individual blade sections and knowing the flow angle makes it possible to decide the blade twist. This is commonly chosen so that the airfoil lift-to-drag ratio is optimal on as large a part of the blade as possible to maximize the rotor power coefficient. The blade operating lift coefficient $c_{l,o}$ is then typically the airfoil design lift coefficient $c_{ld}$ and the chord can then be derived from the target loading. However on parts of the blade there will be a difference between the blade operating lift coefficient $c_{l,o}$ versus the airfoil design lift coefficient $c_{ld}$ due to considerations on loads, manufacture, etc. When there is a difference, the operating lift coefficient will not lead to optimum lift-to-drag as indicated in FIG. 16 and the operating angle of attack, $\alpha_o$ will not be equal to the airfoil design angle of attack, $\alpha_d$.

The blade thickness is chosen as a compromise between structural and aerodynamic considerations, since higher thickness favours the blade structure at the expense of degeneration of the airfoil lift-drag ratio.

The BEM method also reveals that an axial induction of ⅓ unfortunately is associated with a high thrust force on the rotor and that thrust and thereby loads can be reduced significantly with only little reduction in rotor power. This is because designing for the aerodynamic optimum in a single point does not take into account off-design operation nor loads and thereby minimum cost of energy. To reduce loads the axial induction is often reduced compared to the optimum value of ⅓. On the other hand when including also off-design operation in the design problem, such as operation close to power control, there may be a required minimum value for the target induction factor to prevent premature stall on the blades leading to unnecessary noise and power loss. Hence, for a modern rotor the target induction factor is not necessarily identical to the aerodynamic optimum induction and there is not a single optimum for the target induction versus blade radius, since such an optimum depends on numerous factors.

In FIGS. 8a and 8b the ideal values (dashed lines) for loading ($c\cdot C_l$) and inflow angle, $\Phi$, are shown together with the real target values (full drawn lines) for inflow and loading of a typical wind turbine blade. It can be seen that there is a nearby match between the two curves over a large part of the blade but that there are also discrepancies. It is seen that the target value especially deviates from the ideal values for low values of r, i.e. near the blade root. This is mainly due to structural considerations as explained in relation to FIGS. 2 and 5. Furthermore, it appears clearly from FIG. 8*a* and FIG. 8*b* that since loading and inflow angle varies non-linearly with blade radius, this will also be the case for both the chord and twist—not only for the ideal blade but also for a typical commercial blade.

1.6 Blade Regions

In accordance with blade design, a blade may be divided into four different regions as shown in FIGS. 2 and 5:
1. The blade root region 30 next to the hub, which is predominantly circular.
2. The transition region 32 between the blade root region and the remaining blade part.
3. An airfoil shaped part 34', which is the main part of the blade. Typically the airfoil shaped part extends from the area of the blade with maximum chord and towards the blade tip part.
4. A blade tip part 36—usually less than the outer 10% of the blade.

The blade root region 30 is the interface from the blade to the blade bearing and the hub, and therefore this region has to end in a circular flange. The design is therefore mainly structural. The blade chord and thickness in this region correspond to the root flange diameter and the twist cannot be defined in this region. Due to the poor aerodynamic characteristics of a circular section, the resulting normal force component will be significantly too small to balance the rotor flow, the induction will be too small and the inflow angle will be too high leading to a poor local power coefficient.

The transition region 32 is formed by the morphing from the airfoil shaped part 34' to the blade root region 30. Chord, twist and thickness morph to their respective values at the beginning of the airfoil shaped part 34'. Note that the morphing is not necessarily linearly dependent on blade radius. In this region, the clean sectional characteristics are poor due to the high relative thickness and the local chord is not sufficiently high to obtain the right normal force component. However, this may be altered if flow control is used to achieve the right combination of the normal force component and local inflow to yield maximum possible power coefficient.

The airfoil shaped part 34' is designed primarily from aerodynamic reasons, opposed to the other regions 30, 32, 36. The airfoil shaped part 34' is the largest part of the blade and it is this part, which is mainly responsible for both the rotor power and the turbine loads. This region is designed with near-optimum blade aerodynamics taking into account off-design operation and loads.

The blade tip part 36 is the very tip region, which is designed mainly for noise and load concerns and the optimum values of chord and twist may therefore be deviated from. The chord and thickness go to zero towards the blade tip, whereas the twist ends at a finite value.

1.7 Summary

Traditionally modern wind turbine blades are designed by initially designing the outer shape and the aerodynamic performance of the blade itself in order to obtain the target loading and target axial induction for each radial section of the airfoil section of the blade. First afterwards, it is determined how to plan the manufacturing in accordance with the design specification for the blade.

2 TRANSFORMABLE BLADES

The present invention provides a departure from the traditional process of designing modern wind turbine blades. The invention provides a new design process, in which the production is optimised in relation to effective methods of manufacturing a base part or main blade part of a wind turbine blade, and where the base part of the blade is retrofitted with flow guiding devices in order to obtain the proper aerodynamic specifications, i.e. to obtain the target axial induction factor and loading for each radial section. Thus, the base part of the blade may deviate substantially from the target design point and the optimum aerodynamic design.

The invention primarily relates to a different design of the airfoil shaped part 34' of the blade, see FIG. 5. In the following, blades according to the invention will sometimes be referred to as transformable blades.

FIG. 9 shows a first embodiment of a wind turbine blade according to the invention. Similar to the conventional method of designing a wind turbine blade, the blade is divided into a root region 130, a transition region 132, and an airfoil region 134. The airfoil region comprises a blade tip part 136 and a first longitudinal section 140 of the blade. The first longitudinal section of the blade is divided into a first base part 141 and a number of flow altering devices 146-149. The first base part 141 has a profile, which has a simplified structure with respect to for instance modularity of blade parts and/or manufacturing of the first base part 141, and which at the rotor design point in itself deviates substantially from the target axial induction factor and/or the target loading. Therefore, the first longitudinal section 140 is provided with the flow altering devices, which are here depicted as a first slat 146 and a second slat 147, as well as a first flap 148 and a second flap 149. Although the use of such flow altering devices is highly advantageous in order to obtain the target axial induction factor and the target loading, the invention is not restricted to such flow altering devices only. The first longitudinal section 140 extends along at least 20% of the longitudinal length of the airfoil region 134.

Further, the blade may be provided with flow altering devices arranged at the transition region 132 and possibly the root region 130 of the blade, here depicted as a slat 133.

In the first embodiment, the airfoil shaped part of the airfoil region is replaced by a single longitudinal section comprising a base part and flow altering devices. However, the airfoil shaped part may be divided into additional longitudinal sections as shown in FIGS. 10 and 11.

FIG. 10 shows a second embodiment of a wind turbine blade according to the invention. Similar to the conventional method of designing a wind turbine blade, the blade is divided into a root region 230, a transition region 232, and an airfoil region 234. The airfoil region comprises a blade tip part 236, a first longitudinal section 240, and a second longitudinal section 242. The first longitudinal section 240 of the blade is divided into a first base part 241 and a number of first flow altering devices 246. The second longitudinal section 242 of the blade is divided into a second base part 243 and a number of second flow altering devices 248. The first base part 241 and the second base part 243 have profiles, which have a simplified structure with respect to for instance modularity of blade parts and/or manufacturing of the base parts 241, 243, and which at the rotor design point in itself deviates substantially from the target axial induction factor and/or the target loading. Therefore, the longitudinal sections are provided with the flow altering devices, which are here depicted as a first slat 246 and a first flap 248, however; the flow altering devices are not restricted to such flow altering devices only. The first longitudinal section 240 and the second longitudinal section 242 both extend along at least 20% of the longitudinal length of the airfoil region 234.

Further, the blade may be provided with flow altering devices arranged at the transition region 232 and possibly the root region 230 of the blade, here depicted as a slat 233.

FIG. 11 shows a third embodiment of a wind turbine blade according to the invention, wherein like reference numerals refer to like parts of the second embodiment shown in FIG. 10. Therefore, only the difference between the two figures is explained. The third embodiment differs from the second embodiment in that the airfoil region 334 further comprises a transition section 344 arranged between the first longitudinal section 340 and the second longitudinal section 342. The transition section 344 comprises a transition base part 345, which is formed by morphing from the end profiles of the first base part 341 and second base part 343, respectively. Accordingly, the transition base part 345 also has a profile shape, which at the rotor design point in itself deviates substantially from the target axial induction factor and/or the target loading. Consequently, the transition section 344 is also provided with a number of flow altering devices 346, 348.

Further, the blade may be provided with flow altering devices arranged at the transition region 332 and possibly the root region 330 of the blade, here depicted as a slat 333.

It will be apparent from the later description that the embodiments shown in FIGS. 9-11 also may be provided with surface mounted elements, vortex generators and the like.

2.1 Local Sub-Optimum Twist and/or Chord Length

When designing transformable blades having simplified base parts, two profile characteristics of the base parts will typically differ locally from the optimum target condition, viz. the local blade twist and thereby the inflow angle at the rotor design point, and the local chord length.

Figure 12A:
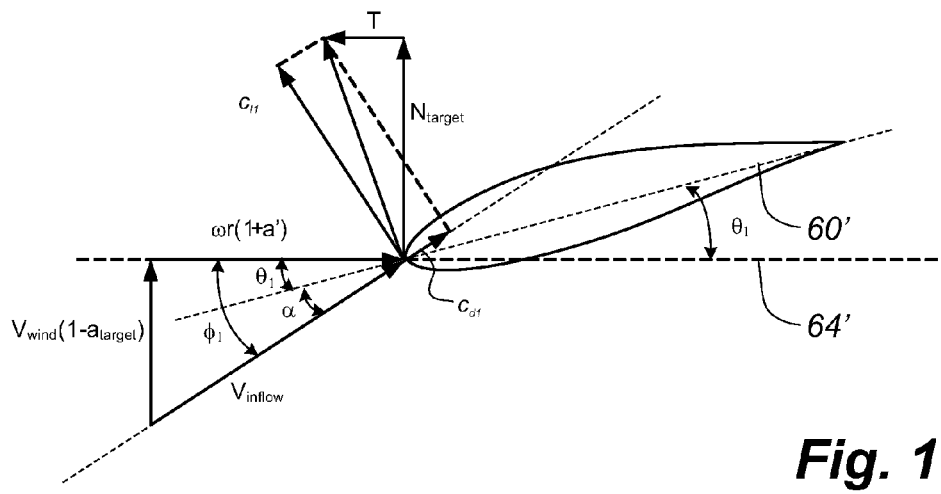

FIG. 12 shows a first situation illustrating the above mentioned deviation. As explained in section 1.4, the local section design target point is defined from the velocity vector triangle, where the resulting velocity $v_{inflow}$ is composed by the axial flow speed, $V_{wind}(1-a_{target})$, and the tangential flow speed, $r \cdot \omega(1+a')$, see also FIG. 12a. This condition is only met at the rotor design point, when the inflow angle is $\Phi_1$. At the rotor design point, the local section has an operational lift coefficient $c_l$ and an operational drag coefficient $c_d$. The resultant aerodynamic forces may as previously explained be divided into a tangential force T, which is oriented in the rotational plane of the rotor and a loading or thrust, which is the normal force $N_{target}$ oriented normally to the rotor plane 64'.

For the given profile of the section having a given local chord length c, the target conditions for achieving the target axial induction factor $a_{target}$ and the target normal load $N_{target}$ for the local blade profile at the rotor design point is met only, when the local twist angle is equal to a target twist $\theta_1$ and the angle of attack is equal to $\alpha_1$.

Figure 12B:
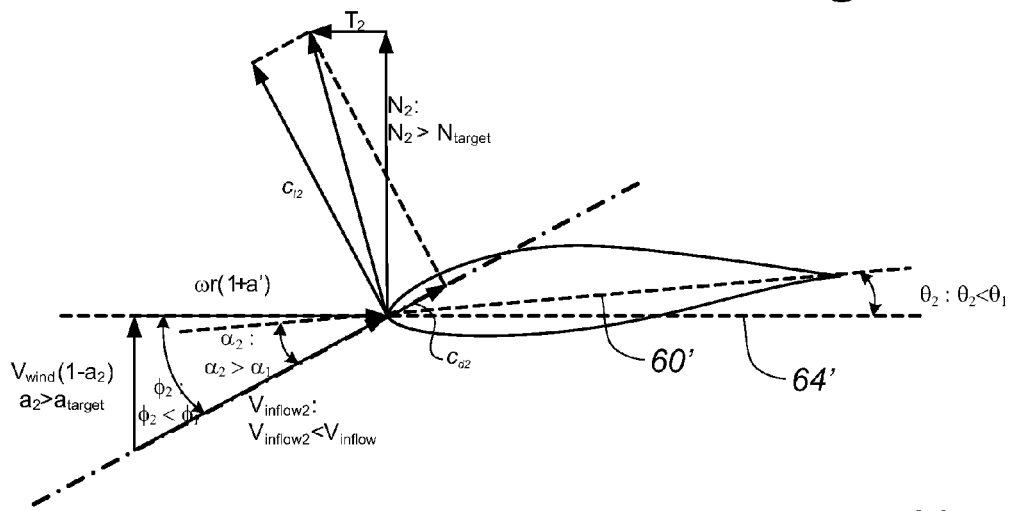

However, the local blade profile for the base part has an actual twist $\theta_2$, which is lower than the target twist $\theta_1$. Consequently, the inflow angle is shifted to an altered angle $\Phi_2$, which is lower than $\Phi_1$. Furthermore, the angle of attack is changed to an altered angle of attack $\alpha_2$, which is larger than $\alpha_1$. Consequently, the two shown vector triangles are as shown in FIG. 12b shifted and the blade section obtains an inflow condition having an altered resultant velocity vector $v_{inflow2}$, at which an actual axial induction factor $a_2$ becomes larger than the target axial induction factor $a_{target}$. Further, the lift coefficient is shifted to an altered lift coefficient $c_{l2}$, and an altered drag coefficient $c_{d2}$. Consequently, the normal load is shifted to an actual normal load $N_2$, which is larger than the target normal load $N_{target}$. Consequently flow altering devices are needed in order compensate for the altered inflow conditions and normal load.

Figure 12C:
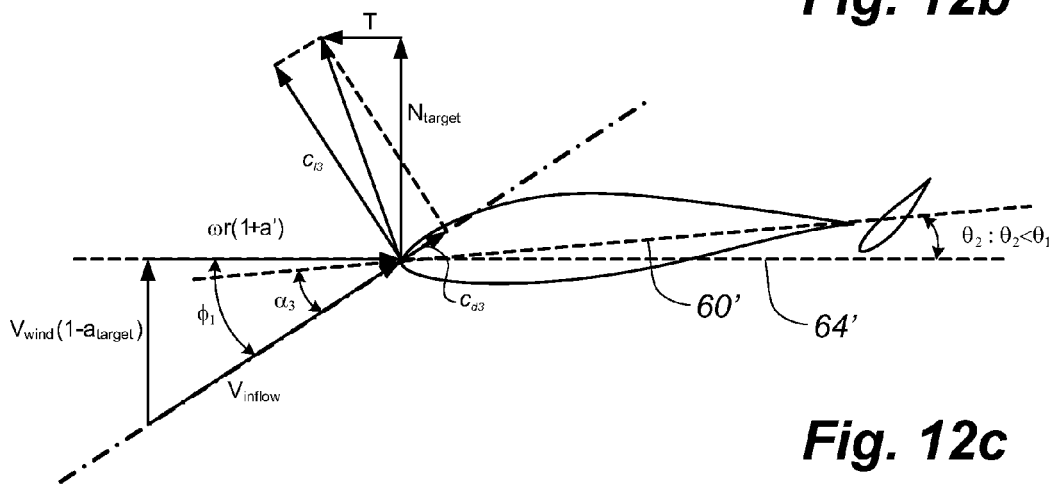

In order to obtain the target axial induction factor $a_{target}$, the inflow angle must be shifted back to $\Phi_1$ as shown in FIG. 12c. Consequently, the compensated angle of attack must equal $\alpha_3=\Phi_1-\theta_2$. At this angle of attack, the flow altering devices (here depicted as a flap) must alter the drag coefficient and lift coefficient to altered values $c_{d3}$ and $c_{l3}$, at which the resultant normal load becomes equal to the target normal load $N_{target}$. Thus, the flow altering devices are used to reduce the axial induction factor from $a_2$ to $a_{target}$, and reduce the load from $N_2$ to $N_{target}$.

Figure 13A:
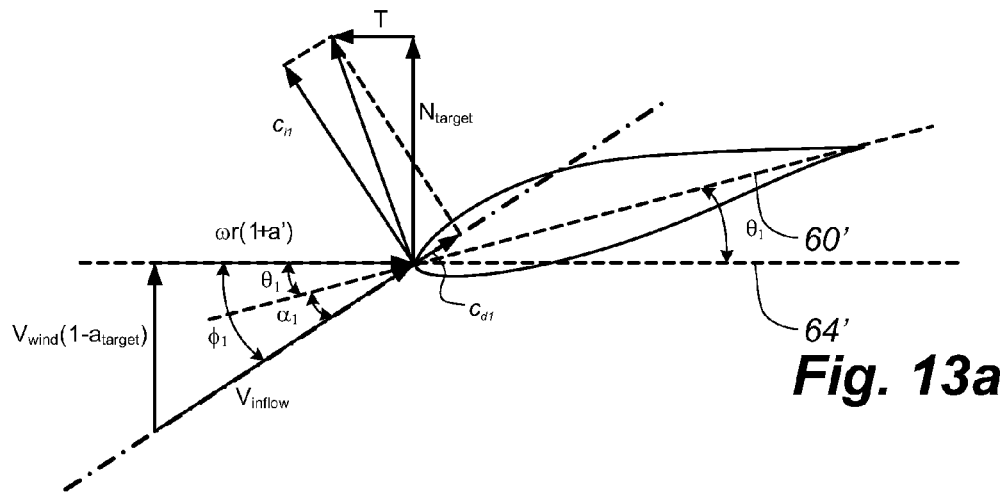
Figure 13B:
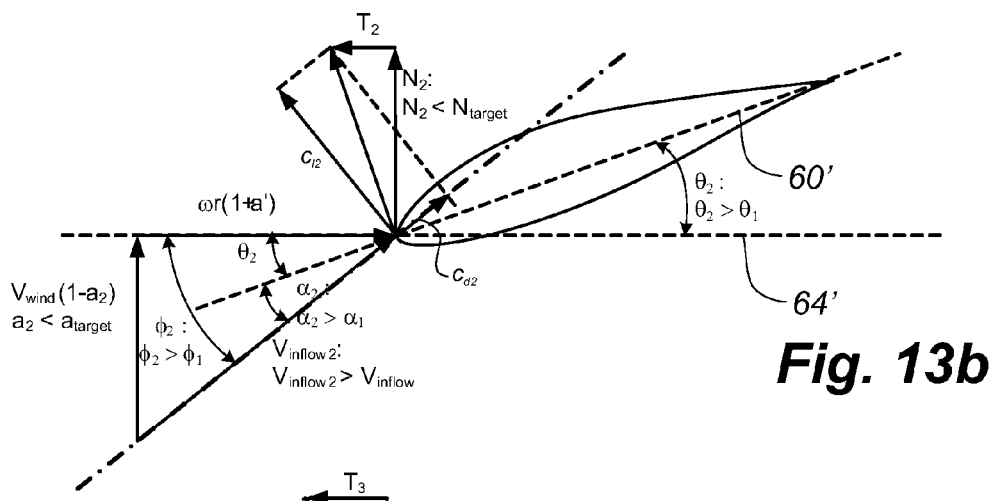

FIG. 13 shows a similar situation, but where the local blade profile for the base part having a given local chord length c has an actual twist $\theta_2$, which is higher than the target twist $\theta_1$ (as shown in FIG. 13b). Consequently, the inflow angle is shifted to an altered angle $\Phi_2$, which is larger than $\Phi_1$. Furthermore, the angle of attack is changed to an altered angle of attack $\alpha_2$, which is smaller than $\alpha_1$. Consequently, the two shown vector triangles are as shown in FIG. 12b shifted and the blade section obtains an inflow condition having an altered resultant velocity vector $v_{inflow2}$, at which an actual axial induction factor $a_2$ becomes smaller than the target axial induction factor $a_{target}$. Further, the lift coefficient is shifted to an altered lift coefficient $c_{l2}$, and an altered drag coefficient $c_{d2}$. Consequently, the normal load is shifted to an actual normal load $N_2$, which is smaller than the target normal load $N_{target}$. Consequently flow altering devices are needed in order to compensate for the altered inflow conditions and normal load.

Figure 13C:
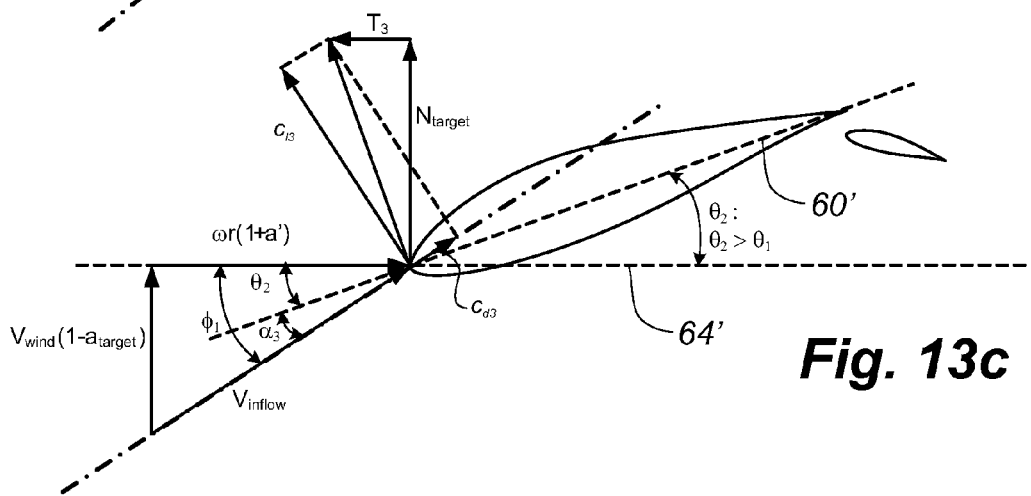

In order to obtain the target axial induction factor $a_{target}$, the inflow angle must be shifted back to $\Phi_1$ as shown in FIGS. 13a and 13c. Consequently, the compensated angle of attack must equal $\alpha_3=\Phi_1-\theta_2$. At this angle of attack, the flow altering devices (here depicted as a flap) must alter the drag coefficient and lift coefficient to altered values $c_{d3}$ and $c_{l3}$, at which the resultant normal load becomes equal to the target normal load $N_{target}$. Thus, the flow altering devices are used to increase the axial induction factor from $a_2$ to $a_{target}$, and increase the load from $N_2$ to $N_{target}$.

FIG. 14 yet again shows a similar situation. For the given profile of the section having a given pitch angle $\theta_1$ and angle of attack $\alpha_1$, the target conditions for achieving the target axial induction factor $a_{target}$ target normal and load $N_{target}$ for the local blade profile at the rotor design point are only met, when the chord length is equal to a target chord $c_1$ (as shown in FIG. 14a).

However, the local blade profile for the base part has an actual chord length $c_2$, which is lower than the target chord $c_1$. Consequently, the inflow angle is shifted to an altered angle $\Phi_2$, which is higher than $\Phi_1$. Furthermore, the angle of attack is changed to an altered angle of attack $\alpha_2$, which is larger than $\alpha_1$. Consequently, the two shown vector triangles are as shown in FIG. 14b shifted and the blade section obtains an inflow condition having an altered resultant velocity vector $v_{inflow2}$, at which an actual axial induction factor $a_2$ becomes smaller than the target axial induction factor $a_{target}$. Further, the lift coefficient is shifted to an altered lift coefficient $c_{l2}$, and an altered drag coefficient $c_{d2}$. Consequently, the normal load is shifted to an actual normal load $N_2$, which is smaller than the target normal load $N_{target}$. Consequently flow altering devices are needed in order compensate for the altered inflow conditions and normal load.

In order to obtain the target axial induction factor $a_{target}$, the inflow angle must be shifted back to $\Phi_1$ as shown in FIG. 14c. Consequently, the compensated angle of attack must equal $\alpha_3=\Phi_1-\theta_2$. At this angle of attack, the flow altering devices (here depicted as a flap) must alter the drag coefficient and lift coefficient to altered values $c_{d3}$ and $c_{l3}$, at which the resultant normal load becomes equal to the target normal load $N_{target}$.

Thus, the flow altering devices are used to increase the axial induction factor from $a_2$ to $a_{target}$, and increase the load from $N_2$ to $N_{target}$.

FIG. 15 shows yet again a similar situation, but where the local blade profile for the base part having a given twist angle $\theta_2$ has an actual chord $c_2$, which is larger than the target chord $c_1$ (as shown in FIG. 15*b*). Consequently, the inflow angle is shifted to an altered angle $\Phi_2$, which is lower than $\Phi_1$. Furthermore, the angle of attack is changed to an altered angle of attack $\alpha_2$, which is lower than $\alpha_1$. Consequently, the two shown vector triangles are as shown in FIG. 15*b* shifted and the blade section obtains an inflow condition having an altered resultant velocity vector $v_{inflow2}$, at which an actual axial induction factor $a_2$ becomes larger than the target axial induction factor $a_{target}$. Further, the lift coefficient is shifted to an altered lift coefficient $c_{l2}$, and an altered drag coefficient $c_{d2}$. Consequently, the normal load is shifted to an actual normal load $N_2$, which is larger than the target normal load $N_{target}$. Consequently flow altering devices are needed in order to compensate for the altered inflow conditions and normal load.

In order to obtain the target axial induction factor $a_{target}$, the inflow angle must be shifted back to $\Phi_1$ as shown in FIGS. 15*a* and 15*c*. Consequently, the compensated angle of attack must equal $\alpha_3 = \Phi_1 - \theta_2$. At this angle of attack, the flow altering devices (here depicted as a flap) must alter the drag coefficient and lift coefficient to altered values $c_{d3}$ and $c_{l3}$, at which the resultant normal load becomes equal to the target normal load $N_{target}$. Thus, the flow altering devices are used to decrease the axial induction factor from $a_2$ to $a_{target}$, and decrease the load from $N_2$ to $N_{target}$.

2.2 Flow Altering Devices and Aerodynamic Effect

In this subsection various flow altering devices, which can be used to compensate for the off-target twist and chord, are described together with their aerodynamic effect. In general multi-element devices, such as flaps and/or slats, as shown in FIG. 19, or surface mounted elements as shown in FIG. 18 are needed in order to compensate for the substantial deviation from target twist and chord of the base part of the longitudinal sections of the blade. However, it may be necessary to use additional flow altering devices, such as high lift devices, e.g. vortex generators and/or Gurney flaps, in order to obtain the correct lift and drag coefficients at the given angle of attack.

FIG. 17 shows a first example of flow altering devices 80 for compensating for off-target design parameters of the base part of the respective longitudinal section of the blade. In this embodiment, the flow altering means consists of a number of ventilation holes 80 for blowing or suction between an interior of the blade and an exterior of the blade. The ventilation holes are advantageously applied to the suction side of the blade as shown in FIGS. 17*a* and 17*b*. The ventilation holes 80 can be utilised to create a belt of attached flow. Air vented from the ventilation holes 80 may be used to energise and reenergise the boundary layer in order to maintain the flow attached to the exterior surface of the blade as shown in FIG. 17*b*. Alternatively, the ventilation holes may be used for suction as shown in FIG. 17*a*, whereby the low momentum flow in the boundary layer is removed and the remaining flow thereby reenergised and drawn towards the surface of the blade. Alternatively, the ventilation holes may be used to generate a pulsating flow, e.g. as a synthetic jet. Despite not generating a flow, this transfers momentum to the flow and thereby reenergises the boundary layer and alters flow separation. Examples of such embodiments are shown in FIGS. 17*c* and 17*d*, in which the ventilation holes are provided with membranes. The membranes may be provided near the exterior surface of the blade as shown in FIG. 17*d* or near the interior surface of the blade as shown in FIG. 17*c*.

The full drawn line in FIG. 17*e* shows the relationship between the lift coefficient and the inflow angle (or alternatively the angle of attack) for the basic airfoil without suction or blowing. By using suction as shown in FIG. 17*a* or tangential blowing, i.e. venting air substantially tangentially to the surface of the blade, the boundary layer is energised and reenergised. Likewise a pulsating jet as shown in FIGS. 17*c* and 17*d* will energise the boundary layer. Consequently, the lift coefficient becomes larger. At the same time, the maximum lift coefficient is found at a slightly higher inflow angle. Thus, the graph is shifted up and slightly to the right as shown with the dashed line in FIG. 17*e*. Alternatively, it is possible to apply blowing in an off-tangential angle, e.g. at an angle of more than 45 degrees and possibly substantially normally to the blade surface. In this case, the boundary layer becomes detached from the surface of the blade. Consequently, the lift coefficient becomes lower. At the same time, the maximum lift coefficient is found at a slightly lower inflow angle. Thus, the graph is shifted down and slightly to the left as shown with the dotted line in FIG. 17*e*.

FIG. 18 shows a second example of flow altering devices of flow altering devices 180, 181, 182 for compensating for off-target design parameters of the base part of the blade. In this embodiment, the flow altering means consists of a number of surface mounted elements. FIG. 18*a* shows a first embodiment, in which a first trailing edge element 180 is mounted near the trailing edge of the blade on the suction side of the blade, a second trailing edge element 181 is mounted near the trailing edge of the blade on the pressure side of the blade, and a leading edge element 182 is mounted near the leading edge of the blade on the pressure side of the blade. FIG. 18*b* shows a second embodiment, in which only a first trailing edge element is utilised on the suction side of the blade.

The full drawn line in FIG. 18*c* shows the relationship between the lift coefficient and the inflow angle (or alternatively the angle of attack) for the basic airfoil without the use of surface mounted element. By utilising the leading edge element 182 and the second trailing edge element 181 on the pressure side of the blade, the effective camber of the airfoil is increased and the operating lift coefficient at the rotor design point is increased. The maximum lift coefficient is also increased. By utilising the first trailing edge element 180 on the suction side of the blade, the camber of the airfoil is reduced and the operating lift coefficient at the rotor design point as well as the maximum lift coefficient is decreased.

FIG. 19 shows the effect of using multi-element airfoils, such as slats or flaps, as flow guiding devices. The depicted graph shows the relationship between the lift coefficient and the inflow angle (or alternatively the angle of attack) for the basic airfoil without the use of multi-element airfoils. By utilising a trailing edge flap oriented towards the pressure side of the blade, the graph is shifted towards lower angles of attack. By utilising a trailing edge flap oriented towards the suction side of the blade, the graph is shifted towards higher angles of attack. By using a slat near the suction side of the blade, the lift coefficient is increased, and further the maximum lift coefficient is found at a slightly higher angle of attack. By using a slat near the suction side of the blade and a flap oriented towards the pressure side of the blade, the lift coefficient is increased, and further the maximum lift coefficient is found at a lower angle of attack. By using a slat near the suction side of the blade and a flap oriented towards the suction side of the blade, the lift coefficient is increased, and further the maximum lift coefficient is found at a higher angle of attack.

Slats and flaps may be implemented in various ways. A slat may for instance be connected to the first base part of the blade via a connection element as shown in FIG. 19b. The slat may be connected to the first base part in such a way that it is rotational and/or translational movable in relation to the first base part. Likewise a flap may be provided as a separate element as shown in FIG. 19c, which may be moved rotational and/or translational in relation to the first base part. Thus, the blade profile is a multi element profile. Alternatively, the flap may be implemented as a camber flap as shown in FIG. 19d, which can be used to change the camber line of the blade profile.

FIG. 20 shows another example of flow altering devices 280 for compensating for off-target design parameters of the base part of the blade. In this embodiment, the flow altering means comprises a device attached to the pressure side at the trailing edge, in this case a Gurney flap 280 as shown in FIG. 20a. Other attachments with similar flow altering means are a triangular wedge or a rip forming an angle of more than 90 degrees with the surface of the profile. The full drawn line in FIG. 20b shows the relationship between the lift coefficient and the inflow angle (or alternatively the angle of attack) for the basic airfoil without the use of a surface mounted element. By utilising the Gurney flap, the operating lift coefficient at the rotor design point is increased as well as the maximum lift coefficient, which is also increased as shown as the dashed line in FIG. 20.

FIG. 21 shows yet another example of flow altering devices 380 for compensating for off-target design parameters of the base part of the blade. In this embodiment, the flow altering means comprises a number of vortex generators as shown in FIG. 21a. The vortex generators 380 are here depicted as being of the vane type, but may be any other type of vortex generators. The vortex generators 380 generate coherent turbulent structures, i.e. vortices propagating at the surface of the blade towards the trailing edge of the blade. The vortex generators efficiently change the optimum angle of attack for the radial section and alter the lift of the blade section by reenergising the boundary layer and delaying separation.

FIG. 21b shows an advantageous embodiment having an arrangement of pairs of vane vortex generators, which has shown to be particularly suited for delaying separation of airflow. The arrangement consists of at least a first pair of vane vortex generators comprising a first vane and a second vane, and a second pair of vane vortex generators comprising a first vane and a second vane. The vanes are designed as triangular shaped planar elements protruding from the surface of the blade and are arranged so that the height of the vanes increases towards the trailing edge of the blade. The vanes have a maximum height h, which lies in an interval of between 0.5% and 1% of the chord length at the vane pair arrangement. The vanes are arranged in an angle b of between 15 and 25 degrees to the transverse direction of the blade. Typically the angle b is approximately 20 degrees. The vanes of a vane pair are arranged so that the end points, i.e. the point nearest the trailing edge of the blade, are spaced with a spacing s in an interval of 2.5 to 3.5 times the maximum height, typically approximately three times the maximum height (s=3 h). The vanes have a length l corresponding to between 1.5 and 2.5 times the maximum height h of the vanes, typically approximately two times the maximum height (l=2 h). The vane pairs are arranged with a radial or longitudinal spacing z corresponding to between 4 and 6 times the maximum height h of the vanes, typically approximately five times the maximum height (z=5 h). The full drawn line in FIG. 21c shows the relationship between the lift coefficient and the inflow angle (or alternatively the angle of attack) for the basic airfoil without the use of vortex generators. By utilising the vortex generators 380, the maximum lift coefficient is shifted towards a higher angle of attack. The dotted line shows the corresponding relationship, when vortex generators are positioned in a forward position, i.e. towards the leading edge of the blade, whereas the dashed line shows the corresponding relationship, when vortex generators are positioned in a backward position, i.e. towards the trailing edge of the blade. It is readily seen that the use of vortex generators can be used to change the design inflow angle as well as the maximum lift.

FIG. 22 shows yet another example of flow altering devices 480 for compensating for off-target design parameters of the base part of the blade. In this embodiment, the flow altering means comprises a spoiler element, which protrudes from the pressure side of the blade as shown in FIG. 22a. The spoiler element is usually used at the transition region of the blade and possibly at an inboard part of the airfoil region of the blade. The full drawn line in FIG. 22b shows the relationship between the lift coefficient and the inflow angle (or alternatively the angle of attack) for the basic airfoil without the use of surface mounted element. It is seen that the lift coefficient is very low for the transition region. By utilising a spoiler element, the maximum lift coefficient is increased significantly. By utilising a spoiler element positioned at a forward position of the blade, i.e. towards the leading edge of the blade or towards the position of maximum thickness, the operating lift coefficient at the rotor design point is increased as well as the maximum lift coefficient as shown with dashed line in FIG. 22b. By utilising a spoiler element positioned at a backward position of the blade, i.e. towards the trailing edge of the blade or towards the position of maximum thickness, the operating lift coefficient at the rotor design point as well as the maximum lift coefficient is shifted towards a higher value as well as towards a higher angle of attack as shown with dotted line in FIG. 22b.

3 SIMPLIFIED BASE PARTS OF BLADE

In this section, a number of simplified base part structures for transformable blades are described.

3.1 Base Part with Sub-Optimum Twist

A modern wind turbine blade designed according to conventional methods will have an inherent twist, which is non-linearly dependent on the local radius of the blade. Furthermore, the twist is relatively high—as much as 20 degrees. The twist especially needs to be quite large at the inboard part of the airfoil region and the transition region of the blade, since the resulting inflow velocity at the rotor design point changes relatively much in the radial direction of the blade in this part, whereas the twist is quite small in the outboard part of the blade near the blade tip, since the resulting inflow velocity at the rotor design point in this part of the blade changes slower in the radial direction of the blade. Due to this non-linearity, the design of modern wind turbine blades according to conventional methods is quite complex. Accordingly, the design of mould parts for manufacturing such blades will also be quite complex.

Therefore, from a design and manufacturing point of view it would be advantageous to obtain a base part of the blade having a simplified twist, such as a linearly dependent twist or a reduced twist compared to an optimum twist. Such simplified twist makes it feasible to achieve a modular blade design, in which the base part with the non-optimum twist can be used for several different blade types and blade lengths. Thus, it is possible to reuse the base part of an existing blade further outboard on a larger/longer blade, or alternatively reuse the base part of an existing blade further inboard on a smaller/shorter blade. All in all, it is possible to make a blade design in such a way that the blade design of the airfoil region is put together from pre-designed sections and that blades of different lengths can be composed partly from sections already existing from previous blades.

However, putting such a constraint on the blade design implies the need for using flow altering devices in order to compensate for not being able to operate at the target design ideal twist for the different blade sections as explained in subsection 2.1.

In order to compensate for this non-ideal twist, a blade may be divided into a number of separate radial blade sections 38 as shown in FIG. 2, which each are provided with flow altering devices (not shown) in order to compensate for the non-ideal twist for that radial blade section 38. The radial blade sections 38 are here depicted as extending only slightly into the airfoil area 34. However, in order to obtain an optimum compensation for the non-optimum twist, the blade must be provided with individually compensated radial blade sections 38 along substantially the entire airfoil area 34. Since the twist of the outer part of the blade, i.e. near the tip, is small, not all embodiments of the blade according to the invention need to be provided with flow altering devices near the tip end. However, preferably at least the inner 75% of the airfoil area 34 is provided with radial blade sections 38 having flow altering devices.

Each of the radial sections 38 has an individual average angle of attack for a given design point and the base part of the blade has a sectional airfoil shape, which without flow altering devices has a sectional optimum angle of attack. Flow altering devices, e.g. as shown in FIGS. 17-22, may be used to shift the optimum angle of attack of the sectional airfoil shape towards the average angle of attack for the radial section.

FIG. 23*a* shows graphs of an average angle of attack 78 for the blade as a function of the radial distance r from the hub of the rotor. FIG. 23*a* also shows a graph of an optimum angle of attack 76 of the blade without flow altering devices as a function of the radial distance from the hub. It can be seen that the average angle of attack 78 is higher than the optimum angle of attack 76, which clearly indicates that the blade does not have an optimum blade twist. Therefore, the blade can be provided with flow altering devices as for instance shown in FIGS. 17-22 in order to shift the optimum angle of attack with a shift angle Δα, thereby shifting the optimum angle of attack towards the average angle of attack for a given radial distance r from the hub.

FIG. 23*b* shows a graph of the shift angle Δα as a function of the radial distance from the hub. It can be seen that the shift angle Δα is continuously decreasing with increasing distance r from the hub.

FIGS. 23*c* and 23*d* illustrate the effect of providing the blade with flow altering devices for the outer part 44 and the inner part 42 of the blade, respectively. FIG. 23*c* shows graphs of the relationship between the drag coefficient and the lift coefficient as well the relationship between the angle of attack and the lift coefficient. The graphs are examples of design parameters for the blade at a given radial distance from the hub falling within the outer part 44 of the blade. The design point is depicted with a dot and is chosen based on an optimum relationship between the lift coefficient and the drag coefficient, e.g. by maximising the lift-to-drag ratio. By providing the blade with flow altering devices, the graph showing the relationship between the lift coefficient and the angle of attack is shifted towards higher angles, thereby compensating for the "missing" twist of the outer part 44 of the blade.

FIG. 23*d* shows similar graphs for the inner part 42 of the blade. It can be seen that the use of flow altering devices on the inner part 42 of the blade has two effects, viz. that the relationship between the lift coefficient and the angle of attack is shifted towards a higher angle of attack and towards a larger lift coefficient. Thus, the flow altering devices not only compensate for the "missing" twist of the inner part 42 of the blade, but also compensate for the non-optimum profile with respect to generating lift of the inner part 42 of the blade, which typically would comprise the root area 30 and the transition area 32 of the blade.

Figure 24A:
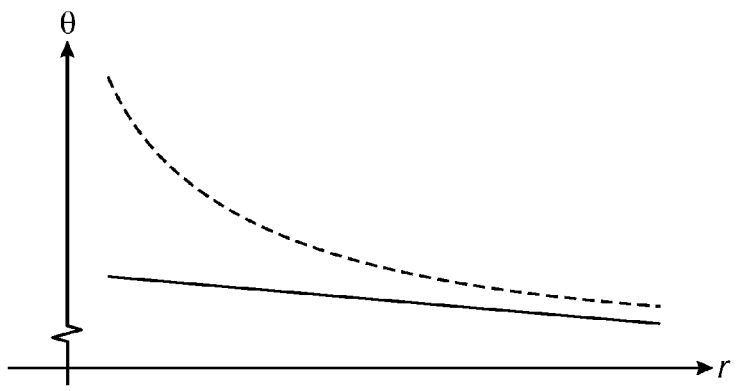
Figure 24B:
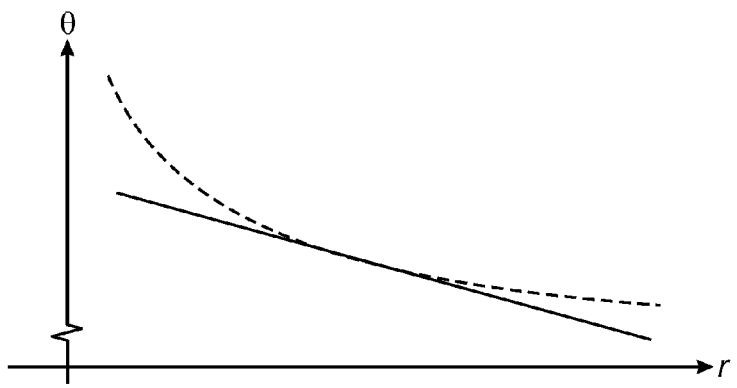
Figure 24C:
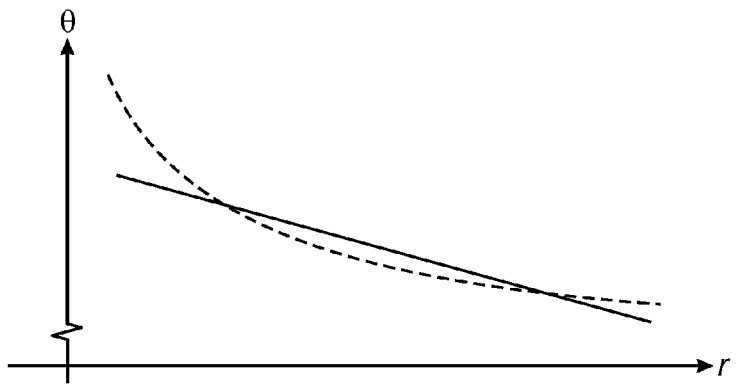
Figure 24D:
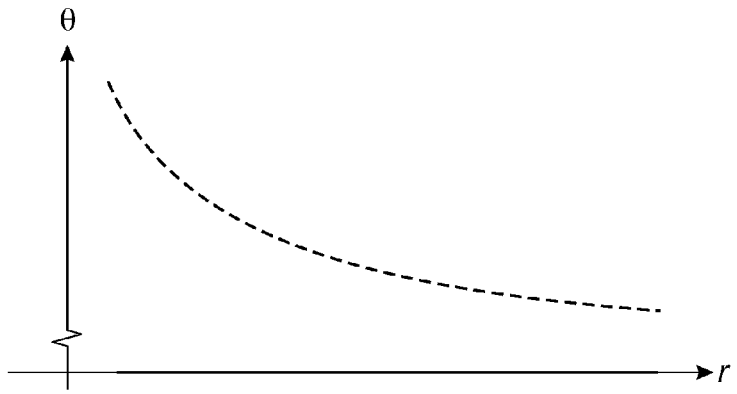

However, in relation to modularity of blade parts, it is advantageous that the twist is linearly dependent on the local blade radius. FIGS. 24*a-d* illustrate the relationship between twist, θ, and local radius for various embodiments having a linearly dependent twist. The dashed lines illustrate the optimum twist angle in order to obtain the rotor design target point for a blade without flow altering devices, and the full drawn lines illustrate the relationship between twist angle and local blade radius for a base part having sub-optimum twist and provided with flow altering devices. As shown in FIG. 24*a*, the twist angle may be lower than the optimum twist angle along the entire longitudinal extend of the longitudinal blade section. FIG. 24*b* illustrates a second embodiment, in which the twist angle of the base part is equal to the optimum twist angle for a single cross-section only, and where the remainder of the longitudinal blade section has a twist angle, which is lower than the optimum twist angle. However, in principle, the longitudinal blade section may have one part, in which the twist angle is lower than the optimum twist angle, a second part, in which the twist angle is higher than the optimum twist angle, and a third part, in which the twist angle is higher than the optimum twist angle. This is illustrated in FIG. 24*c*. Yet again, it is highly advantageous, if the base part is designed without any twist, which is illustrated in FIG. 24*d*.

3.2 Base Part with Linear Chord

As previously mentioned, a modern wind turbine blade designed according to conventional methods has a chord length distribution, which is non-linearly dependent on the local radius of the blade. However, as with respect to twist, from a design and manufacturing point of view it is advantageous to obtain a base part of the blade having a simplified chord length distribution, e.g. a linearly chord length.

Figure 24E:
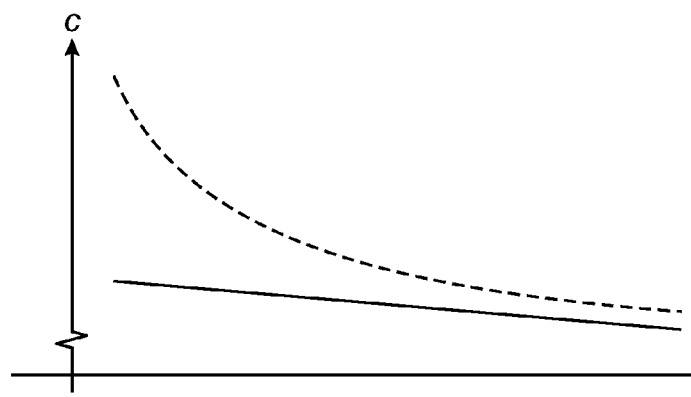
Figure 24F:
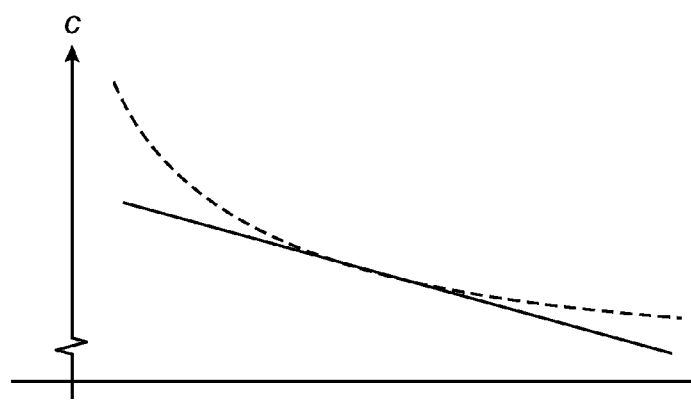
Figure 24G:
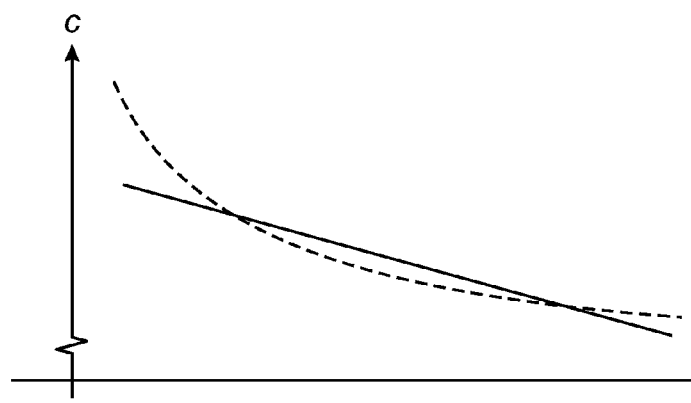

FIGS. 24*e-g* illustrate the relationship between chord length, c, and local radius for various embodiments having a linearly dependent chord length. The dashed lines illustrate the optimum chord in order to obtain the rotor design target point for a blade without flow altering devices, and the full drawn lines illustrate the relationship between chord length and local blade radius for a base part having a linear chord length distribution and provided with flow altering devices. As shown in FIG. 24*a*, the chord length may be lower than the chord length along the entire longitudinal extend of the longitudinal blade section. FIG. 24*b* illustrates a second embodiment, in which the chord length of the base part is equal to the optimum chord length for a single cross-section only, and where the remainder of the longitudinal blade section has a chord length, which is lower than the optimum chord length.

FIG. 24*c* illustrates an advantageous embodiment having a first part, in which the chord length is lower than the optimum chord length, a second part, in which the chord length is higher than the optimum chord length, and a third part, in which the chord length is higher than the optimum chord length. The linear chord length distribution may for instance be chosen as a median line to the optimum chord length distribution.

Embodiments having longitudinal blade sections with linearly dependent chord length are shown in FIGS. 9-11. In all these embodiments, the chord length of the blade is decreasing in the longitudinal or radial direction of the blade towards the blade tip. However, the blade may also comprise a longitudinal blade part, in which the chord length is constant. An embodiment of such a blade is shown in FIG. 25. The blade is divided into a root region 430, a transition region 432, and an airfoil region 434. The airfoil region comprises a blade tip part 436, a first longitudinal section 440, and a second longitudinal section 442. The first longitudinal section 440 of the blade is divided into a first base part 440 and a number of first flow altering devices 446, 448. The second longitudinal section 442 of the blade is divided into a second base part 443 and a number of second flow altering devices 449. The first base part 441 has a constant chord length along the entire longitudinal extend of the first longitudinal section 440, whereas the second base part 443 has a chord length, which is linear decreasing in the longitudinal direction of the second longitudinal section of the blade.

3.3 Base Part with Linearly Dependent Thickness

It is not shown in the figures, but it is advantageous that the thickness of the blade is also linearly dependent on the local radius of the blade. The particular longitudinal blade section may for instance have the same relative profile along the entire longitudinal extent of the longitudinal blade section.

3.4 Base Part with Linearly Dependent Pre-Bend

Yet again, it may also be advantageous—especially with respect to modularity—to design the base part of the particular longitudinal section with a linear pre-bend, $\Delta y$, as illustrated in FIG. 26.

3.5 Blade Profiles

Normally, wind turbine blades designed according to conventional methods comprise blade sections having a profile 150 with double curvature pressure sides as shown in FIG. 27. The invention makes it possible to simplify the design to profiles 250 without double curvatured pressure sides as shown in FIG. 28 and to compensate for the off-design profile by use of flow altering devices as previously explained.

Yet again, as shown in FIG. 30, the profile may for at least a part of the longitudinal section be simplified even further to a symmetrical profile 350 having a chord 360 and camber 362, which are coincident. Such a blade profile has a relationship between lift coefficient and inflow angle, which crosses the origin of the coordinate system as shown in FIG. 29. This means that the graph is shifted towards higher inflow angles as compared to conventional non-symmetric blade profiles with a positive camber. This also implies that a particular lift coefficient may be obtained at a higher angle of attack than for the conventional blade profile. This is advantageous for embodiments having a reduced twist compared to an optimum twist as explained in subsection 3.1. In other words, the reduced twist and the symmetric profile at least partially compensate for each other.

This compensation may be exploited even further by providing at least a part of the longitudinal section with a profile 450 as shown in FIG. 32 having a "negative camber", i.e. a blade where the camber 462 is located closer to the pressure side 452 of the blade than the suction side 454 of the blade (or equivalently, where the camber 462 is located below the chord 460). A blade section has a negative lift coefficient for an incident airflow at an angle of attack of 0 degrees, i.e. the graph illustrating the relationship between lift coefficient and angle of attack is shifted even further towards larger inflow angles. This in turn means that a particular lift coefficient may be obtained at an even higher angle of attack. The use of profiles having a negative camber may be advantageous especially for blades having a very low twist or no twist, since such blades have blade sections, in which the operational angle of attack at the rotor design point is very high. This is particularly relevant for the inboard part of the airfoil region and the transition region.

However, the camber 462 need not locally be located nearer the pressure side of the blade than the suction side of the blade along the entire chord of the profile as shown in FIG. 32. As shown in FIG. 33, it is also possible to provide a blade section with profile 550 having a negative camber 562, in which a part of the camber is closer to the suction side 554 of the blade than the pressure side of the blade 552 (or above the chord 560) as long as the camber 562 on average is closer to the pressure side 552 than the suction side of the blade 554.

4 MODULARITY AND REUSE OF BLADE SECTIONS

As previously mentioned, the use of a simplified base part of the longitudinal section of the blade makes it possible to use that base part for several different types of blades and use flow altering devices to compensate for the off-design characteristics of the base part.

FIG. 34 illustrates this principle. A wind turbine blade 410 is divided into a root region 430, a transition region 432, and an airfoil region 434. The airfoil region 434 comprises a blade tip part 436, a first longitudinal section 440, and a second longitudinal section 442. The first longitudinal section 440 of the blade is divided into a first base part 441 and a number of first flow altering devices 446. The second longitudinal section 442 of the blade is divided into a second base part 443 and a number of second flow altering devices 448. The first base part 441 and the second base part 443 have profiles, which have a simplified structure with respect to for instance modularity of blade parts and/or manufacturing of the base parts 441, 443, and which at the rotor design point in itself deviate significantly from the target axial induction factor and/or the target loading. The base parts 441 are here depicted as having linearly dependent chord lengths, but advantageously, the sections also have a linearly dependent thickness and linearly dependent twist or no twist. Therefore, the longitudinal sections are provided with the flow altering devices, which are here depicted as a first slat 446 and a first flap 448, however; the flow altering devices are not restricted to such flow altering devices only. The first longitudinal section 440 and the second longitudinal section 442 both extend along at least 20% of the longitudinal length of the airfoil region 434. The first longitudinal section or base part is located in a first radial distance $r_1$.

The first base part 441 is reused for a second blade 410', which also comprises a root region 430', a transition region 432', and an airfoil region 434'. The airfoil region 434' comprises a blade tip part 436', a first longitudinal section 440', a second longitudinal section 442' having a second base part 443', and a third longitudinal section or transition section 445' located between the first longitudinal section 440' and the transition region 432'. The first longitudinal section and first base part 441 of the second blade 410' are located at a second radial distance $r_2$. Therefore, the inflow conditions for the first base part 441 are different from the first blade 410 and the second blade 410'. Further, the target chord lengths (for base parts without flow altering devices) need to be different in order obtain the target axial induction factor and the target normal load. Consequently, the second blade 410' needs different flow altering devices 446', 448' than the first blade 410 in order to compensate for the off-design conditions.

The first base part 441 may be designed so that it without flow altering devices is suboptimum for both the first blade 410 and the second blade 410' as illustrated in FIG. 34. However, in principle, the first base part 441 may be optimised for one of the two blades, so that flow altering devices only are needed for the other of the two blades.

In principle, a first blade may be reused entirely for a second blade, for instance by providing the first blade with a hub extender as shown in FIG. 35. In this situation, substantially the entire hatched part of the second blade be encumbered with off-design conditions and a majority of this section will need the use of flow altering devices, advantageously both the airfoil region and the transition region of the second blade.

5 OPERATION OF A WIND TURBINE WITH TRANSFORMABLE BLADES

In this section, the operation or control of a wind turbine comprising a rotor having transformable blades according to the invention is described. The principle is illustrated in FIG. 36, in which (a) shows the first embodiment of the wind turbine blade according to the invention (also shown in FIG. 9).

FIG. 36 (b) shows the loading as function of the local blade radius, in which the full drawn line is the target loading, and the dashed line is the actual loading of the base part of the blade without flow altering devices. The blade pitch and rotational speed is adjusted so that an outboard part of the blade for values above a radial distance $r_0$ meets the target loading at the rotor design point. In this situation, the actual target loading of the first base part 141 without flow altering devices is sub-optimum as illustrated with the dashed line. Therefore, the first base part 141 and possible other parts of the blade are provided in order to compensate for the off-design conditions and adjusting the loading of the blade section to meet the target loading along the entire longitudinal extend thereof as shown in FIG. 36 (c).

Similar graphs may be plotted for the axial induction factor, as the blade section also needs to meet the target axial induction factor.

6 EXAMPLES

The following section describes a study of the transformable blades concept via examples. As previously mentioned the transformable blade comprises a base part and an adjustable part. The adjustable part comprises aero-devices or flow altering means, which are fitted to the base part in order to adjust and meet the aerodynamic design target of the blade sections. By adjusting only the flow altering means, the tuning of section aerodynamics allows partial de-coupling between the structural and aerodynamic design. The base part can be designed to have optimal structural properties and not necessarily optimal aerodynamics. Afterward, the flow altering devices will be designed to fill the aerodynamic gaps from non-optimum to near-optimum target conditions. Flow altering devices, among others, include flaps, slats, vortex generators and spoilers as described in Sec. 2.2.

Some of the presented graphs are somewhat coarse due to the use of limited number of sampling points in the simulation tools used for verifying the transformable blade concept.

6.1 Blade of 40.3 m with Du-91-W2-250 Airfoil and No Twist

The first example takes a point of departure from a blade having a length of 40.3 meters and having an airfoil region with an ideal axial induction factor (i.e. a=0.33) for every cross-section. The chord length c is shown as a function of the radial distance $r_t$ from the tip in FIG. 37. The chord length distribution is substantially identical to the existing LM40.3p blade manufactured and sold by the present applicant. It is seen that the chord length distribution is non-linearly dependent in the radial direction of the blade.

The transformable blade of the first example has a chord length distribution identical to the LM40.3p blade but the outer 26 meters of the airfoil regions have been replaced with a DU-91-W2-250 airfoil profile. Furthermore, the transformable blade is not twisted in this region. Finally, the relative thickness of the DU-91-W2-250 airfoil profile is constant in the region. In the present example the relative thickness is 25%, i.e. the ratio between the maximum cross section thickness and the chord length at a given cross section is 25%. Thus, the airfoil region has been highly simplified in only having a single airfoil shape along approximately 75% of the airfoil region and having no twist.

FIG. 38 shows graphs of the twist $\Theta$ depicted as a function of the radial distance $r_t$ from the tip. A first graph 510 shows the twist for the ideal blades, and another graph 520 shows the twist for the transformable blade. It is seen that the twist of the transformable blade has a severe deviation from the ideal twist of several degrees on average over the radial extent of the blade.

FIG. 39 shows graphs of the inflow angle distribution along the span of various 40.3 m blades (as a function of the radial distance $r_t$ from the tip). The first and the second graphs 550, 560 show the distribution of the inflow angle $\phi$ for the ideal blade at wind speeds of 8 m/s and 10 m/s, respectively, whereas the third and the fourth graphs 570, 580 show the corresponding distribution of the inflow angle $\phi$ for the transformable blade, respectively.

FIG. 40 shows graphs of the lift coefficient distribution along the span of various 40.3 m blades (as a function of the radial distance $r_t$ from the tip). The first and the second graphs 600, 610 show the distribution of the lift coefficient $c_l$ for the ideal blade at wind speeds of 8 m/s and 10 m/s, respectively, whereas the third and the fourth graphs 620, 630 show the corresponding distribution of the lift coefficient $c_l$ for the transformable blade, respectively.

FIG. 41 shows graphs of the axial induction factor distribution along the span of various 40.3 m blades (as a function of the radial distance $r_t$ from the tip). The first and the second graphs 650, 660 show the distribution of the axial induction factor a for the ideal blade at wind speeds of 8 m/s and 10 m/s, respectively, whereas the third and the fourth graphs 670, 680 show the corresponding distribution of the axial induction factor a for the transformable blade, respectively. It is seen that the axial induction factor over the airfoil region differs at least 10% from the target axial induction factor of approximately 0.33.

By changing the outer part of the airfoil region with the DU-91-W2-250 airfoil profile, the power production of a wind turbine using such blades at wind speeds of 8 m/s and 10 m/s without the use of flow altering devices is reduced by 3% compared to a wind turbine using the ideal 40.3 meter blades. Furthermore, the change of profile leads to a deviation from an optimum power coefficient at a wind speed of 8 m/s in a region ranging from 10 meters to 26 meters from the tip (not shown in the graphs). FIGS. 40 and 41 show that this deviation is caused by an overloading in this region of the blade. Hence, this part of the transformable blade should be provided with flow altering devices capable of lowering the lift, thereby enhancing the mechanical power output of a wind turbine using such blades.

FIGS. 40 and 41 also show that the outer 15 meters of the base part of the transformable blade are under-loaded at a wind speed of 10 m/s, causing a drop in mechanical power. Aero-devices, such as Gurney flaps and slats, adapted for increasing the lift would increase the mechanical power output. Unless actively controlled aero-devices are used, it is not possible to achieve optimum conditions for both wind speeds, and a compromise has to be reached.

Overall, a highly simplified aerodynamic design of the base part of a transformable blade compared to the existing LM40.3p blade is achieved. The outer 26 meters of the base part of the transformable blade comprises only a single relative airfoil profile and no twist. This does not only simplify the aerodynamic design of the base part, but also simplifies the manufacturing process of the blade and the manufacturing process of moulds for manufacturing blade parts of the blade. However, the base part in itself entails a power yield loss of approximately 3% compared to the ideal conditions. Flow altering devices are then used to adjust the aerodynamic characteristics to the target values and in particular the axial induction factor, thus compensating fully for the 3% loss.

FIG. 42 shows a first graph 710 showing the relative thickness of the transformable blade compared to a second graph 700 showing the relative thickness of the existing LM40.3p blade as a function of the radial distance $r_t$ from the tip. It is seen that the relative thickness of the transformable blade is larger than the relative thickness of the LM40.3p blade. The bending stiffness of a wind turbine blade comprising a shell body is proportional to the cube of the distance between the neutral axis of the blade and the shell body. This means that the shell body of a relative thick profile may be thinner than a relative thinner profile and still obtain the same strength and stiffness. The shell body is typically made as a laminate structure comprising a matrix material reinforced with fibres, such as glass fibres and/or carbon fibres. In the present example the redesigned part of the transformable blade is 14.8% lighter than the corresponding part of the LM40.3p blade, and the overall weight reduction is 7.7%. Thus, it is seen that also the material cost of a transformable blade may be reduced compared to existing blades.

A similar study was made of a transformable blade having a relative thickness of 30% for the outer 32 meters. The weight of the redesigned part is reduced with 21.4% compared to the corresponding part of an LM40.3p blade, and the overall weight reduction was 12.3%. Nonetheless, the mechanical power yield of a wind turbine using the transformable blade can be maximized from the use of the flow altering devices.

6.2 Group of Blades Having Identical Outboard Base Parts

The following examples demonstrate the use of an identical outboard base part 830 for three different transformable blades 800, 810, 820 having different blade lengths as shown in FIG. 43. Further, the examples demonstrate one method of operating a wind turbine having a rotor with such transformable blades. The blades studied have lengths of 44.1, 52.1, and 60.1 meters, respectively. The chord distributions 801, 811, 821 of the three blades are shown in FIG. 44 as a function of the radial distance $r_t$ from the tip. In the following example, the transformable blades are studied for use on rotors with an identical tip speed of 70 m/s for all three transformable blades 800, 810, 820. FIG. 45 shows the corresponding graphs 802, 812, 822 of the operational inflow angle as a function of the radial distance $r_t$ from the tip, and FIG. 46 shows the corresponding graphs 803, 813, 823 of the operational lift coefficients as a function of the radial distance $r_t$ from the tip.

If the different transformable blades 800, 810, 820 are to be operated at the same tip speed, it is seen that the outboard 30 meters of the transformable blades, where all blades share the same radial section, have different operational lift coefficients, and thus, it is clear that the product of the chord length and the lift coefficient is also different for the three blades. To achieve the operational condition for the three blades, it is clear that flow altering devices are needed along the entire radial extent of the outboard part for at least two of these blades to meet the target axial induction factor, whereas the third blade may reach the target axial induction factor by design.

However, the lift coefficient distribution as shown in FIG. 46 may be altered by changing the rotor parameters. Accordingly, by pitching the blades, it is possible to substantially translate the lift coefficient towards higher or lower overall values, whereas it is possible to "tilt" the lift coefficient curves by altering the operational tip speed. In order to reduce the difference in operational lift coefficient of the three transformable blades 800, 810, 820 in the outboard part of the blades, the three blades are in the following evaluated for tip speeds of 70 m/s, 75 m/s, and 80 m/s for the 44.1, 52.1, and 60.1 m transformable blades, respectively.

FIG. 47 shows the corresponding graphs 804, 814, 824 of the inflow angle as a function of the radial distance $r_t$ from the tip, and FIG. 48 shows the corresponding graphs 805, 815, 825 of the lift coefficients as a function of the radial distance $r_t$ from the tip. The results indicate a significant improvement in the operation lift coefficients. In the outboard 20 meters of the transformable blades, the lift coefficients are substantially identical. Thus, no flow altering devices are needed for this part to meet the target axial induction factor. The inboard parts of the airfoil region of the base parts of the transformable blades, however, need to be provided with flow altering devices in order to meet the target axial induction factor.

Accordingly, it is demonstrated that it is possible to adjust the pitch of the blade and the rotational speed of the rotor to meet the target axial induction factor of the outboard section, whereas the inboard part is provided with flow altering devices in order to meet the target axial induction factor of the inboard section of the airfoil region.

6.3 Group of Staggered Blades

As with the previous example, a first transformable blade 900, a second transformable blade 910, and a third transformable blade 920 having a blade length of 44.1 m, 52.1 m, and 60.1 m, respectively, are studied. The three transformable blades 900, 910, 920 share an identical midboard or inboard 930 base part. Thus, the three transformable blades are staggered as shown in FIG. 49. It is seen that the transformable blades 900, 910, 920 have different tip parts and root (and transition) parts.

FIG. 50 depicts graphs 901, 911, 921 of the chord length distribution for the three transformable blades 900, 910, 920, respectively, as a function of the radial distance $r_t$ from the tip. It is seen that the blades have a common section with a linear chord length variation and staggered tip locations. The section 930 of the 60.1 m transformable blade 920 is staggered 2.5 and 5 m from the identical sections of the 52.1 m transformable blade 910 and the 44.1 m transformable blade 920, respectively. This means that the shared section 930 for instance may be located 15 m, 12.5 m, and 10 m from the tip of the three blades, respectively.

In the following graphs, the tip of the 44.1, 52.1 and 60.1 m blades is placed at 0, 2.5 and 5 m, respectively. This simplifies the comparison of results between identical sections found at the same horizontal-axis location. The following computations are carried out imposing a tip speed of 75 m/s on all blades.

FIG. 51 shows the corresponding graphs 902, 912, 922 of the inflow angle as a function of the radial distance $r_t$ from the tip, and FIG. 52 shows the corresponding graphs 903, 913, 923 of the lift coefficients as a function of the radial distance $r_t$ from the tip. It is seen that the lift coefficients of sections ranging from 10 to 20 meters from the blade tip of the three transformable blades 900, 910, 920 show excellent agreement, which means that flow altering devices are not needed in this region. Further, it is seen that the 52.1 and 60.1 m transformable blades 910, 920 show agreement of the aerodynamic features in the range from 20 to 30 meter from the tip. Thus, if the shared blade section 930 is optimised for the 52.1 and 60.1 m transformable blades 910, 920, only the 44.1 m transformable blade 900 need to be fitted with flow altering devices in this region in order to meet the target axial induction factor. However, it is seen that in the section beyond 30 meters from the blade tip, the aerodynamic operational parameters of the three transformable blades are significantly different, which means that flow altering devices are needed in the inboard part of at least two of these blades in order to meet the target axial induction factor.

Thus, it is demonstrated that a section of a blade can be shared for a staggered group of blades at a midboard or midspan part of the blades in such a way that a large part of the shared section does not need to be provided with flow altering devices to meet the target axial induction factor. Accordingly, the pitch of the blades and the rotational speed of the rotor are adjusted to meet the target axial induction factor of the midboard section, whereas the inboard part (and possibly the outboard part) is provided with flow altering devices to meet the target axial induction factor of the inboard section (and the outboard part) of the airfoil region. Furthermore, by staggering the blades, it is also possible to obtain nearly identical flapwise bending moments (not shown). This means that not only the outer contour of the shared section is the same but that the laminate structure may also be provided with the same design and thickness.

FINAL REMARKS

The invention has been described with reference to a preferred embodiment. However, the scope of the invention is not limited to the illustrated embodiment, and alterations and modifications can be carried out without deviating from the scope of the invention.

LIST OF REFERENCE NUMERALS 2 wind turbine
4 tower
6 nacelle
8 hub
10, 410 blade
14 blade tip
16 blade root
18 leading edge
20 trailing edge
30, 130, 230, 330, 430 root region
32, 132, 232, 332, 432 transition region
34, 134, 234, 334, 434 airfoil region
36, 136, 236, 336, 436 tip region
38 radial blade sections
140, 240, 340 first longitudinal section
141, 241, 341, 441 first base part
242, 342 second longitudinal section
243, 343, 443 second base part
344 transition section
345 transition base part
146-149, 246, 248, 346-349, 446, 448 flow altering devices
50, 150, 250, 350, 450, 550 airfoil profile
52, 452, 552 pressure side
54, 454, 554 suction side
56 leading edge
58 trailing edge
60, 360, 460, 560 chord
62, 362, 462, 562 camber line/median line
64 direction of rotation
66 lift
68 drag
70 resultant aerodynamic force
72 axial force (thrust)
74 tangential force
75 moment coefficient
76 optimum angle of attack for airfoil profile of radial blade section without flow altering devices
78 average angle of attack for radial blade section
80, 180-182, 280, 380, 480 flow altering devices
a axial induction factor
a' tangential induction factor
b vane angle
c chord length
$c_d$ drag coefficient
$c_l$ lift coefficient
$c_m$ moment coefficient
$d_t$ position of maximum thickness
$d_f$ position of maximum camber
f camber
h vane height
l vane length
r·ω rotational velocity
r local radius, radial distance from blade root
$r_t$ radial distance from blade tip
s vane spacing
t thickness
z vane pair spacing
x tip speed ratio
B number of blades
N normal force
P power
R rotor radius
T tangential force
X tip speed
V design point wind speed
$v_a$ axial velocity
$v_w$ wind speed
$v_r$, W, $v_{inflow}$ resultant speed, inflow speed
α angle of attack
ω, Ω rotational speed of rotor
Θ, θ twist, pitch
Δy prebend

The invention claimed is:

1. A method of manufacturing a wind turbine blade by using the design of a longitudinal segment of a first wind turbine blade for the design of a second wind turbine blade, wherein the first wind turbine blade and the second wind turbine blade each comprise a longitudinally extending base part having: a profiled contour comprising a pressure side and a suction side as well as a leading edge and a trailing edge with a chord extending between the leading edge and the trailing edge, the profiled contour generating a lift when being impacted by an incident airflow, the profiled contour in the radial direction being divided into a root region with a substantially circular or elliptical profile closest to a hub, an airfoil region with a lift generating profile furthest away from the hub, and a transition region between the root region and the airfoil region, the transition region having a profile gradually changing in the radial direction from the circular or elliptical profile of the root region to the lift generating profile of the airfoil region, characterised in that the method comprises the steps of:

a) taking a first blade design of a first base part of a first longitudinal section of the airfoil region of a first blade, b) using the first blade design for the first base part on a first longitudinal section of the airfoil region of a second blade, so that an axial induction factor of the first base part on the second blade without flow altering devices at a rotor design point deviates from a target induction factor, and c) providing the first longitudinal section of the second blade with first flow altering devices so as to adjust the aerodynamic properties of the first longitudinal segment and obtain correct lift and drag coefficients at a given angle of attach to substantially meet the target axial induction factor at the design point on the second blade, wherein the first longitudinal segment extends along at least 20% of a longitudinal extent of the airfoil region of the second blade.

2. A method according to claim 1, wherein the first longitudinal segment of the first blade is located in a first radial distance from a root end of the first blade, and wherein the first longitudinal segment of the second blade is located in a second radial distance from a root end of the second blade, and wherein the first radial distance is different from the second radial distance.

3. A method according to claim 2, wherein the first base part is optimised for operation at the first radial distance.

4. A method according to claim 2, wherein the first base part has a profile shape which is substantially a hybrid between a first profile shape for obtaining a target axial induction factor at a first radial distance at the rotor design point and a second profile shape for obtaining a target induction at a second radial distance at the rotor design point.

5. A method according to claim 4, wherein the first base part has a profile shape which is substantially an average between the first profile shape and the second profile shape.

6. A method according to claim 1, wherein step b) is carried out by connecting a hub extender to the first blade.

7. A method according to claim 1, wherein the flow altering devices comprise devices chosen from the group of: multi element sections, wherein the multi element sections are selected from the group consisting of a slat, a flap, surface mounted elements, and combinations thereof, wherein the surface mounted elements are a leading edge element or a surface mounted flap, which alter an overall envelope of the first longitudinal segment of the blade.

8. A method according to claim 7, wherein the flow altering devices additionally comprise boundary layer control means, wherein the boundary layer control means are selected from the group consisting of holes for ventilation, a slot for ventilation, vortex generators, a Gurney flap and combinations thereof.

9. A group of wind turbine blades comprising at least a first wind turbine blade and a second wind turbine blade, wherein the first wind turbine blade and the second wind turbine blade each comprise a longitudinally extending base part having: a profiled contour comprising a pressure side and a suction side as well as a leading edge and a trailing edge with a chord extending between the leading edge and the trailing edge, the profiled contour generating a lift when being impacted by an incident airflow, the profiled contour in the radial direction being divided into a root region with a substantially circular or elliptical profile closest to a hub, an airfoil region with a lift generating profile furthest away from the hub, and a transition region between the root region and the airfoil region, the transition region having a profile gradually changing in the radial direction from the circular or elliptical profile of the root region to the lift generating profile of the airfoil region, characterised in that the first wind turbine blade and the second wind turbine blade comprise a first longitudinal segment having an a substantial identical first base part, wherein the first longitudinal segment extends along at least 20% of a longitudinal extent of the airfoil region of the second wind turbine blade, and wherein an induction factor of the first base part of the second blade without flow altering devices at a rotor design point deviates from a target axial induction factor, and wherein the first longitudinal segment of the second blade is provided with a number of first flow altering devices arranged so as to adjust the lift and drag coefficients of the first longitudinal segment to substantially meet the target axial induction factor at the rotor design point;

wherein the blades are manufactured according to the method of claim 1.

10. A group of wind turbine blades according to claim 9, wherein the second wind turbine blade comprises the base part of the first wind turbine blade and is further provided with a hub extender.

11. A group of wind turbines comprising at least a first wind turbine and a second wind turbine, wherein the first wind turbine comprises a rotor with two or three first wind turbine blades according to claim 9, and the second wind turbine comprises a rotor with two or three first wind turbine blades according to claim 9.

* * * * *